US009772238B2

(12) United States Patent
Preston et al.

(10) Patent No.: US 9,772,238 B2
(45) Date of Patent: Sep. 26, 2017

(54) REAL-TIME FIBER OPTIC INTERFEROMETRY CONTROLLER

(71) Applicant: Adelos, Inc., Polson, MT (US)

(72) Inventors: Dan Alan Preston, Bainbridge Island, WA (US); Stephen Timothy Doll, Big Arm, MT (US); James Alexander Philp, Missoula, MT (US); Trinitie Marie Vance, Bainbridge Island, WA (US)

(73) Assignee: Adelos, Inc., Polson, MT (US)

( * ) Notice: Subject to any disclaimer, the term of this patent is extended or adjusted under 35 U.S.C. 154(b) by 13 days.

(21) Appl. No.: 14/837,609

(22) Filed: Aug. 27, 2015

(65) Prior Publication Data
US 2016/0191163 A1 Jun. 30, 2016

Related U.S. Application Data

(60) Provisional application No. 62/042,994, filed on Aug. 28, 2014, provisional application No. 62/042,997, (Continued)

(51) Int. Cl.
*H04B 10/071* (2013.01)
*H04B 10/07* (2013.01)
(Continued)

(52) U.S. Cl.
CPC ............ *G01L 1/242* (2013.01); *G01B 9/0209* (2013.01); *G01B 11/161* (2013.01);
(Continued)

(58) Field of Classification Search
CPC .... G01B 11/161; G01B 9/0209; G01H 9/004; G01M 11/319; G01M 11/3145;
(Continued)

(56) References Cited

U.S. PATENT DOCUMENTS 4,898,443 A 2/1990 Epworth et al.
4,968,880 A * 11/1990 Beller ................ G01M 11/3118
250/227.21

(Continued)

FOREIGN PATENT DOCUMENTS

WO WO9746870 12/1997

OTHER PUBLICATIONS

Office action for U.S. Appl. No. 15/154,161, mailed on Sep. 23, 2016, Preston et al., "A System and Method for Dynamic Event Based IP Addressing", 8 pages.
(Continued)

*Primary Examiner* — Ken N Vanderpuye
*Assistant Examiner* — Dibson Sanchez
(74) *Attorney, Agent, or Firm* — Lee & Hayes, PLLC

(57) ABSTRACT

A modular fiber optic interferometry control system and method for extracting information from superimposed waves is disclosed. The system comprises a first module for converting a radio frequency input to a multiplexed binary data stream, a second module for correlating a pseudo random number (PRN) reference with a received PRN code modulated backscattered signal, and a third module comprising control logic. In some embodiments the system further comprises one or more of a fourth module for generating a power stream, a fifth module for event interrogation, and a sixth module for noise reduction.

20 Claims, 22 Drawing Sheets

Related U.S. Application Data filed on Aug. 28, 2014, provisional application No. 62/042,999, filed on Aug. 28, 2014, provisional application No. 62/043,002, filed on Aug. 28, 2014, provisional application No. 62/043,004, filed on Aug. 28, 2014, provisional application No. 62/043,007, filed on Aug. 28, 2014, provisional application No. 62/043,009, filed on Aug. 28, 2014, provisional application No. 62/043,015, filed on Aug. 28, 2014, provisional application No. 62/043,017, filed on Aug. 28, 2014, provisional application No. 62/043,023, filed on Aug. 28, 2014, provisional application No. 62/043,026, filed on Aug. 28, 2014, provisional application No. 62/043,029, filed on Aug. 28, 2014, provisional application No. 62/043,031, filed on Aug. 28, 2014, provisional application No. 62/043,034, filed on Aug. 28, 2014, provisional application No. 62/042,896, filed on Aug. 28, 2014, provisional application No. 62/199,098, filed on Jul. 30, 2015.

(51) Int. Cl.

| | | |
|---|---|---|
| *G01L 1/24* | (2006.01) | |
| *G01B 11/16* | (2006.01) | |
| *G01H 9/00* | (2006.01) | |
| *G01B 9/02* | (2006.01) | |
| *G01M 11/00* | (2006.01) | |
| *H04B 10/077* | (2013.01) | |
| *H04B 10/2575* | (2013.01) | |
| *G01D 5/353* | (2006.01) | |

(52) U.S. Cl.
CPC ......... *G01D 5/35319* (2013.01); *G01H 9/004* (2013.01); *G01M 11/319* (2013.01); *G01M 11/3145* (2013.01); *H04B 10/0775* (2013.01); *H04B 10/2575* (2013.01)

(58) Field of Classification Search
CPC ............ G01D 5/35319; H04B 10/2575; H04B 10/0775; G01L 1/242
USPC ........................................................ 398/9–38
See application file for complete search history.

(56) References Cited

U.S. PATENT DOCUMENTS

| | | | | |
|---|---|---|---|---|
| 5,115,332 A * | 5/1992 | Naito | ................. | H04B 10/2513 398/202 |
| 5,146,359 A * | 9/1992 | Okoshi | ................. | H04B 10/61 398/202 |
| 5,371,588 A | 12/1994 | Davis et al. | | |
| 5,694,408 A | 12/1997 | Bott et al. | | |
| 5,844,235 A * | 12/1998 | Tachikawa | ......... | G01M 11/3172 250/227.12 |
| 5,847,816 A | 12/1998 | Zediker et al. | | |
| 5,847,817 A | 12/1998 | Zediker et al. | | |
| 5,956,355 A | 9/1999 | Swanson et al. | | |
| 6,008,487 A * | 12/1999 | Tachikawa | ......... | G01M 11/3172 250/227.12 |
| 6,043,921 A | 3/2000 | Payton | | |
| 6,285,806 B1 * | 9/2001 | Kersey | ............... | G01D 5/35383 385/12 |
| 7,030,971 B1 | 4/2006 | Payton | | |
| 7,142,736 B2 | 11/2006 | Patel et al. | | |
| 7,268,863 B2 | 9/2007 | Payton | | |
| 7,271,884 B2 | 9/2007 | Payton | | |
| 7,274,441 B2 | 9/2007 | Payton | | |
| 7,339,721 B1 | 3/2008 | Berkey et al. | | |
| 7,355,163 B2 * | 4/2008 | Watley | .................. | E21B 47/102 250/227.14 |
| 7,565,334 B2 | 7/2009 | Rifkin et al. | | |
| 8,045,143 B2 * | 10/2011 | Harres | ............... | G01M 11/3109 356/73.1 |
| 8,408,064 B2 | 4/2013 | Hartog et al. | | |
| 8,417,490 B1 | 4/2013 | Preston et al. | | |
| 8,514,381 B2 * | 8/2013 | Shao | .................... | H04B 10/071 356/73.1 |
| 8,587,479 B2 | 11/2013 | Kurokawa | | |
| 9,008,506 B2 * | 4/2015 | Hsiao | ..................... | H04B 10/07 398/16 |
| 2001/0050768 A1 * | 12/2001 | Uchiyama | .......... | G01M 11/3172 356/73.1 |
| 2002/0154291 A1 * | 10/2002 | Uchiyama | ............ | G01M 11/319 356/73.1 |
| 2004/0114939 A1 * | 6/2004 | Taylor | .................... | H04B 10/61 398/152 |
| 2005/0174563 A1 | 8/2005 | Evans et al. | | |
| 2005/0254038 A1 * | 11/2005 | Harres | ............... | G01M 11/3109 356/73.1 |
| 2006/0018586 A1 * | 1/2006 | Kishida | .................. | G01B 11/16 385/12 |
| 2006/0227315 A1 * | 10/2006 | Beller | .................... | G01S 7/4818 356/3 |
| 2006/0232765 A1 * | 10/2006 | Harres | ............... | G01M 11/3109 356/73.1 |
| 2007/0018635 A1 * | 1/2007 | Nebendahl | ......... | G01M 11/3172 356/73.1 |
| 2007/0113649 A1 | 5/2007 | Bharti et al. | | |
| 2007/0171400 A1 | 7/2007 | Payton | | |
| 2007/0194796 A1 * | 8/2007 | Harrison | ............... | G01R 31/088 324/534 |
| 2008/0036597 A1 * | 2/2008 | Harman | .................. | G01S 13/04 340/552 |
| 2008/0145049 A1 * | 6/2008 | Koyamada | ........... | G01M 11/319 398/28 |
| 2009/0006840 A1 | 1/2009 | Birger et al. | | |
| 2009/0173494 A1 | 7/2009 | Tarvin et al. | | |
| 2010/0002226 A1 * | 1/2010 | Hartog | ............... | G01D 5/35364 356/73.1 |
| 2010/0098438 A1 * | 4/2010 | Prat Goma | ............ | H04B 10/61 398/203 |
| 2010/0238429 A1 | 9/2010 | Hayward et al. | | |
| 2010/0284021 A1 | 11/2010 | Hacker | | |
| 2010/0290035 A1 * | 11/2010 | Wang | .................. | G01M 11/3118 356/73.1 |
| 2012/0067118 A1 | 3/2012 | Hartog et al. | | |
| 2014/0130601 A1 | 5/2014 | Zhou et al. | | |
| 2014/0208855 A1 | 7/2014 | Skinner | | |
| 2014/0255023 A1 * | 9/2014 | Kishida | ................. | H04B 10/071 398/21 |
| 2014/0268110 A1 * | 9/2014 | Hartog | ............... | G01D 5/35364 356/73.1 |
| 2016/0124407 A1 | 5/2016 | Kallio et al. | | |
| 2016/0252414 A1 | 9/2016 | Preston et al. | | |

OTHER PUBLICATIONS

PCT Search Report and Written Opinion mailed Nov. 23, 2015 for PCT Application No. PCT/US15/46966, 10 pages.
PCT Search Report and Written Opinion mailed Nov. 30, 2015 for PCT Application No. PCT/US15/46973, 8 pages.
Adelos 1.1 FPGA Architecture Rev 0.6 (43 pages) by John Providenza dated Oct. 30, 2009.
Adelos 2.0 FPGA Architecture; Providenza & Boekelheide, Inc; Aug. 6, 2013; v0.1.
"Adelos Audio Server Design Document" (3 pages) by Providenza & Boekelheide, Inc. dated Jun. 24, 2010.
"Adelos Report Software" (18 pages) by Tim Roberts dated Mar. 7, 2010.
"Adelos S4 Operations Training v1" (109 pages) PowerPoint presentation, Presented by TerraEchos and GCS Research dated Aug. 2011.
Adelos S4 Training Guide (81 pages) by GCS Research dated Aug. 3, 2011.
Adelos S4 Training Guide.Ph.2 (v1) (77 pages) by Earonoff dated Aug. 3, 2011.

(56) References Cited

OTHER PUBLICATIONS

"Adelos Sensor System" (16 pages) by Providenza & Boekelheide, Inc. dated Nov. 19, 2013.
APIDS OTR—Telemetry Doc. No. 64236 / DDL-04-1968, (17 pages) dated Apr. 19, 2005.
Data Grabber Thread, 1 of 2, "Data Grabber Thread, 2 of 2", and "FFT Routine" (3 pages total) by Tim Roberts dated Jan. 29, 2009.
Roweis et al., "A Unifying Review of Linear Gaussian Models," 1999. Neural Computation vol. 11, pp. 305-345.
"Telemetry Board Opcodes Version 1" (25 pages) by Dr. Robert M. Payton dated. Oct. 9, 2004.
Providenza et al., "Flexible Fiber Sensing Using Virtual Correlation Cells," dated Dec. 14, 2009, 14 pages.

\* cited by examiner

REAL-TIME FIBER OPTIC INTERFEROMETRY CONTROLLER

CROSS REFERENCE TO RELATED PATENT APPLICATIONS

This application claims priority to U.S. Provisional Patent Application No. 62/042,989 filed on Aug. 28, 2014, entitled "System and Method for Electro Optical Modulation", U.S. Provisional Patent Application No. 62/042,994 filed on Aug. 28, 2014, entitled "System and Method for Acousto-Optical Modulation", U.S. Provisional Patent Application No. 62/042,997 filed on Aug. 28, 2014, entitled "System and Method for Fidelity up to 24,000 HZ", U.S. Provisional Patent Application No. 62/042,999 filed on Aug. 28, 2014, entitled "Fiber-Optic Based Sensing System and Methods Using Virtual Correlation Cells", U.S. Provisional Patent Application No. 62/043,002 filed on Aug. 28, 2014, entitled "System and Method for the Control Panel", U.S. Provisional Patent Application No. 62/043,004 filed on Aug. 28, 2014, entitled "System and Method for the Hardware Control Panel and Diagnostics", U.S. Provisional Patent Application No. 62/043,007 filed on Aug. 28, 2014, entitled "System and Method for Detection Logic", U.S. Provisional Patent Application No. 62/043,009 filed on Aug. 28, 2014, entitled "System and Method for Telemetry Recording and Display", U.S. Provisional Patent Application No. 62/043,015 filed on Aug. 28, 2014, entitled "System and Method for Audio Extension to Wave Convertor", U.S. Provisional Patent Application No. 62/043,017 filed on Aug. 28, 2014, entitled "System and Method for Filtering High Low Band Pass", U.S. Provisional Patent Application No. 62/043,23 filed on Aug. 28, 2014, entitled "System and Method for the Waterfall Display", U.S. Provisional Patent Application No. 62/043,026 filed on Aug. 28, 2014, entitled "System and Method for Dynamic Characterization of Fiber Optic Sensor Array", U.S. Provisional Patent Application No. 62/043,029 filed on Aug. 28, 2014, entitled "System and Method for Improved in Situ Measurements Using Fiber Optic Sensor Array", U.S. Provisional Patent Application No. 62/043,031 filed on Aug. 28, 2014, entitled "System and Method for Enhanced Event Identification and Tracking Using Fiber Optic Sensor Array", U.S. Provisional Patent Application No. 62/043,034 filed on Aug. 28, 2014, entitled "System and Method for Improved Identification, Classification, and Prediction of Micro-Seismic and Audible Events Using a Fiber Optic Sensor Array", U.S. Provisional Patent Application No. 62/042,896 filed on Aug. 28, 2014, entitled "System and Method for Demodulating Rayleigh Backscattered Signals", and U.S. Provisional Patent Application No. 62/199,098 filed on Jul. 30, 2014, entitled "System and Method for Fiber Optic Sensing", which applications are hereby incorporated in their entirety by reference.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD OF THE INVENTION

The present invention relates to fiber optic sensing, and in particular to distributed acoustic sensing (DAS). More specifically, it relates to a system and methods that comprise an integrated fiber optic interrogator and an embedded controller.

BACKGROUND

Fiber optic sensors are increasingly being used as devices for sensing quantities such as temperature, mechanical strain, displacements, vibrations, pressure, acceleration, rotations, or chemical concentrations. In fiber optic sensors, light is sent through an optical fiber and the returning backscattered light is analyzed. Changes in the parameters of the returning light, as compared to the input light signal baseline, may be measured and tracked.

By phase differencing the reflected signal with a reference signal, minute changes can be detected; these relate directly to the event that is causing the laser signals to be reflected. As one example, acoustic pressure waves in the vicinity of a fiber cable will impart micro strains on the fiber. These micro strains are proportional to the acoustic pressure waves, essentially imparting the frequency of the acoustic pressure wave into the back reflected signal; this is generally referred to a modulating a signal. Phase differencing the reflected signal allows the signal to be demodulated and the acoustic pressure wave reconstructed. This technology essentially turns a fiber optic cable into a microphone.

A growing usage application field for this technology is a fiber sensing system for remote downhole monitoring of oil wells. Other application fields include physical security, such as homeland security and border monitoring. The list of existing and potential applications for this new technology is long and continues to grow. Managing noise associated with the fiber has proven difficult. For example, reduction of acoustic signals impinging on the system hardware that contribute to what is termed signal noise floor has been difficult.

SUMMARY OF THE INVENTION

Although the best understanding of the present invention will be had from a through reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the detailed description of this application.

Described herein are technologies related to a fiber-optic sensor system that detects perturbations or pressure strain variation in a fiber optic cable by measuring changes in reflected laser light. The system may process telemetry in real-time, record telemetry data for later playback and analysis, and present waterfall displays and audio output for real-time monitoring of threats and situational status. Longer lengths of sensing fiber may be used depending on parameters and sensing methods.

According to examples presented herein, a distributed fiber optic sensing system with increased flexibility and/or utility is described. Methods and systems for distributed fiber optic sensing described herein are directed at mitigating acoustic noise and noise floor in an effort to increase the utility and/or flexibility of the sensing systems. In some configurations, a time-domain reflectometer is described wherein an optical fiber span is the object of the reflectometry, and provides output signals representative of acoustic pressure waves incident the span. Example configurations capable of providing acoustic wave signal sensing lengths of up to the total length a coherent signal that can be detected and demodulated in a round trip are also described. In some examples, acoustic wave signal sensing lengths of up to 40.0 km may be utilized. According to some configurations, a large plurality of sensed events along the span may also be provisioned. In some examples, output signals in the form of a phase signal which varies linearly with the acoustic pressure wave are provided. Other features of the present invention will be apparent from the accompanying drawings and from the detailed description that follows.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred examples, but in addition, include any and all structures, materials or acts that perform the claimed function as described in alternative examples or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently preferred examples of the invention are illustrated in the accompanying drawings, in which.

Figure 1:
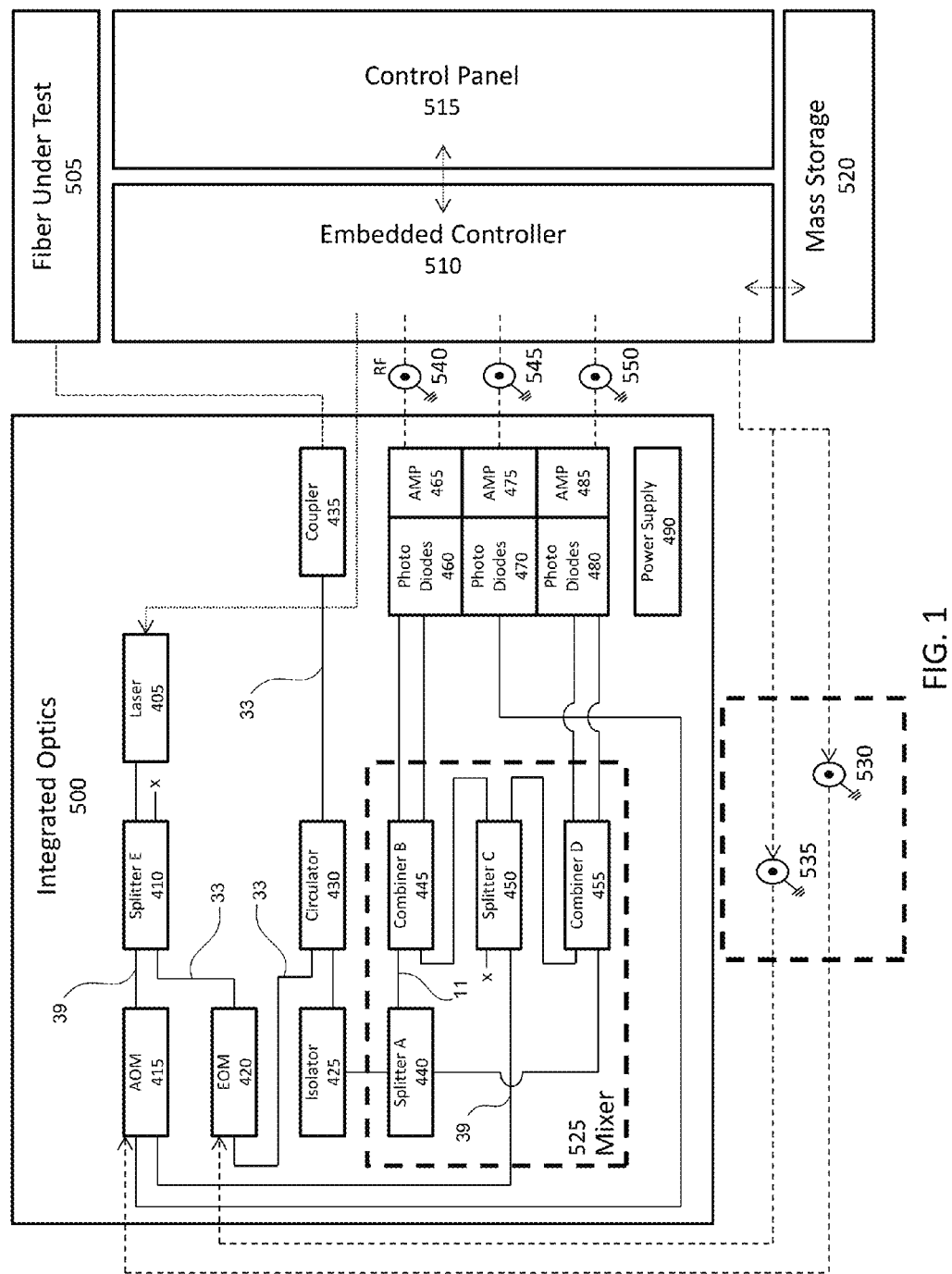
FIG. 1 depicts the base configuration of an integrated fiber optic interrogator and data logger.

Elements and acts in the figures are illustrated for simplicity and have not necessarily been rendered according to any particular sequence or example.

DETAILED DESCRIPTION

In the following description, and for the purposes of explanation, numerous specific details, process durations, and/or specific formula values are set forth in order to provide a thorough understanding of the various aspects of exemplary examples. It will be understood, however, by those skilled in the relevant arts, that the apparatus, systems, and methods herein may be practiced without these specific details, process durations, and/or specific formula values. It is to be understood that other examples may be utilized and structural and functional changes may be made without departing from the scope of the apparatus, systems, and methods herein. In other instances, known structures and devices are shown or discussed more generally in order to avoid obscuring the exemplary examples. In many cases, a description of the operation is sufficient to enable one to implement the various forms, particularly when the operation is to be implemented in software. It should be noted that there are many different and alternative configurations, devices, and technologies to which the disclosed examples may be applied. The full scope of the examples is not limited to the examples that are described below.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

U.S. Provisional Patent Application No. 62/199,098 to Preston, et al, filed Jul. 30, 2015, entitled: System and Method for Fiber Optic Sensing, herein incorporated by reference in its entirety.

"04-1966ra3" (13 pages) by Donald Cheverie dated May 10, 2005, hereby incorporated by reference in its entirety and included as non-patent literature on the submitted information disclosure statement of Aug. 27, 2015 due to minimal publication data of the proprietary document.

"Adelos.3.r.9.6" (29 pages) by Dan Preston dated June 2015, hereby incorporated by reference in its entirety and included as non-patent literature on the submitted information disclosure statement of Aug. 27, 2015 due to minimal publication data of the proprietary document.

"Adelos 1.1 FPGA Architecture Rev 0.6" (43 pages) by John Providenza dated Oct. 30, 2009, hereby incorporated by reference in its entirety and included as non-patent literature on the submitted information disclosure statement of Aug. 27, 2015 due to minimal publication data of the proprietary document.

"Adelos DSP Theory of Operation" (9 pages) by Providenza & Boekelheide, Inc. dated Feb. 23, 2010, hereby incorporated by reference in its entirety and included as non-patent literature on the submitted information disclosure statement of Aug. 27, 2015 due to minimal publication data of the proprietary document.

"Adelos S4 Operations Training v1" (109 pages) PowerPoint presentation. Presented by TerraEchos and GCS Research dated August 2011, hereby incorporated by reference in its entirety and included as non-patent literature on the submitted information disclosure statement of Aug. 27, 2015 due to minimal publication data of the proprietary document.

"Adelos S4 Training Guide" (81 pages) by GCS Research dated August 2011, hereby incorporated by reference in its entirety and included as non-patent literature on the submitted information disclosure statement of Aug. 27, 2015 due to minimal publication data of the proprietary document.

Adelos 2.0/sw/Panel/Tuner2Dialog.cpp (6 pages), hereby incorporated by reference in its entirety and included as non-patent literature on the submitted information disclosure statement of Aug. 27, 2015 due to minimal publication data of the proprietary document.

"Adelos Audio Server Design Document" (3 pages) by Providenza & Boekelheide, Inc. dated Jun. 24, 2010, hereby incorporated by reference in its entirety and included as non-patent literature on the submitted information disclosure statement of Aug. 27, 2015 due to minimal publication data of the proprietary document.

"Adelos Report Software" (18 pages) by Tim Roberts dated Mar. 7, 2010, hereby incorporated by reference in its entirety and included as non-patent literature on the submitted information disclosure statement of Aug. 27, 2015 due to minimal publication data of the proprietary document.

"Adelos Sensor System" (16 pages) by Providenza & Boekelheide, Inc. dated Nov. 19, 2013, hereby incorporated by reference in its entirety and included as non-patent literature on the submitted information disclosure statement of Aug. 27, 2015 due to minimal publication data of the proprietary document.

"Adelos Software Coding Complete" (632 pages), hereby incorporated by reference in its entirety and included as non-patent literature on the submitted information disclosure statement of Aug. 27, 2015 due to minimal publication data of the proprietary document.

APIDS OTR—TELEMETRY Doc. No. 64236/DDL-04-1968, (17 pages) dated Jun. 21, 2004, hereby incorporated by reference in its entirety and included as non-patent literature on the submitted information disclosure statement of Aug. 27, 2015 due to minimal publication data of the proprietary document.

APIDS OTR—TELEMETRY Doc. No. 64236/DDL-04-1968, (17 pages) dated Apr. 19, 2005, hereby incorporated by reference in its entirety and included as non-patent literature on the submitted information disclosure statement of Aug. 27, 2015 due to minimal publication data of the proprietary document.

"Data Grabber Thread, 1 of 2", "Data Grabber Thread, 2 of 2", and "FFT Routine" (3 pages total) by Tim Roberts dated Jan. 29, 2009, hereby incorporated by reference in its entirety and included as non-patent literature on the submitted information disclosure statement of Aug. 27, 2015 due to minimal publication data of the proprietary document.

"Flexible Fiber Sensing Using Virtual Correlation Cells" (14 pages) by John R. Providenza and Tim Roberts dated Dec. 14, 2009, hereby incorporated by reference in its entirety and included as non-patent literature on the submitted information disclosure statement of Aug. 27, 2015 due to minimal publication data of the proprietary document.

"Adelos 2.0 FPGA Architecture v0.1" (36 pages) by John Providenza dated Aug. 6, 2013, hereby incorporated by reference in its entirety and included as non-patent literature on the submitted information disclosure statement of Aug. 27, 2015 due to minimal publication data of the proprietary document.

"Frequency Modulation" Fiber Optics.Info. http://www.fiber-optics.info/articles/frequency_modulation fm. 2 pages PCT Patent Application No. PCT/US1997/009892 to Bridge et al, filed Jun. 6, 1997, entitled: Retroflectively Reducing Coherence Noise in Reflectometers, herein incorporated by reference in its entirety.

"A Unifying Review of Linear Gaussian Models" by Roweis and Ghahramani. 1999. Printed in *Neural Computation* Volume 11, pages 305-345.

"Fiber Couplers" RP Photonics Encyclopedia. http://www.rp-photonics.com/fiber_couplers.html. 3 pages "Telemetry Board Opcodes Version 1" (25 pages) by Dr. Robert M. Payton dated. Oct. 9, 2004, hereby incorporated by reference in its entirety and included as non-patent literature on the submitted information disclosure statement of Aug. 27, 2015 due to minimal publication data of the proprietary document.

U.S. Pat. No. 5,694,408 to Zediker et al, issued Dec. 2, 1997, entitled: Fiber Optic Laser System and Associated Lasing Method, herein incorporated by reference in its entirety.

U.S. Pat. No. 5,847,816 to Zediker et al, issued Dec. 8, 1998, entitled: Fiber Optic Micro-Doppler Ladar System and Operating Method Therefor, herein incorporated by reference in its entirety.

U.S. Pat. No. 5,847,817 to Zediker et al, issued Dec. 8, 1998, entitled: Method for Extending Range and Sensitivity of a Fiber Optic Micro-Doppler Ladar System and Apparatus Therefor, herein incorporated by reference in its entirety.

U.S. Pat. No. 5,956,355 to Swanson et al, issued Sep. 21, 1999, entitled: Method and Apparatus for Performing Optical Measurements Using a Rapidly Frequency-Tuned Laser, herein incorporated by reference in its entirety.

U.S. Pat. No. 6,043,921 to Payton, issued Mar. 28, 2000, entitled: Fading-Free Optical Phase Rate Receiver, herein incorporated by reference in its entirety.

U.S. Pat. No. 7,030,971 to Payton, issued Apr. 18, 2006, entitled: Natural Fiber Span Reflectometer Providing a Virtual Signal Sensing Array Capability, herein incorporated by reference in its entirety.

U.S. Pat. No. 7,142,736 to Patel et al, issued Nov. 28, 2006, entitled: Distributed Fiber Sensor with Interference Detection and Polarization State Management, herein incorporated by reference in its entirety.

U.S. Pat. No. 7,268,863 to Payton, issued Sep. 11, 2007, entitled: Natural Fiber Span Reflectometer Providing a Spread Spectrum Virtual Sensing Array Capability, herein incorporated by reference in its entirety.

U.S. Pat. No. 7,271,884 to Payton, issued Sep. 18, 2007, entitled: Natural Fiber Span Reflectometer Providing a Virtual Phase Signal Sensing Array Capability, herein incorporated by reference in its entirety.

U.S. Pat. No. 7,274,441 to Payton, issued Sep. 25, 2007, entitled: Natural Fiber Span Reflectometer Providing a Virtual Differential Signal Sensing Array Capability, herein incorporated by reference in its entirety.

U.S. Pat. No. 7,565,334 to Rifkin et al, issued Jul. 21, 2009, entitled: Fully Bayesian Linear Regression, herein incorporated by reference in its entirety.

U.S. Pat. No. 8,408,064 to Hartog et al, issued Apr. 2, 2013, entitled: Distributed Acoustic Wave Detection, herein incorporated by reference in its entirety.

U.S. Pat. No. 8,417,490 to Preston et al, issued May 11, 2010, entitled: System and Method for the Configuration of an Automotive Vehicle with Modeled Sensors, herein incorporated by reference in its entirety.

U.S. Pat. No. 8,587,479 to Kurokawa, issued Nov. 19, 2013, entitled: Position Information Detection System and Position Information Detection Method, herein incorporated by reference in its entirety.

U.S. patent application Ser. No. 10/776,832 to Evans et al, filed Feb. 11, 2004, entitled: Active Fiber Loss Monitor and Method, herein incorporated by reference in its entirety.

U.S. patent application Ser. No. 10/711,918 to Tarvin et al, filed Oct. 13, 2004, entitled: System and Method to Interpret Distributed Temperature Sensor Data and to Determine a Flow Rate in a Well, herein incorporated by reference in its entirety.

U.S. patent application Ser. No. 13/221,280 to Hartog et al, filed Aug. 30, 2011, entitled: Distributed Fiber Optic Sensor System with Improved Linearity, herein incorporated by reference in its entirety.

U.S. patent application Ser. No. 13/751,054 to Skinner, filed Jan. 26, 2013, entitled: Distributed Acoustic Sensing with Multimode Fiber, herein incorporated by reference in its entirety.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

In the following examples, references are made to the accompanying drawings which form a part hereof, and in which is shown by way of illustration various examples in which the invention may be practiced. It is to be understood that other examples may be utilized and structural and functional changes may be made without departing from the scope of the invention.

Disclosed herein is a fiber-optic sensor system that is directed at detecting perturbations or pressure strain variation in a fiber optic cable by measuring changes in reflected laser light. In some examples, the system may process telemetry in real-time, record telemetry data for later playback and analysis, and present waterfall displays and audio output for real-time monitoring of threats and situational status. Longer lengths of sensing fiber may be used depending on parameters and sensing methods.

Glossary

There are a number of terms in this document that have unique meanings in the context of this description:

CW—Continuous Wave. A continuous wave is an electromagnetic wave of constant or near constant amplitude and frequency; and in mathematical analysis, of infinite duration.

DAS—Distributed Acoustic Sensing. In DAS, the optical fiber cable becomes the sensing element and measurements are made, and in part processed, using an attached optoelectronic device. Such a system allows acoustic frequency strain signals to be detected over large distances and in harsh environments.

DTS—Distributed Temperature Sensing. DTS are optoelectronic devices which measure temperatures by means of optical fibers functioning as linear sensors. Temperatures are recorded along the optical sensor cable, thus not at points, but as a continuous profile. A high accuracy of temperature determination is achieved over great distances. Typically the DTS systems can locate the temperature to a spatial resolution of 1 m with accuracy to within +1° C. at a resolution of 0.01° C. Measurement distances of greater than 30 km can be monitored and some specialized systems can provide even tighter spatial resolutions.

DTSS—Distributed Temperature and Strain Sensing.

MMF—Multimode Fiber. The primary difference between multimode and single mode optical fiber is that multimode has much larger core diameter, typically 50-100 micrometers; much larger than the wavelength of the light carried in it. Multimode fiber supports more than one propagation mode which limits the fiber by modal dispersion. Due to the modal dispersion, multimode fiber has higher pulse spreading rates than single mode fiber, limiting multimode fiber's information transmission capacity. Single mode fibers are most often used in high-precision sensing applications because the allowance of only one propagation mode of the light makes the light source easier to focus properly.

OTDR—Optical Time-Domain Reflectometer. An optical time-domain reflectometer is an optoelectronic instrument used to characterize an optical fiber. An OTDR is the optical equivalent of an electronic time domain reflectometer. It injects a series of optical pulses into the fiber under test. It also extracts, from the same end of the fiber, light that is scattered (Rayleigh backscatter) or reflected back from points along the fiber. The strength of the return pulses is measured and integrated as a function of time, and plotted as a function of fiber length.

PRC—Pseudo-Random Code. A sequence of reproducible random pulses, produced by a polynomial. A PRC correlates very well with itself, but very poorly when one of the signals being correlated is delayed. The use of a PRC allows one to pick out a particular transmitter when a large number of transmitters are sending the same sequence at different times.

RF—Radio Frequency. Radio frequency is a rate of oscillation in the range of around 3 kHz to 300 GHz, which corresponds to the frequency of radio waves, and the alternating currents which carry radio signals. RF usually refers to electrical rather than mechanical oscillations; however, mechanical RF systems do exist ROS—Rayleigh Optical Scattering. Rayleigh scattering is the (dominantly) elastic scattering of light or other electromagnetic radiation by particles much smaller than the wavelength of the light. The particles may be individual atoms or molecules. Rayleigh scattering results from the electric polarizability of the particles. The oscillating electric field of a light wave acts on the charges within a particle, causing them to move at the same frequency. The particle therefore becomes a small radiating dipole whose radiation can be seen as scattered light.

ROSE—Rayleigh Optical Scattering and Encoding.

Sample—The telemetry readings from one point in time. In some configurations, a sample contains 4,096 16-bit floating point numbers—one for each zone, for each polarization, for each quadrature phase. The Digital Signal Processor (DSP) refers to this as a Telemetry Processing Unit (TPU).

SMF—Single Mode Fiber. SMF is designed to carry light only directly down the fiber—the transverse mode. Modes are the possible solutions of the Helmholtz equation for waves, which is obtained by combining Maxwell's equations and the boundary conditions. These modes define the way the wave travels through space, i.e. how the wave is distributed in space. Waves can have the same mode but have different frequencies. This is the case in single-mode fibers where waves can have the same mode but different frequencies which means that they are distributed in space in the same way, and provide a single ray of light. Although the ray travels parallel to the length of the fiber, it is often called transverse mode since its electromagnetic vibrations occur perpendicular (transverse) to the length of the fiber.

P and S refer to two polarizations of the laser light and are explained further in a later section.

An understanding of three phenomena—two physical (Rayleigh backscattering and fiber stretching), and one mathematical (pseudo-random code) are helpful in understanding the present disclosure.

Rayleigh Backscattering

The laser light source is modulated by injecting a known, repeating pattern. This modulated signal is reflected back to the light origin by Rayleigh backscatter all along the fiber optic cable. Light reflected from a given point will return to the source, with a delay based on the speed of light in the fiber. Assuming the speed of light in the fiber is about 200,000,000 m/s, it will take 100 ns for the signal to travel out 10 meters and reflect back through 10 meters. If the signal is precisely correlated 100 ns after it was transmitted, it will be found within the large number of reflections coming back from the fiber length.

For purposes of explanation, the speed of light in a vacuum is known to be 299,792,458 m/s. Light in a fiber is slowed based on the refractive index of the fiber. At the 1319 nm wavelength produced by the laser, the SMF-28e fiber currently used in some example configurations has a refractive index of 1.4677. That makes the speed of light within the fiber 204,260,038 m/s. For discussion purposes, it will be rounded to 200,000,000 m/s, but in the field it is necessary to remember that this estimate is 2.13% low. When it is said that a zone is 1 meter, the physical reality is that a zone is 1.0213 m. The difference is not important for discussion, but may be important in operation. The analysis software takes this into account when displaying distances.

With the above in mind, Continuous Wave lasers have a distinct advantage over pulsed laser. Pulse modulating a CW laser is not the same as pulsed laser. It is both well understood in the art and to some extent misunderstood. Many inventions in the art of interferometry will falsely label and describe pulse modulated in an effort to traverse certain prior art related to CW. The reality is at long ranges, the best a pulsed laser will achieve is 1 kHz sampling, where CW will allow for much higher rates, e.g. 24 kHz. The following discussion describes the limitations of pulsed laser; all values approximate.

Assume a 50 km cable length and fiber optics roughly ⅓ slower; what is the maximum sampling rate achievable with a pulsed laser, anticipate round trip delay:

Light travels in a vacuum roughly $0.3\ M/1(10^{-9})$ Seconds

Assume a 50 km cable with a 100 km round trip

Since fiber is a third slower, $0.3\ m/1(10^{-9})$ Seconds$*.67=0.2\ m/1(10^{-9})$ Seconds 1 light pulse will take $[100,000/0.2\ m/1(10^{-9})$ Seconds$]$ or roughly $5(10^{-4})$ Seconds per pulse Dividing now 1 second/$5.0\ (10^{-4})$ Seconds per pulse yields a max frequency of roughly 2 kHz with a Nyquist Frequency of 1 kHz.

Shorter distances obviously yield higher sampling rates

As long as the PRN code is not repeated, and coherent signals can be retrieved, sampling can be performed at much higher hates (fidelity) and much longer distances. Also, a second consideration is spatial resolution which is mainly determined by the duration of the transmitted pulse, with a 100 ns pulse giving 10 m resolution being a typical value. The amount of reflected light is proportional to the pulse length so there is a trade-off between spatial resolution and maximum range. To improve the maximum range, it would be desirable to use a longer pulse length to increase the reflected light level but this leads to a larger spatial resolution. In order for two signals to be independent, they must be obtained from two points on the fiber that is separated by at least the spatial resolution. It is possible to obtain samples at separations less than the spatial resolution and although this produces signals that are not independent of each other, such an approach does offer advantages in some applications. The separation between the sampling points is sometimes referred to as the spatial sampling period.

Fiber optic cables are not perfect. They contain a huge number of very tiny imperfections. Those imperfections reflect a small fraction of the light being transmitted through the cable. This reflected light can be measured back at the cable origin source.

Fiber Stretching

The cable sensitivity of fiber affects disturbances detected. Any disturbance near the cable, for instance, buried in the ground, such as footsteps, vehicles, rock falls, voices, etc., sends a small shockwave or pressure wave through the ground. Those small shockwaves disturb the fiber, causing the fiber to stretch microscopically. Those micro-stretches cause the light signal to be delayed slightly, e.g., a phase shift. This delay changes the success of the attempt to correlate the signal at precise delay points. By measuring the changes in correlation, the frequency of the disturbance that impinged on the cable can be determined. The pressure wave impact on the buried fiber optic cable can be referred to as "coupling effect," the physical mechanism of how pressure is transmitted through a medium like soil against the fiber coating. Enhancing and maximizing the coupling is a key to measuring successfully the change in the arrival and departure of light through micro-strains in the fiber optic cable.

The Rayleigh backscatter reflections are at a very low level. To optimize the correlation opportunities, the modulated signal is read at two different polarizations, labeled S and P. The laser is polarized in one direction, but the fiber randomizes the polarization to a certain degree. When one polarization fades away because of conditions in the fiber, the other polarization will tend to rise.

Pseudo-Random Code

A mathematical phenomenon helps to make it possible to use standard fiber and a standard continuous wave (CW) laser. In some example configurations, the hardware generates a non-repeating pseudo-random code (PRC) sequence which is modulated onto the laser at a 100 MHz symbol rate. One aspect of the PRC sequence is that it has very important auto-correlation properties. A code will correlate extremely well with itself if it is exactly phase aligned. If it is poorly aligned, it correlates very poorly.

This is the fundamental principle behind the correlators. As an example: at 100 MHz, the PRC units are sent once each 10 ns. In 10 ns, laser light in the fiber travels approximately two meters—one meter out, and one meter back. Thus, a correlation unit can "look for" a time delayed version of the code that represents a specific section of the fiber. By correlating against the PRC sequence delayed by ten cycles, the correlation unit will get its best match to signals from ten meters down the fiber, and will tend to reject all of the other reflections.

The values used in this description serve as an example. It should be understood that other values may be used depending upon the sensing methods, equipment, system requirements, preferences, and other variables within each system. There are many parameters and sensing methods that can be used in different configurations to meet different requirements.

System Operation

The Fiber Optic Interrogator and Data Logger, depicted in FIG. 1 and referred to herein as the base configuration, comprises a highly integrated and optimized fiber optic interrogator package (integrated optics) 500, embedded controller 510, mass storage 520 of raw data and timing reference, large bandwidth Ethernet for data transfer, control panel 515 software with Ethernet link to the embedded controller 510, and fiber under test 505. In an example, all optical components are optimized in a standalone package based on a JDSU continuous wave (CW) laser. The integrated optical system 500 may include a built-in power supply 490. In some examples the integrated optics 500 may be 3D printed.

The embedded controller 510 sends operating control signals to the laser 405. The laser 405 emits light as a continuous wave (CW) or a pulse modulated signal into splitter E 410 which splits the signal into a reference signal and an interrogation signal. The reference signal is modulated by an acousto-optic modulator (AOM) 415 and the interrogation is modulated by an electro-optic modulator (EOM) 420. A portion of the modulated reference signal from the AOM 415 is transmitted to the integrated and optimized mixer subsystem 525 to splitter C 450. The remaining portion of the modulated reference signal from the AOM 415 travels to photo diodes 470 and into amplifier 475. The modulated interrogation signal from the EOM 420 travels into a circulator 430. The circulator 430 transmits the modulated interrogation signal through coupler 435 and out into the fiber under test 505. A modulated signal is backscattered from the fiber under test 505 back through coupler 435 and into the circulator 430. The modulated signal backscattered from the fiber under test 505 travels through the circulator 430, into isolator 425, then into the signal mixer subsystem 525 at splitter A 440. The signal mixer 525 comprises a plurality of signal splitters and or signal combiners. Splitter A 440 splits the signal into combiner B 445 and combiner D 455. The modulated reference signal from the AOM 415 enters splitter C 450 which splits the signal into combiner B 445 and combiner D 455. Combiner B 445 transmits superimposed waves into photo diodes 460 and then into amplifier 465. Combiner D 455 transmits superimposed waves into photo diodes 480 and then into amplifier 485. Amplifiers 465, 475, and 485 amplify the superimposed waves and transmit them into RF links 540, 545, and 550, respectively which convert them to radio signals and transmits the resultant RF signals to the embedded controller 510.

The embedded controller 510 further transmits control information to the AOM 415 and the EOM 420 through RF generators 530 and 535, respectively. Data is transmitted back and forth between the embedded controller 510 and mass storage 520 as well as between the embedded controller 510 and the control panel 515.

In some examples the fiber under test has a coating thereon made of a thermoplastic material having the combined characteristics of a low Young's modulus and a Poisson's ratio below that of natural rubber, wherein the coating enhances the longitudinal component of strain variation derived from an acoustic wave signal. The fiber under test has a length L and the light source is a laser having the capability to generate a signal with sufficient stability to retain coherency in propagation along the fiber under test for a distance at least equal to two times the length L. The fiber under test may be single mode, multimode, or polarization preserving fiber optic cable.

Referring to FIG. 1, the base configuration further comprises a VMEbus 605. The VMEbus 605 is a non-proprietary computer bus standard that facilitates forward and backward compatibility and multi-processing (1-21 processors). The VMEbus uses asynchronous daisy chain, master/slave architecture. The VMEbus, well known in the art, comprises a number of slots into which modular cards can be inserted. Each modular card adds additional functionality to the embedded controller 510.

Figure 2:
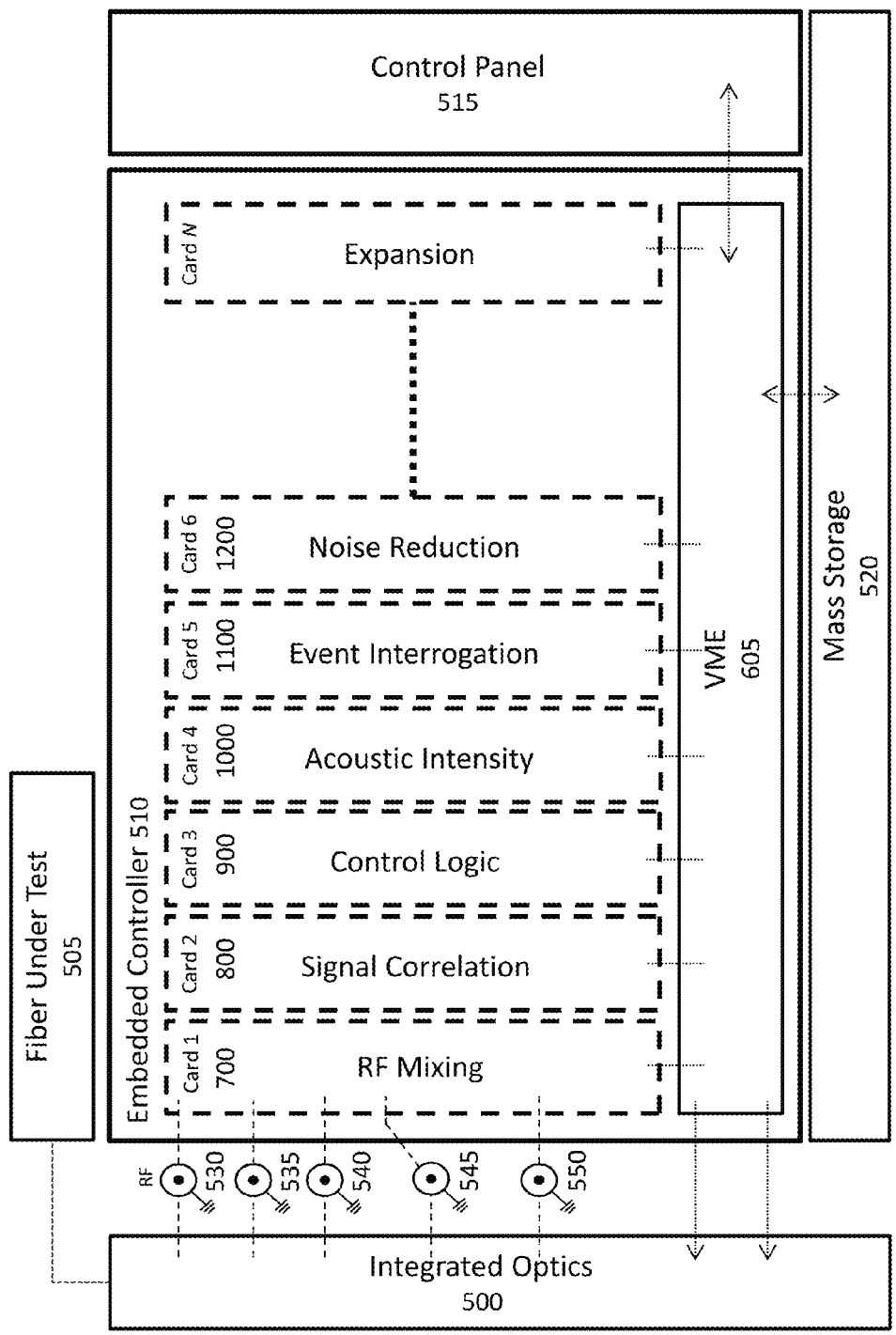
FIG. 2 depicts the base configuration of FIG. 1 equipped with an example assortment of modular cards.

FIG. 2 depicts the base configuration of FIG. 1 equipped with an example assortment of modular cards. The cards shown are radio frequency (RF) mixing 700, signal correlation 800, control logic 900, acoustic intensity 1000, event interrogation 1100, noise reduction 1200, up to card N expansions. In the depicted example the modular cards are numbered 1 to N, however, the purpose of the numbering is merely to aid in the description and does not necessarily reflect priority or order of installation.

Figure 3:
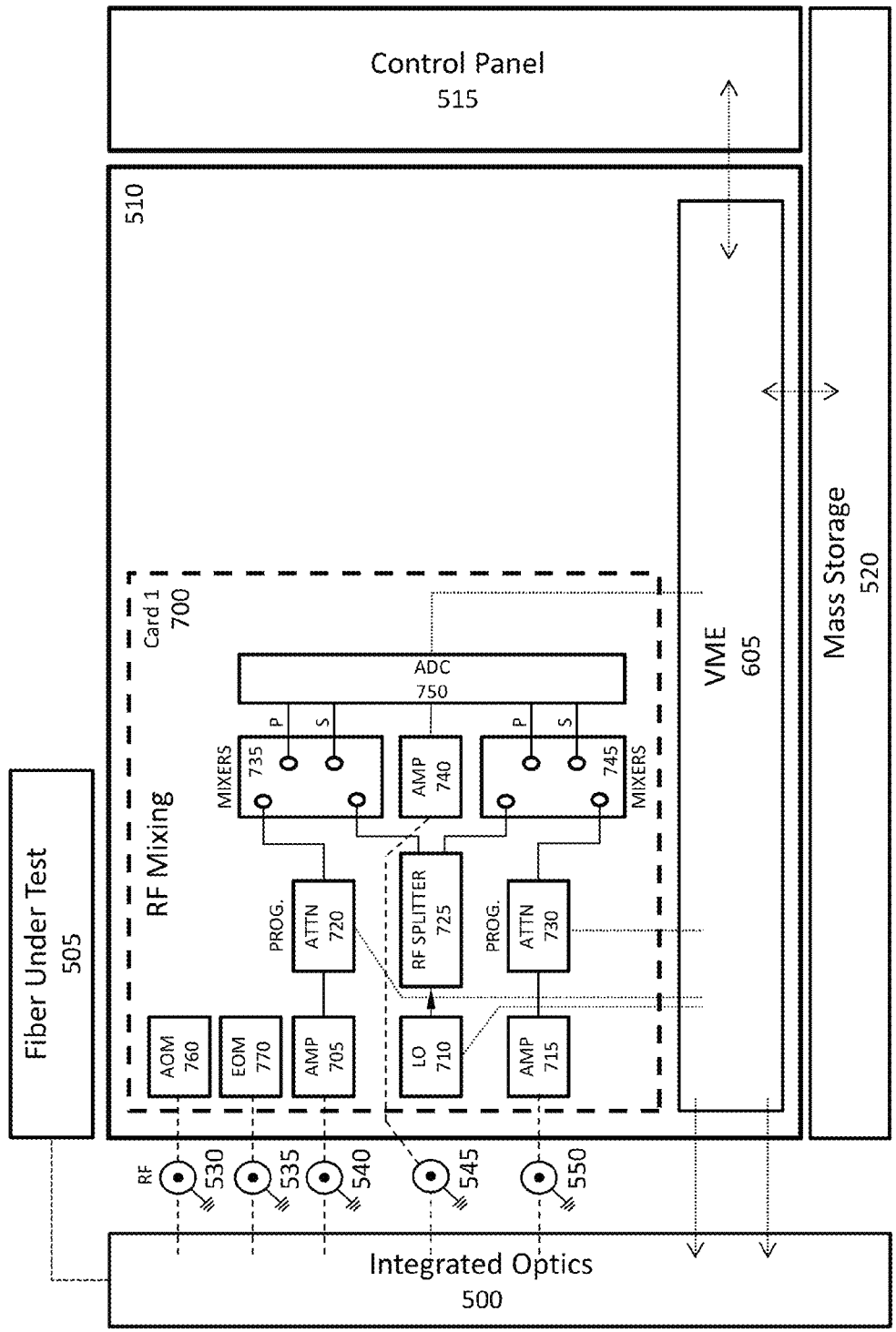
FIG. 3 depicts a first expansion card of FIG. 2—RF Mixing 700 and Analog to Digital Conversion (ADC), referred to herein as Card 1.

FIG. 3 depicts a first expansion card of FIG. 2—RF Mixing 700 and Analog to Digital Conversion (ADC), referred to herein as Card 1. The purpose of Card 1 700 is to retrieve the RF signals from the fiber under test 505 and convert them into digital signals for further processing.

The RF signals enter Card 1 700 from RF links 530, 535, 540, 545, and 550. The RF signals from RF links 530 and 535 transmit data from the AOM RF generator 760 and the EOM RF generator 770, respectively. The RF signal from RF link 545 is the power feedback for laser control. It is amplified through amplifier 740 and passed to ADC 750. Local oscillator 710 outputs a signal that is split by RF splitter 725 and relayed into mixers 735 and 745. In an example, the local oscillator 710 outputs a 900 MHz signal added to a 10 Hz beat frequency. The RF signal from RF link 540 is amplified by amplifier 705, attenuated by attenuator 720, and relayed to mixer 735 where it is mixed with a portion of the signal from local oscillator 710. The signal from RF link 550 is amplified by amplifier 715 attenuated by attenuator 730 and relayed to mixer 745 where it is mixed with a portion of the signal from local oscillator 710.

The mixers 735 and 745 output P and S signals to the ADC 750. The resulting digital signal is sent from Card 1 700 to VME 605 and further forwarded to mass storage 520 and control panel 515. Further information is passed to the VME 605 from the local oscillator 710 and the attenuators 720 and 730.

Figure 4:
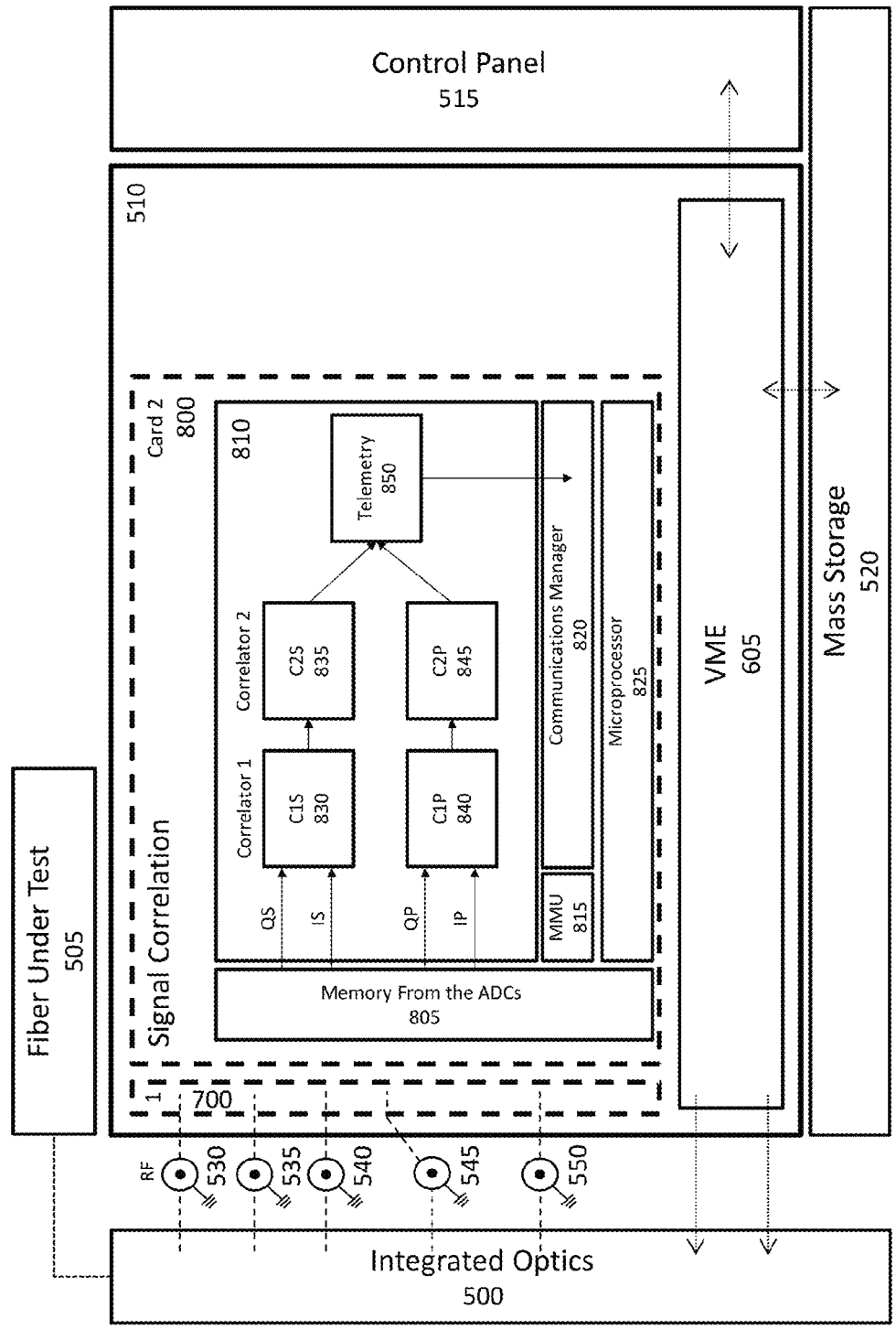
FIG. 4 depicts a second expansion card of FIG. 2—Signal Correlation 800, referred to herein as Card 2.

FIG. 4 depicts a second expansion card of FIG. 2—Signal Correlation 800, referred to herein as Card 2. Card 2 800 uses a digital signal processor (DSP) to take the converted signals from Card 1 700 and correlate them into telemetry information.

To optimize the correlation opportunities, the modulated signal is read at two different polarizations, labeled S and P. The laser is polarized in one direction, but the fiber randomizes the polarization to a certain degree. When one polarization fades away because of conditions in the fiber, the other polarization will tend to rise.

The converted signal data is retrieved from memory 805 and passed into the correlator system 810. The in-phase and quadrature phase S signals (IS and QS) are correlated in a first correlator, C1S, 830 and transmitted to a second correlator, C2S, 835 then to telemetry 850. The in-phase and quadrature phase P signals (IP and QP) are correlated in a first correlator, C1P, 840 and transmitted to a second correlator, C2P, 845 then to telemetry 850. The telemetry information is then transmitted to a communications manager 820. Card 2 800 may also include a microprocessor 825 and a memory management unit (MMU) 815.

Figure 5:
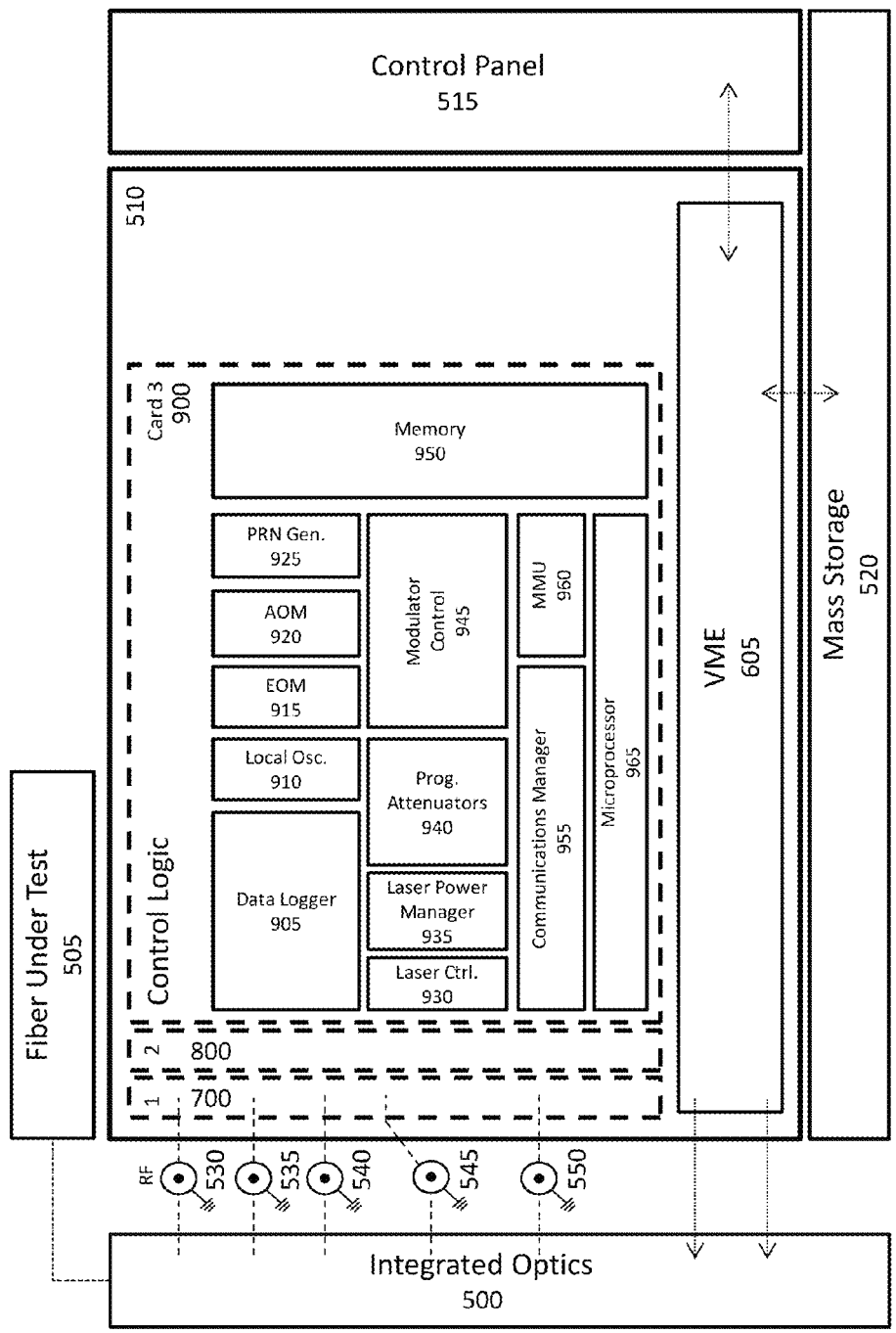
FIG. 5 depicts a third expansion card of FIG. 2—Control Logic 900 and Data Logger, referred to herein as Card 3.

FIG. 5 depicts a third expansion card of FIG. 2—Control Logic 900 and Data Logger, referred to herein as Card 3. Card 3 900 provides control logic to the system components. Card 3 900 comprises data logging logic 905, local oscillator (LO) control 910, EOM control 915, AOM control 920, pseudo-random noise (PRN) generator 925, laser control 930, laser power manager 935, programmable attenuators 940, modulator control 945, memory 950, communications manager 955, MMU 960, and microprocessor 965.

The data logger 905 provides the data logging logic including timestamps and multiplexing multiple signals IQ, IP, SQ, and SP (described further in FIGS. 6 and 7), into one signal and stores the information in binary. The local oscillator (LO) 910, EOM 915, and AOM 920 control logic provides control data to the corresponding hardware components. The pseudo-random noise (PRN) generator 925 provides a PRN code to the AOM. Laser control 930 and laser power manager 935 are used to monitor and control the laser. Programmable attenuator 940 and modulator 945 control the corresponding hardware components. The memory 950 is flash memory. Data is stored in mass storage 520.

Cards 1 through 3 700, 800, and 900 are required for basic data logging purposes. Additional cards are required to process and classify the logged data. Cards 1 through 3 700, 800, and 900 are not integrated into the base system. Allowing them to be modular allows for scaling processing capabilities to project-specific requirements, simple system upgrades, and rapid reconfiguration.

Figure 6:
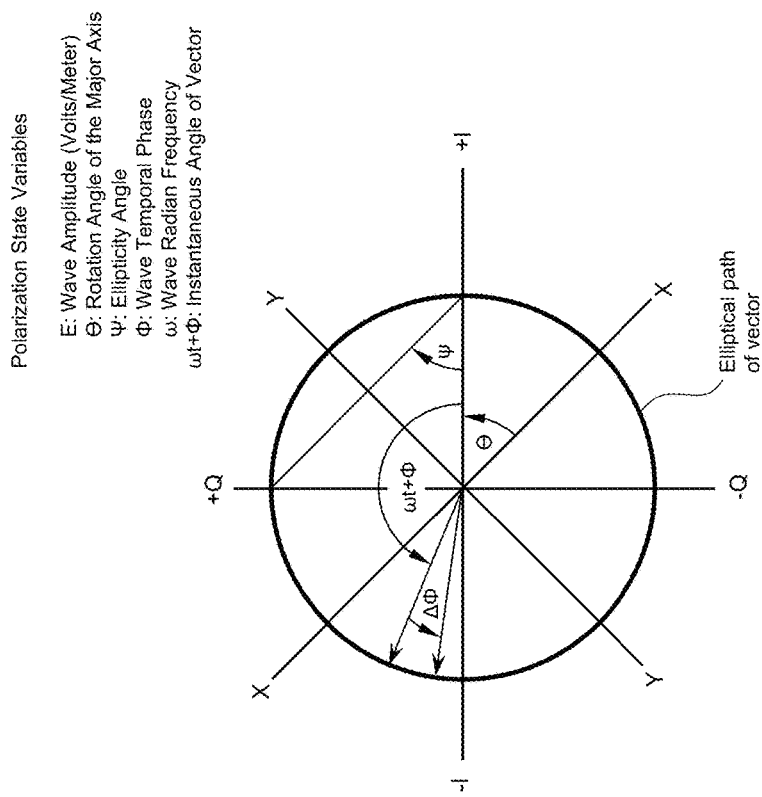
FIG. 6 is a graphical depiction of polarization.

The beat signal produced by the demodulation causes the phase of the vector to rotate through 360 degrees. In an ideal system with no impetus, the vector length would remain constant, describing a circle, as depicted in FIG. 6. This attribute is used to normalize the signal processing. Depending on the optional cards installed, this data may be monitored on the user interface in the form of Lissajou curves. Assigning the phase data to Cartesian coordinates with the in-phase (I) value as the x-axis and the quadrature phase (Q) value as the y-axis allows for conversion of each correlation value to a vector using an arctangent. The change in the angle of that vector ($\Delta\Phi$) from sample to sample yields the relative change in correlation strength, phase, for that particular zone. The result is the audio reading for the sample. The length of the vector indicates the power for the sample. Generally, the algorithms depicted in FIG. 6 are known in the art and are included as illustrative examples.

Figure 7:
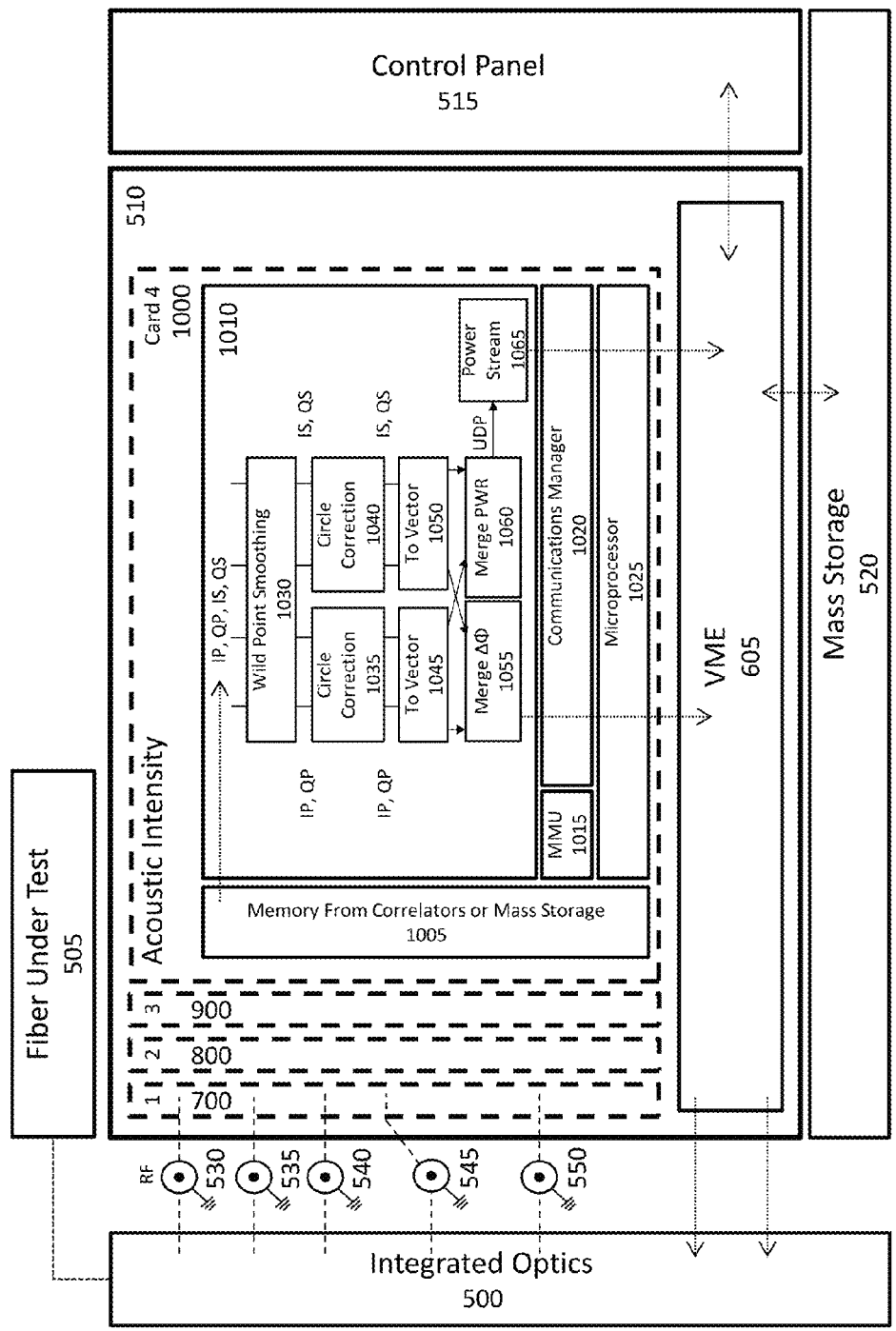
FIG. 7 depicts a fourth expansion card of FIG. 2—Acoustic Intensity 1000, referred to herein as Card 4.

FIG. 7 depicts a fourth expansion card of FIG. 2—Acoustic Intensity 1000, referred to herein as Card 4. The purpose of Card 4 1000 is to manage acoustic event intensity.

Telemetry data is retrieved from memory 1005 from one of the correlators or mass storage 520. The telemetry data, IP, QP, IS, and QS (where IP and QP represent quadrature data, 90° out of phase, for the "parallel" polarization from the fiber and IS and QS represent quadrature data for the "perpendicular" polarization), is passed through wild point smoothing 1030 to eliminate noise and fill in missing values, providing a cleaner output signal.

Once the signal has been smoothed, the P signal data and the S signal data proceed through separate circle corrections 1035 and 1040, respectively and then to vector 1045 and 1050, respectively. Change in phase ($\Delta\Phi$) data 1055 and power data 1060 is then merged from information obtained from both vectors 1045 and 1050. The resulting power and $\Delta\Phi$ data are the basis for the remainder of the signal processing. Change in phase data ($\Delta\Phi$) 1055 is transmitted to the VME 605.

Power data 1060 is transmitted via user datagram protocol (UDP) packet to power stream 1065 and finally to VME 605. Card 4 1000 may also include a microprocessor 1025, communications manager 1020, and a memory management unit (MMU) 1015.

Figure 8:
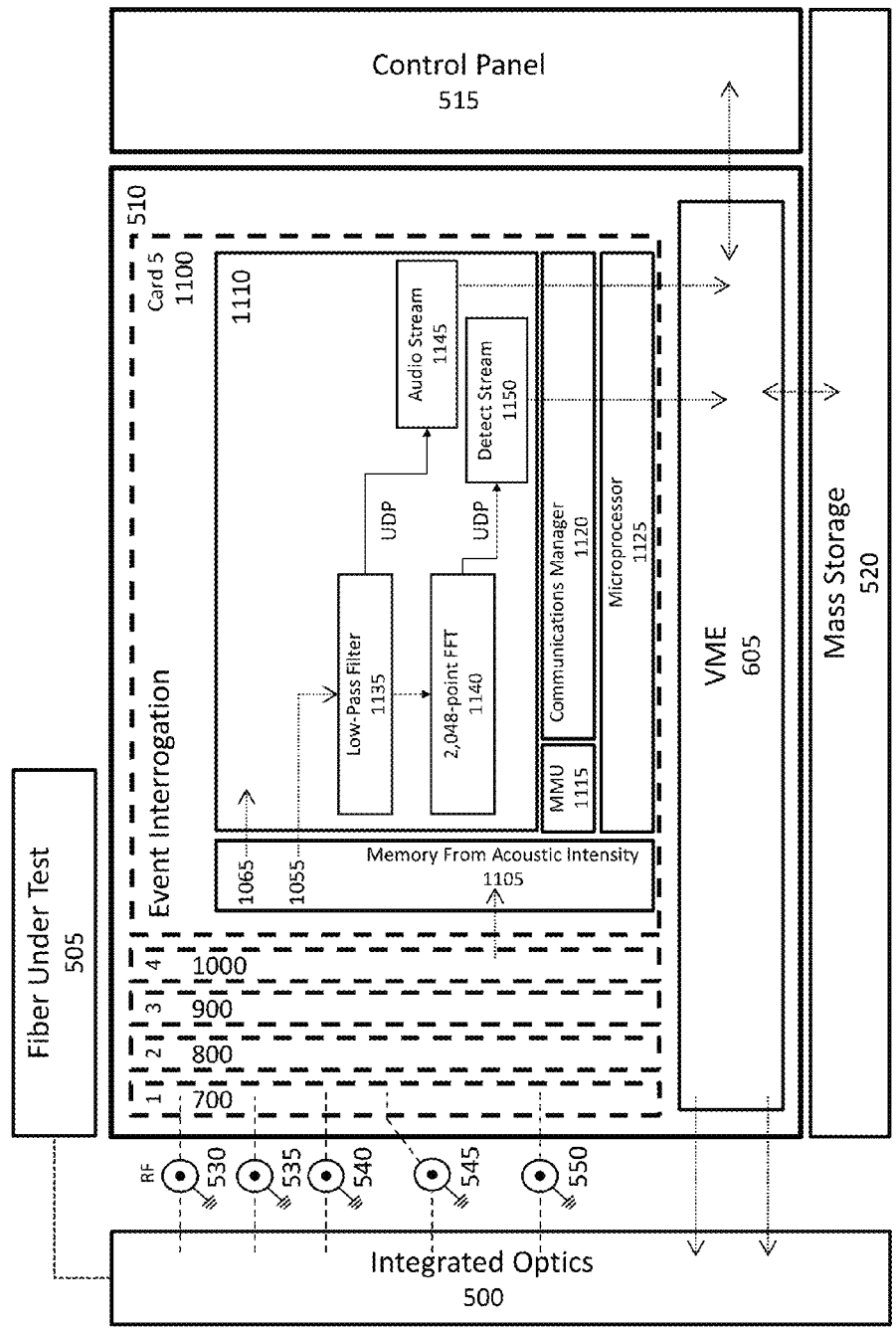
FIG. 8 depicts a fifth expansion card of FIG. 2—Event Interrogation 1100 and Demodulation, referred to herein as Card 5.

FIG. 8 depicts a fifth expansion card of FIG. 2—Event Interrogation 1100 and Demodulation, referred to herein as Card 5. Card 5 1100 provides additional functionality to Card 4 1000.

Change in phase data ($\Delta\Phi$) 1055 is retrieved from memory 1105 from one of Card 4 1000 or from mass storage 520. The $\Delta\Phi$ values from the two polarizations are combined in proportion to the power readings. The resulting power and $\Delta\Phi$ are the basis for the remainder of the DSP processing, which produces a series of products on various UDP ports, for consumption by other applications. The change in phase data ($\Delta\Phi$) 1055 is passed through low-pass filter 1135 to attenuate noise. In an example, the low-pass filter 1135 attenuates outside the range of 18 Hz to 300 Hz. The filtered signal is sent via UDP packet to the audio stream 1145.

A Fast Fourier Transform (FFT) 1140 is then performed on the change in phase ($\Delta\Phi$) 1055 values. The power spectrum of the FFT 1140 is computed and the standard deviation of the power spectrum is compared to the average power spectrum over time. The standard deviation becomes the detector data stream and can be used by other data analysis software as a first-order estimate of the level of activity in the corresponding zone. By monitoring the values over time and comparing the values to adjacent zones, analysis software can get a first indication that an event has occurred. Card 5 1100 merely indicates that an event has occurred—additional cards are necessary to process and classify the event. In an example, the FFT 1140 is run on 2,048 points. This number of points processed by the FFT 1140 limits resolution for feature discrimination in the detector stream. From the FFT 1140 the signal data is passed via UDP packet to the detect stream 1150. The resulting information is passed from the audio stream 1145 and the detect stream 1150 to the VME 605. Card 5 1100 may also include a microprocessor 1125, communications manager 1120, and a memory management unit (MMU) 1115.

Audio data are produced by subtracting the ΔΦ values for any two zones. When the fiber stretches, the light is delayed from that point all the way down the fiber. Thus, the audio reading for the zones at the end of the fiber includes all of the stimuli that occurred on the entire length of the fiber. By subtracting the zone X value from the zone Y value, one gets only the stimuli that occurred between zone X and zone Y. In an example, audio streams can be produced for two or more zone pairs at a time.

Figure 9:
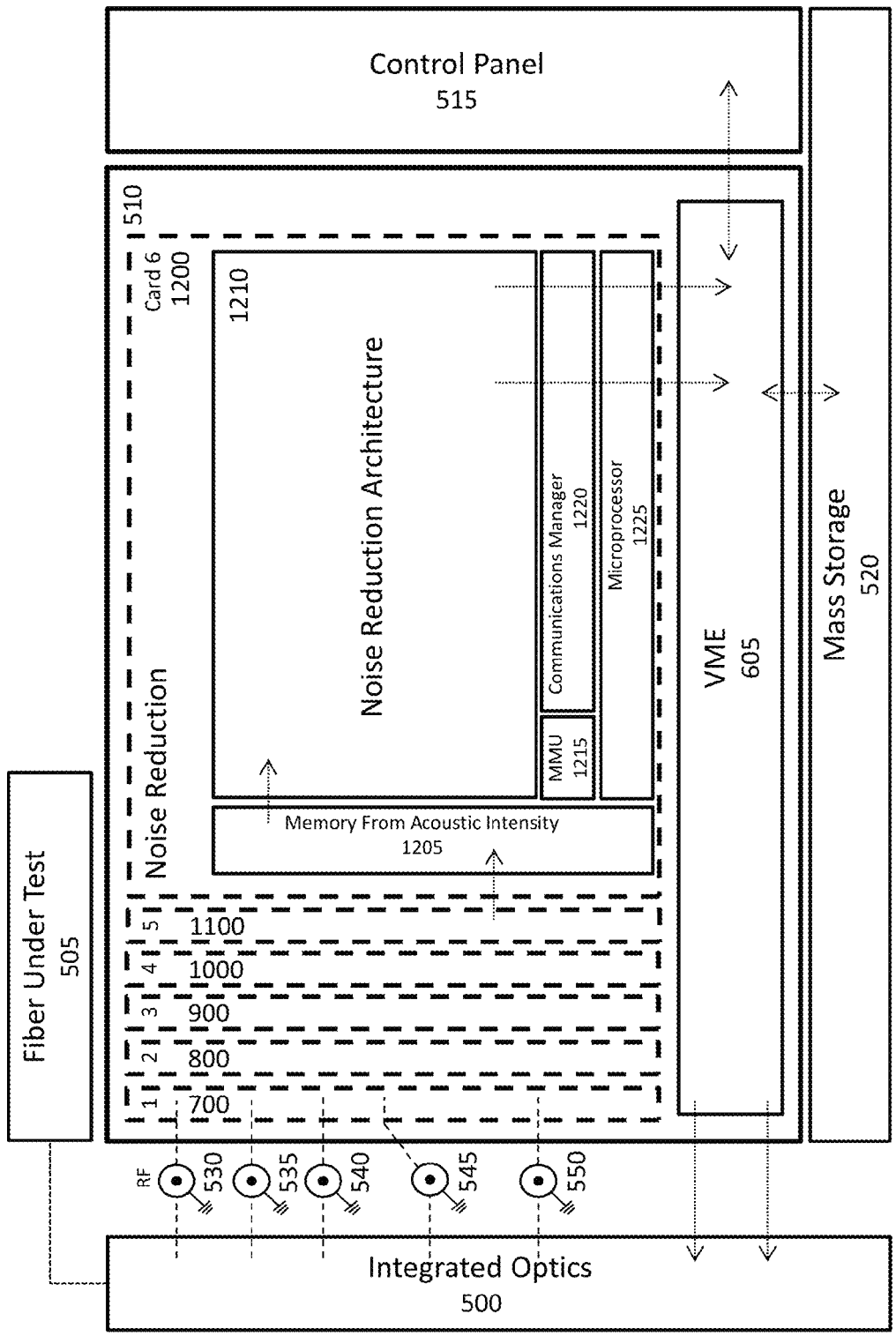
FIG. 9 depicts a sixth expansion card of FIG. 2—Noise Reduction 1200 and Classification, referred to herein as Card 6.

FIG. 9 depicts a sixth expansion card of FIG. 2—Noise Reduction 1200 and Classification, referred to herein as Card 6. The purpose of Card 6 1200 is to reduce signal noise to provide cleaner signal output. Cleaner signal output allows for more accurate classification of events. The signal is passed to Card 6 1200 from memory 1205 from one of Card 5 1100 and mass storage 520 to noise reduction architecture 1210 where it is processed and passed to the VME 605. Card 6 1200 may also include a microprocessor 1225, communications manager 1220, and a memory management unit (MMU) 1215.

An interrogation light wave source may be generated by modulating the amplitude, phase, or polarization of a coherent light wave with a time-structured correlation code. The correlation code can be a series of pulses, chirps, binary sequences, or any other type of code which provides the required correlation characteristics. Therefore, delaying the correlation decoding/de-multiplexing function allows de-multiplexing of delay multiplexed signals identifiable by speed of propagation and distance of flyback travel.

Referring now to the integrated optics 500 of FIG. 1 in more detail, a laser 405 launches an interrogation signal into fiber under test 505 and retrieves light wave back propagation from a continuum of locations along the fiber span 505. Back propagation mechanisms may include Rayleigh Optical Scattering (ROS) and other effects generated within the optical fiber 505. ROS in an optical fiber 505 backscatters light incident upon the fiber 505. The incident light travels down the optical fiber 505 to the scattering point/region. At the scattering region the incident light is backscattered back up the optical fiber 505. As the light travels the round trip optical path (i.e., distance of flyback travel) any disturbances of the fiber 505 which increase or decrease the optical path length will cause the phase of the incident and backscattered light to be modulated. Suppose a pressure is applied to the optical fiber 505. The pressure elongates the path length of the light traveling through the region.

The backscattered wave arriving back at an optical coupler 435 from ROSE fiber optic array 505 passes into circulator 430. The backscattered light which arrives at circulator 430 is the summation of all light backscattered from a continuum of locations along the length of the ROSE fiber optic span 505.

Furthermore, the phase of the channel output at a first location will be the summation or integration of all pressure changes along the bi-directional path. This unusual phenomenon has been demonstrated with experimental hardware. Once the correlation process isolates the optical signal originating from a spatial region, the signal must be phase demodulated to extract the pressure information.

Examples described herein also apply to point-wise non-distributed sensors or artificially generated multiplexing by electronics means. The interrogation light wave can be intercepted and retransmitted back to the receiver with an artificial, electronically generated delay, as a means of delay/correlation multiplexing many channels. More particularly, the propagation of the optical spread-spectrum interrogation signal down the continuous full span of the optical fiber span 505, signal launch end to remote end, causes a back-propagating composite optical signal, which is the linear summation, or integration spatially, of all of the individual, continuous, or continuum of back-reflections along the span of the optical fiber 505.

One component of this composite signal is comprised of the naturally occurring continuum of optical back reflections (ROSE) of the optical spread spectrum carrier signal that is formed by modulating the primary carrier signal by the spectrum spreading signals. Another component is comprised of the artificially occurring optical back reflections, either-point wise reflections or distributed reflections, of the optical spread spectrum carrier signal that is formed due to propagation discontinuities as the result of presence of a fiber cable coupler 435 in span 505. Still another component comprised of the continuum of modulations at locations along the span of the reflected signals due to longitudinal components of optical path length change, causing a delay in the reflected signal, experienced by the fiber optical span 505 along its length.

Such optical path length change or delay may be caused by a variety of possible sources including acoustic pressure waves incident to the fiber 505, electromagnetic fields coupled to the fiber 505, mechanical strain or pressure on the fiber 505, thermal strain or pressure induced in the fiber 505, or other means of causing change in the optical path length. Use of the acoustic pressure waves mode of changing path length in perimeter intrusion monitoring systems is the principle example illustrated herein. In this use, optical fiber span 505 is employed to provide an array of virtual geophones buried at a range of depths beneath the surface of the ground of about between six to eighteen inches, to sense motion of an object on the surface of the ground. The acoustic pressure wave sensing mode is also useful to sense seismic signals, as for example as linear arrays inserted into casing structures of existing oil wells. Predetermined artificial pressure wave producing shocks are imparted into the ground, and the responses from the sensor are used to locate secondary oil deposits. The acoustic pressure wave sensing mode is further useful for employing span 505 as an array of virtual hydrophones, with the media which couples the signals to the hydrophones at least in part being the body of water in which the array is immersed. Such hydrophone arrays find use as naval undersea warfare towed arrays, or towed geophysical exploration arrays. In the latter the arrays respond to artificially produced shocks of predetermined character and location induced in the body of water, and the response of the array to bottom return signals are used to locate ocean bottom geophysical feature indicating likely presence of an oil deposit. Yet further, a sensing position on a fiber span 505 could be used to receive as input microphonic signals suitably imparted to the region of the sensing position. The electromagnetic field sensing mode of fiber span 505 could be used for monitoring electronic signals along a telecommunication cable's span to localize malfunctions. Responses of fiber span 505 to mechanical, pressure or thermal strains can be used in systems for monitoring such strains.

An alternate example of fiber 505 is to provide fiber of a polarization preserving or single polarization, optical fiber. The polarization preserving fiber of this type holds the backscattering light in a narrow range of polarization states so that a substantially single RF signal enters a single set of correlators, reducing the complexity of the system.

The correlation code generator creates a signal that has a broad bandwidth. The broadband nature of the correlation code is required to obtain the desired properties in the signals autocorrelation function. The calculation and definition of the autocorrelation function of any general signal is well known and defined in signal processing literature. The correlation code signal is structured such that its autocorrelation function is highly peaked at zero delay, and is very small away from zero delay. This criterion is well known to those of skill in the art and is the essence of why the correlation code has a broad bandwidth. Any signal that has the desired autocorrelation function properties can be used as the correlation code. There are many reasons for choosing one correlation code over another: ease of creation; autocorrelation properties; cost of creation hardware; cost of correlation hardware; and effectiveness in producing spread spectrum signal effects. In some configurations, the correlation code can be a binary sequence with a desired transorthogonal autocorrelation property (sometimes called a pseudonoise sequence), a pseudorandom number (PRN) sequence with the desired autocorrelation property, chirps, or other types of signals which provide correlations code having predictable non-repetitive behavior. The foregoing list of types of sequence signals which may be employed to modulate the carrier light wave signal includes both "binary pseudonoise sequences" and "pseudorandom number (PRN) sequences." For purposes of construction of this specification and the appended claims, these terms are employed as they are defined under the listings "Pseudonoise (PN) sequence (communication satellite)" and "Pseudorandom number sequence" at pages 747 and 748 of the "IEEE Standard Dictionary of Electrical and Electronic Terms" (Fourth Edition), which listings are herein incorporated by reference in their entirety. Further for purposes of construction of this disclosure, it is deemed that "binary pseudonoise sequence" is generic and "pseudorandom number sequence" is a species thereof. Still further for purposes of construction of this disclosure, both terms are deemed to include analog signal forms of sequences as well as digital signal forms.

The temporal length of the code sequence which is reiteratively produced by generator may be either less than the time period for propagation of a light wave to the remote end of span and propagation back of a backscattering (i.e. distance of flyback travel), or greater than this time period. It cannot be equal to this period.

Refer to FIG. 1. The local oscillator and composite light waves are interfered on photo diodes 460, 470, and 480 producing an electronic signal which electronically represents the heterodyned optical interference power between the two light waves. The resulting composite radio frequency signal at outputs from the amps 465, 475, and 485 represent electronically the composite light wave signal. The composite electronic receiver signal is passed to the correlator system (FIG. 4). The local oscillator light wave on optical path 39 is interfered with the composite light wave on optical path 11. The interference power is photo-detected in photo diodes 460, 470, and 480 by optically interfering with the composite back propagating light wave on the local oscillator signal. As one of the components of this interfering action, there is produced a difference beat signal which is a composite radio frequency representation of the composite light wave on optical path 11.

This interfering of the local oscillator 710 (FIG. 3) output light wave and the composite back-propagating CW light wave 11 provides the translation of signal 11 from the optical domain to a CW radio frequency (RF) composite difference beat signal output from the amps 465, 475, and 485. This reduces the frequency of signal into an electronically processable signal frequency range. It is to be appreciated that that the RF composite difference signal produced by this translation action includes having counterpart components of the aforesaid components of the composite back-propagating light wave signal, with the phase states of these counterpart RF domain signals the same as the phase states of the corresponding components of the back-propagating light wave.

In some examples, more than one light source is used. The lasers are to have sufficiently stringent high performance capability with respect to exactness of frequency to enable interference effects there between and heterodyne detection of acoustic perturbation signals incident to fiber 505 to produce beat frequencies within the radio frequency (RF) range. Also in accordance with the examples presented, lasers have stringent performance criteria with respect to the phase stability, or coherence, of their beams. They are to be substantially coherent over at least a propagation path distance substantially equal to twice the length, L, of sensing fiber 505.

Each of the programmably selectable pairs of differenced phase signals form a signal which is spatially bounded within the region of the fiber between zones. The phase differencer therefore produces differential phase outputs corresponding to a set of virtual sensors with programmable length and position.

Stated another way, each programmable selection of pairs of phase signals forms a virtual spatial differential sensor which senses the difference between the phases of the output of the photo diodes 460, 470, and 480. Each output is an RF difference beat signal representative of the aforesaid "still another" component of the composite back-propagating CW light wave signal which passes from the launch end of fiber span 505 to directional coupler 435. These signals from each pair therefore represent signals of virtual spatial differential sensors along fiber span 505. As a result of the choice of pairs being selectively programmable these virtual sensors can be employed to implement adaptive apertures in processing signal incident the fiber span 505. This feature would be useful, for example, in enabling security system operators to classify objects causing acoustic pressure wave signals incident up a fiber span 505 used as a perimeter intrusion monitoring line.

Referring to an example of FIG. 4, the composite radio frequency signal, or RF composite reference beat signal, which electronically represents the received time-delay multiplexed optical signal, or composite back-propagation CW light wave is input into the correlator system 810. The composite radio frequency signal is n-way split with power splitter into a plurality (which can be multiple thousands or more) of electronic pathways. The master correlation code is input into the correlator system 810. The correlation code is distributed to such a plurality of programmable delay circuits. Each programmable delay circuit delays the master correlation code by the delay required to decode/de-multiplex each time-delay multiplexed channel. The plurality of programmable delay circuits output a plurality of delayed correlation codes. Each of the outputs therefore produces the corresponding de-multiplexed signal which is time-gated by the corresponding time-delay of the correlation code.

These spatial delays are based on the time of propagation for flyback travel along these distances, which are arbitrary and programmable. The time delay multiplexing of the optical signals comprising the composite back-propagating optical signal arise from a plurality of spatial locations causing a like plurality of time-delays. The correlator system spatially separates the components of the RF composite difference beat signal into channels which each uniquely represent an optical signal at a single spatial location. The correlator system allows the spatial sampling of the optical signals so that a virtual array can be formed along the fiber span 505 on FIG. 4

As an alternative to the viewpoint inferable from the preceding sequence discussing FIG. 4, integrated optics 500 may be considered as partitioned into: (i) an optical network for illuminating an optical fiber sensing span, or other light propagation medium sensing span, and retrieving back propagating portions of the illumination; and (ii) a photoelectronic network for establishing virtual sensors at predetermined locations along the span and picking up external physical signals incident to, or impinging upon, the sensors.

In general, the optical network for the illumination of and for the retrieval of back-propagation from, fiber span 505 comprises transmitter laser 405, directional optical coupler 435, and optical fiber, or other light propagation medium 505.

The photoelectronic network for establishing virtual sensors and picking up signals therefrom generally comprises two subdivisions. One subdivision provides a cyclically reiterative autocorrelatable form of modulation of the light wave illuminating fiber span 505. This modulation is in the form reiterated sequences having autocorrelatable properties. The other subdivision takes the retrieved back propagation and performs a heterodyning therewith to obtain an RF beat signal. It then picks up the signal from the virtual sensors by autocorrelation and further processes it into more useful forms.

In general, the subdivision providing the cyclical reiterative modulation of sequences illuminating fiber span 505 comprises a master correlation code generator (via one of its electrical pathway outputs) and electro-optical modulator 420.

According to an alternate example, the system elements which perform the autocorrelation enable providing an output in the form of an RF counterpart of a light wave time-domain reflectometry output of signals incident to the virtual sensors as light wave time domain reflectometry outputs a CW light wave modulated by a continuously reiterated binary pseudorandom code sequence is launched into an end of a span 505 of ordinary optical fiber cable. Portions of the launched light wave back propagate to the launch end from a continuum of locations along the span 505 because of innate fiber properties including Rayleigh scattering. This is picked off the launch end and heterodyned to produce an RF beat signal. The RF beat signal is processed by a plurality (which can be thousands) of correlator type binary pseudonoise code sequence demodulators respectively operated in different delay time relationships to the timing base of the reiterated modulation sequences. The outputs of the demodulators provide RF time-domain reflectometry outputs representative of signals (e.g., acoustic pressure waves) incident to virtual sensors along the fiber at positions corresponding to the various time delay relationships.

According to an alternate example, the system elements performing the autocorrelation enable detection of unique spectral components representing phase variations of external signals incident to the virtual sensors. A CW light wave modulated by a continuously reiterated pseudorandom code sequence is launched into an end of a span 505 of ordinary optical fiber cable. Portions of the launched light wave back propagate to the launch end from a continuum of locations along the span 505 because of innate fiber properties including Rayleigh scattering. This is picked off the launch end and heterodyned producing an RF beat signal. The RF beat signal is processed by a plurality (which can be thousands) of correlator type pseudonoise code sequence demodulation and phase demodulator units, operated in different time delay relationships to the timing base of the reiterated modulation sequences. These units provide outputs representative of phase variations in respective unique spectral components in the RF beat signal caused by acoustic, or other forms of signals, incident to virtual sensors at fiber positions corresponding to the various time delay relationships.

According to an alternate example, a pair of the different delay time relationships of the autocorrelation system elements are effective to establish a virtual increment of the optical fiber span, and that a substractor (where the substractor is a circuit that is capable of subtracting numbers, in particular, binary) circuit of a phase differencer (where the differencer is used to determine differences between the signals) enables representing the differential phase signal across the virtual increment. A CW light wave modulated by a continuously reiterated pseudorandom code (PRC) sequence is launched into an end of a span of ordinary optical fiber cable. Portions of the launched light wave back propagate to the launch end from a continuum of locations along the span because of innate fiber properties including Rayleigh scattering. This is picked off the launch end and heterodyned producing an RF beat signal. The RF beat signal is processed by a plurality (which can be thousands) of correlator pseudonoise code sequence demodulation and phase demodulator units operated in different delay time relationships to the timing base of the reiterated modulation sequences. Pairs of outputs of the units are connected to respective substractor circuits, each providing a signal representative of phase differential of incident acoustic signals, or other forms of signals, across virtual increments of the span established by a pair of said delay time relationships.

In an example, ROSE fiber optic sensors may be interrogated, and the spatial sorting and separation of the temporal optical phases of backscattered optical signals arising from a plurality of virtual optical sensors along fibers or other optical mediums. An example configuration enables the spatial decoding of backscattered optical signals with a bandwidth of tens of kilohertz. An example also enables the sensor locations along the fiber to be programmable, and allows the electronic separation or segmentation of the array of fiber sensors into programmable bounded lengths and positions. Because the correlation signal can be designed to be a continuous wave, example configurations increase the average optical power considerably over conventional pulsed optical phase sensor interrogation methods. Because the correlation signal can be chosen to have spectrum spreading properties for which despreading (where despreading means to recombine signals that have been spread or distributed) electronic circuitry is readily available, optical fiber system noise, such as reflection discontinuity noise due to cable couplings, can be materially attenuated.

Example configurations provide a new capability of heterodyne optical phase detection without resorting to dithered phase carrier methods. The phase demodulation method introduces heterodyne I & Q demodulation to produce cosine and sine phase components, clipped signal amplitude stabilization techniques and digital signal processing based phase detection. The spatially differential phase detection method described enables the rejection of unwanted lead-in fiber phase signals.

Distributed acoustic sensing using multimode fibers is performed using essentially the same methods as with single mode fibers. Narrowband pulses of laser light are generated in an optical source and the light is launched through a beam splitter or coupler into the sensing fiber. In the multimode sensing fiber, the light pulses undergo coherent Rayleigh backscattering and are reflected back, toward the optical source. When the backscattered pulses reach the beam splitter or coupler, they are directed towards one or more photodetectors via a multimode return fiber rather than being allowed to return to the light source. Light leaving a fiber, either single mode or multimode, exits in a characteristic cone related to the fiber's numerical aperture. An optional lens may be positioned between the terminal end of multimode return fiber and the photodetector(s) in order to better control the spreading of the beam as it exits fiber. Data signals from the photodetector(s) is fed via amplifiers and data acquisition modules to a signal processing module that performs DAS signal analysis using techniques known in the art.

The distance between the photodetector(s) and the terminal end of fiber or lens is predetermined by testing such that only one or a few modes are detected. Limiting the number of modes received by the photodetector(s) improves the contrast of the interference signals produced by coherent Rayleigh scattering and makes possible the use of multimode optical fibers in DAS. In an alternate example the distance may be either automatically or manually adjustable to achieve optimum performance.

DAS signals are notorious for optical fading, where the signal strength is time dependent due to slowly varying changes in the fiber that result in changes in the optical path length between the interfering Rayleigh scatterers in the fiber. By using a tested and preselected distance in conjunction with the photodetector(s), and thereby detecting one or a small number of modes, the system can be optimized for the photodetector(s) to generate the best signal for DAS analysis. Multiple detectors can be used to ensure that good quality signals are received along the entire fiber by using a combination of detectors that individually measure good quality signals only at limited locations along the sensing fiber. Multiple detectors, each responding to a single mode or a few modes, can eliminate signal fading.

Controller Software

Referring to FIGS. 1 through 4, the integrated fiber optic interrogator 500 is separated it an interface by digital or analogue links. In an example, the input to the embedded controller 510 is a digital signal generated by the outputs of the photodiodes 460, 470, and 480, these are received on one of more RF links 540, 545, and 550 at an ADC 750, and the output of the ADC 750 is an 800 Mbps telemetry stream 850.

The stream 850 consists of UDP packets, where each packet consists of 1,024 correlator count readings for each of the four polarization/phase combinations (IP, QP, IS, QS. Where IP and QP represent quadrature data, 90° out of phase, for the "parallel" polarization from the fiber and IS and QS represent quadrature data for the "perpendicular" polarization). The values produced by the hardware correlators 810 are 28-bit integers, but the individual readings are represented in telemetry 850 in 16-bit IEEE half-precision floating point. This format gives 10 bits of precision with a wide dynamic range, and suits the correlator data very well.

The embedded controller 510 in the example has the ability to record the raw telemetry data (raw binary) directly to disk, before any filtering or post-processing is done. This is a critically important function because it allows the stream to be replayed at a later time, producing exactly the same results as if the stream were being read in real-time. This allows for a wide variety of experimentation in advanced signal processing and classification needs. The mass storage system 520 in the embedded controller 510 computer must be chosen and configured carefully in order to handle a continuous output of 100 MB/s, while still handling all of the data processing and display requirements of the embedded controller 510.

The transmission of telemetry 850 as broadcast UDP packets on a standard Ethernet fiber makes it possible to connect other cards to the local telemetry network and have other applications consume the telemetry data for special purpose analysis. Many other applications are possible including, as an example, a variety of advanced signal processing algorithms or classification schemes to meet a variety of customer requirements.

In an example, the input to the embedded controller 510 is the telemetry data stream 850 on UDP port 5001 coming out of the hardware. The data stream consists of blocks 64,800 bytes long, which arrive 612 times per second. Each block, referred to in the source as a "gram", consists of twenty samples, called a telemetry processing unit (TPU). Each TPU contains four sets of 200 or 400 values, one set for the IP, IS, QP, and QS correlator cells, plus min/max/average data, and a sequence number that increments once per gram. IP and QP represent quadrature data, 90 degrees out of phase, for the "parallel" polarization from the fiber. IS and QS represent quadrature data for the "perpendicular" polarization.

Control Panel

The primary user interaction occurs through a software control panel application. The control panel application performs a number of different functions, which will vary depending on the cards installed. The user may edit preferences to choose how the functions are arranged and shown, for instance the user may choose to have all functionality laid out in separate tabs on the same window or in separate windows.

Figure 10:
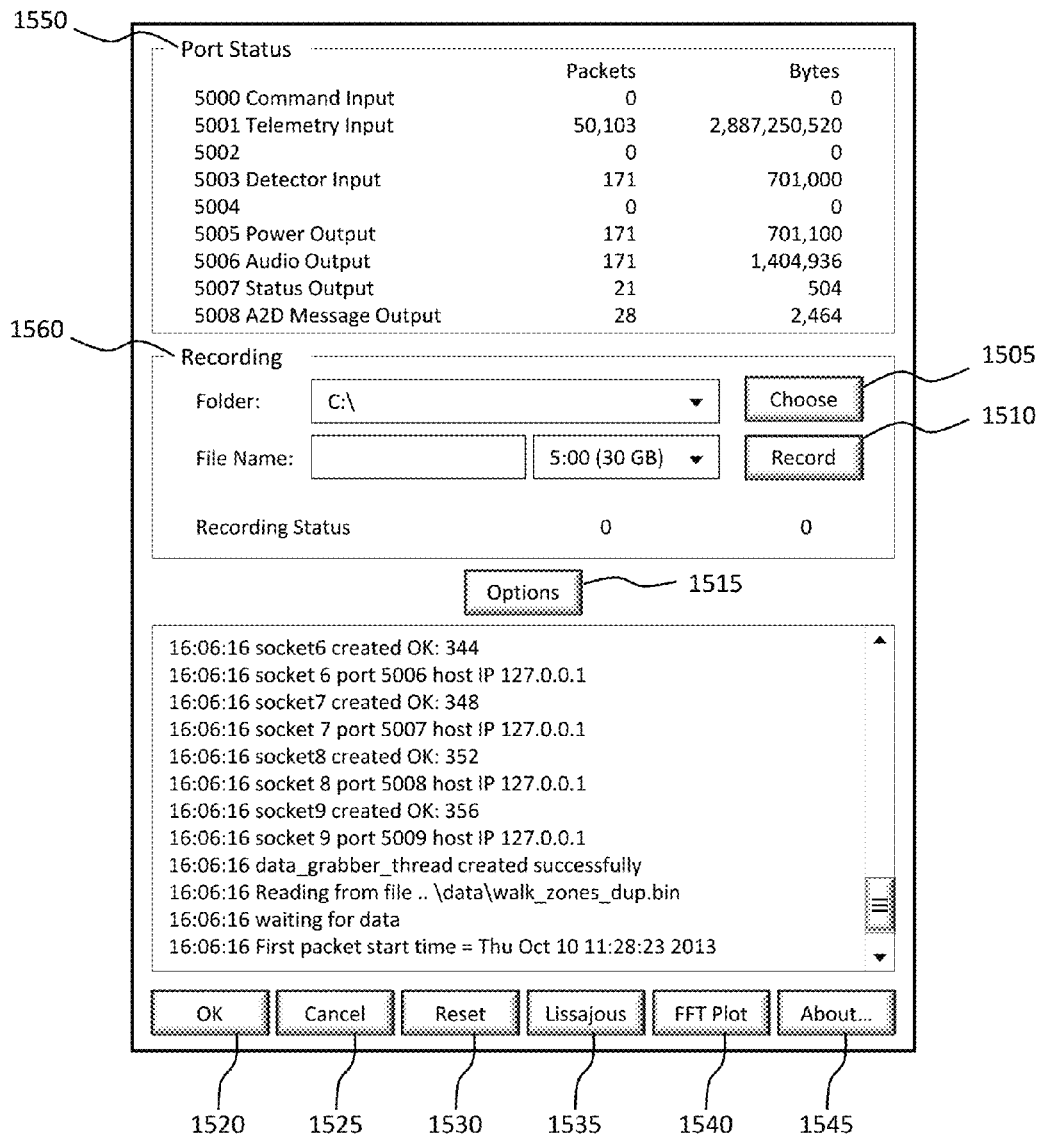
FIG. 10 depicts an example DSP user interface.

FIG. 10 depicts an example embedded controller 510 user interface. The purpose of the Controller UI is to monitor the data streams into and out of the embedded controller 510. Most of the interaction takes place in the control panel. The Port Status section 1550 shows the port assignments and the packets and bytes being transmitted through each port. The Recording section 1560 allows the user to choose a save location, name the file, and choose the length of time to record. The "Choose" button 1505 allows the user to configure or re-configure the system parameters, including file formats and file location. The "Record" button 1510 starts recording. When recording is started the button 1510 will change to read "Stop" so that the user can manually stop recording if they so choose. If the user does not manually stop recording, the recording will continue for the duration set in the Recording section 1560. The recording status will indicate how long it has been recording and the file size.

The "Options" button 1515 allows the user to access an options tab in which the user can edit preferences. The following section is a running process list showing the time and process as it occurs. The user can scroll up at any time and review past processes performed for the current session. There are six buttons at the base of the window. The first, "OK" 1520, accepts any changes that were made and closes the window. The second, "Cancel" 1525, cancels any changes that were made and closes the window. The third, "Reset" 1530, resets all settings to the default settings (which can be set by the user). The fourth, "Lissajous" 1535, displays a Lissajous plot. The fifth, "FFT Plot" 1540, displays an FFT plot. The final button, "About . . . " 1545, provides data about the software including current version.

Figure 11:
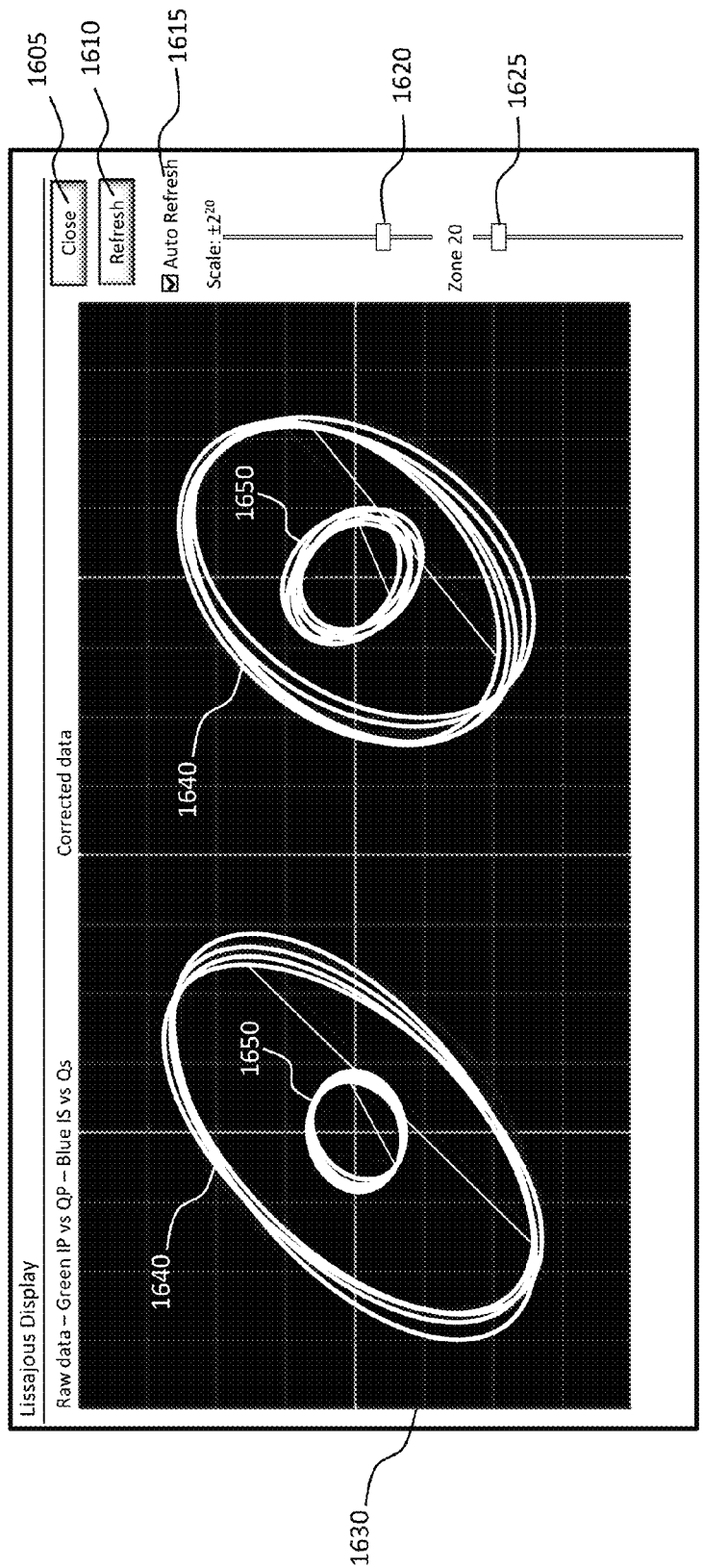
FIG. 11 depicts an example Lissajous plot window.

The Lissajous display 1630, as depicted in FIG. 11, plots the quadrature data of I & Q for the S channel 1640 and P channel 1650 over time. The patterns should be more or less circular and smooth if the attenuation and offsets are set properly. Normally, the patterns change over time as the phase of the incoming light and the signal strength vary. Bumpiness in the ovals indicates noise or poor signal. If the displays look like a ball of yarn, there may be problems in the fiber optic cable. The display represents the incoming data (left screen) and the corrected data (right screen). The gain may be adjusted with the scale slider control 1620 to view the patterns. Different zones may be selected to be viewed using the zone slider control 1625. If Auto Refresh 1615 is not checked, the display may be manually refreshed by pressing the "Refresh" button 1610. If Auto Refresh 1615 is checked, the display will refresh at regular intervals as set by user preferences. The "Close" button 1605 closes the Lissajous display window.

Figure 12:
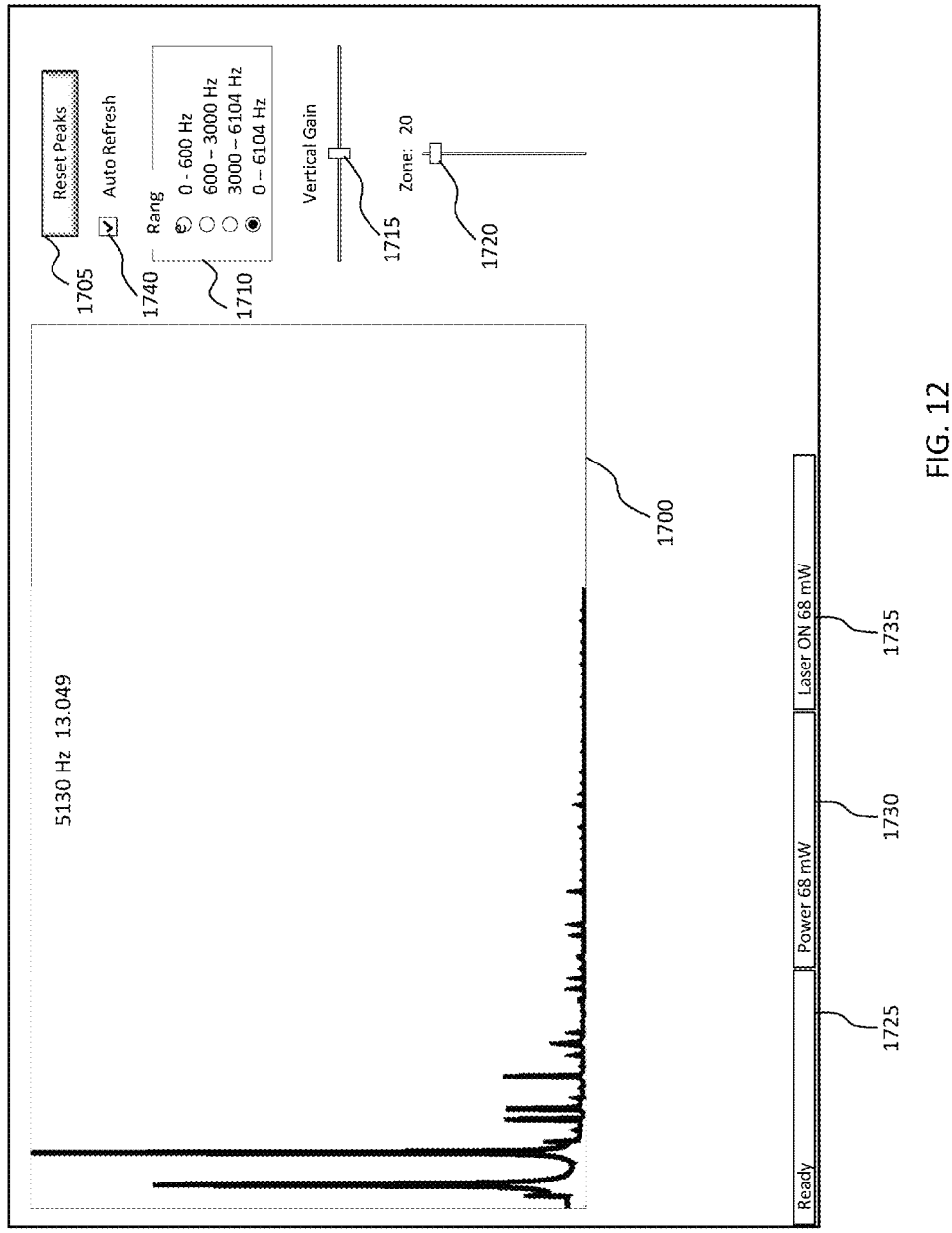
FIG. 12 depicts an FFT display.

FIG. 12 depicts an FFT display window. The FFT plot 1700 displays any frequencies being retrieved from along the array and displays them from 0 to the upper frequency limit. On this plot the x-axis is the frequency and the y-axis is the intensity. The values displayed at the top of the screen indicate the (x, y) coordinates of the current mouse position. If Auto Refresh 1740 is not checked, the "Reset Peaks" button 1705 may be pressed to refresh the plot. If Auto Refresh 1740 is checked, the plot will refresh at regular intervals as set by user preferences. The Range 1710 depicted in the FFT plot 1700 may be set using the radial buttons beside the various choices. The choices for the ranges may be set according to user preferences and may be toggled through at will. The zone being viewed may be adjusted using the zone slider control 1720. Gain may be dynamically adjusted using the vertical gain slider control 1715 on the right in order to zoom in to view smaller signals and back out again. It is possible to determine where a specified frequency occurs based on the relative intensity of the spike.

Figure 14:
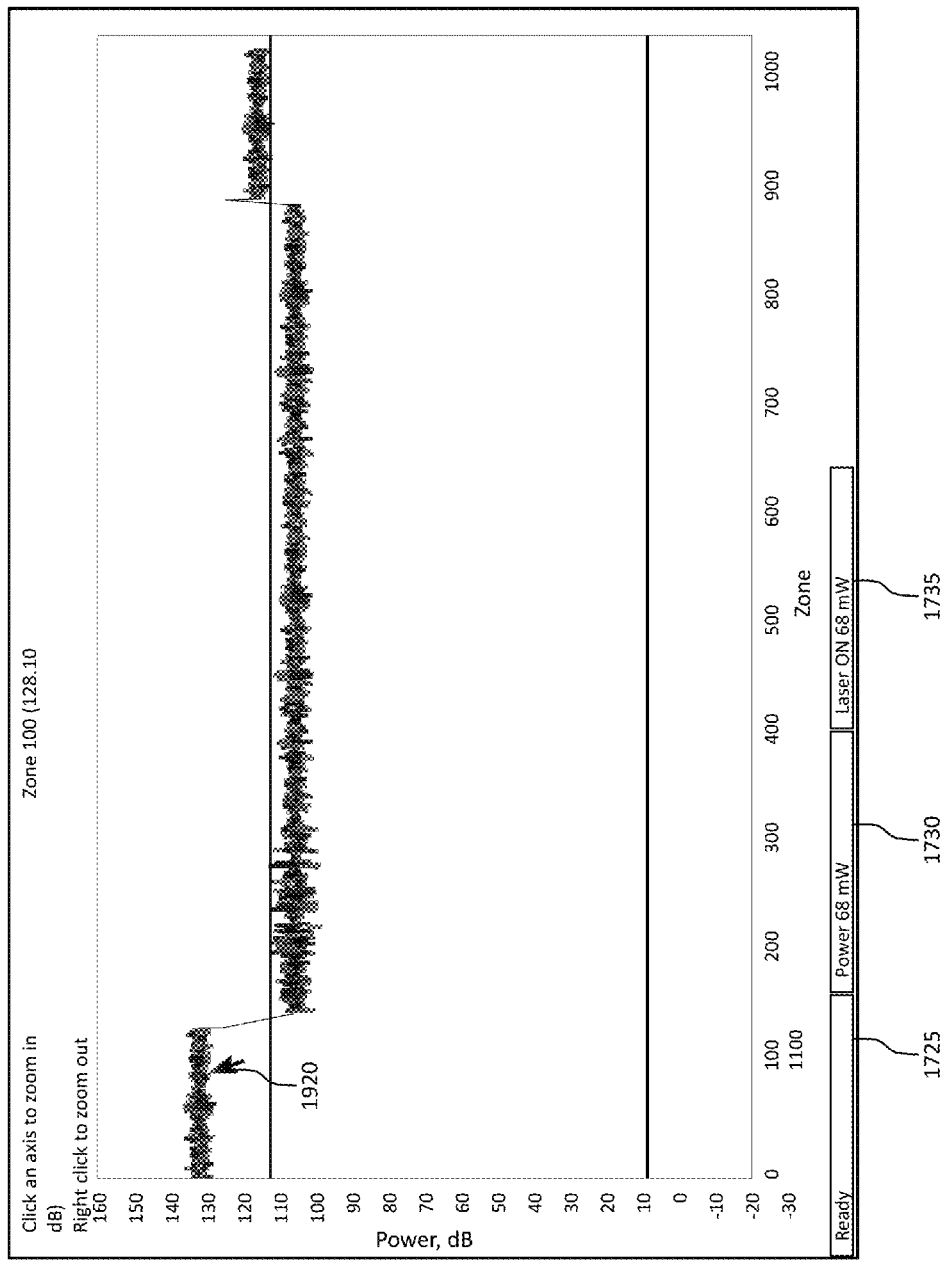
FIG. 14 depicts a power meter tab within the control panel.
Figure 15:
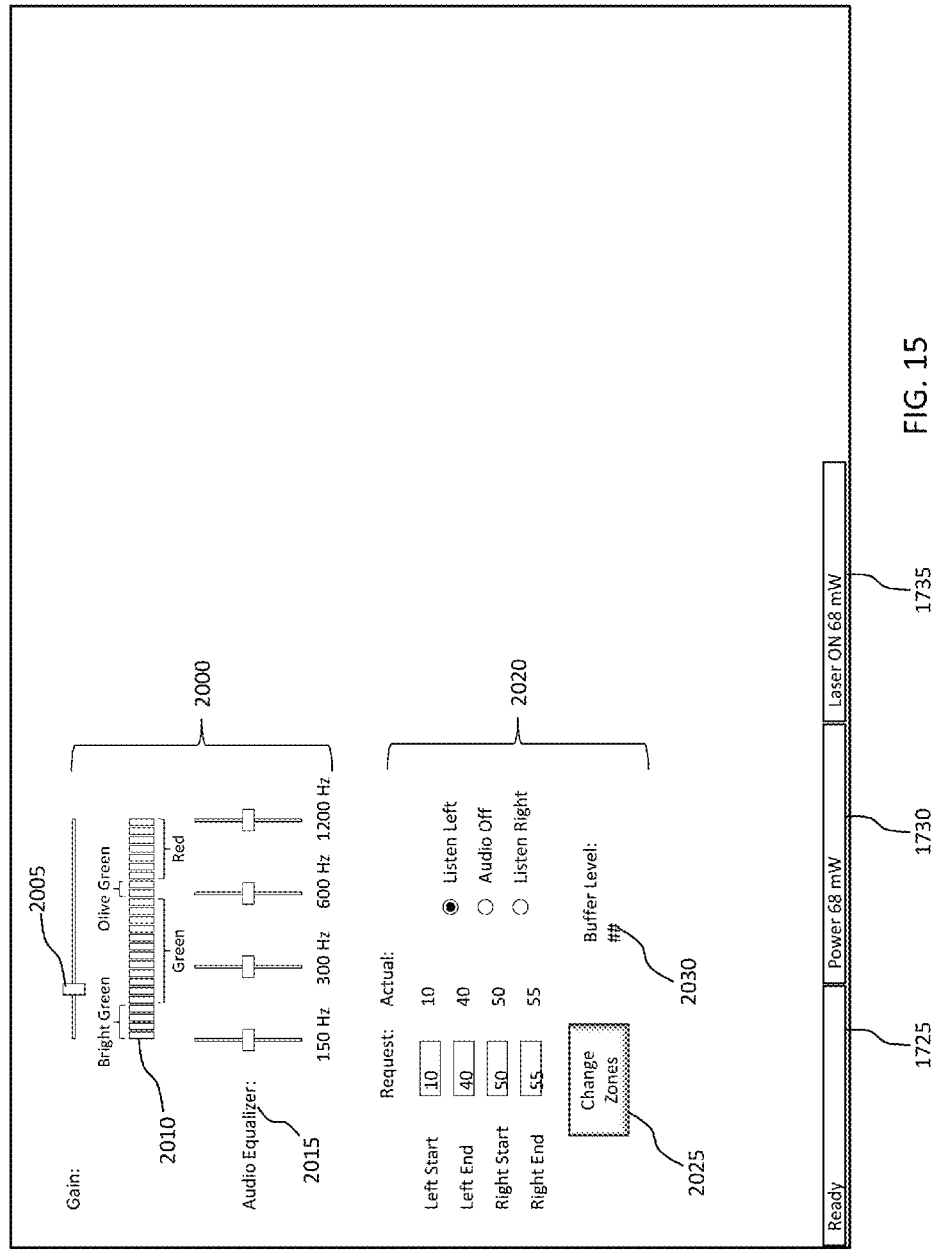
FIG. 15 depicts the software control panel live audio tab.

Referring to FIGS. 12, 14, and 15, important system status information may be shown at the base of each tab or window, for instance, in the depicted example "Ready" 1725 indicates that the system is running, "Power" 1730 indicates current power in the cable and "Laser ON" 1735 indicates the laser is currently active and how much power the laser is supplying. This data is helpful to indicate if the system is running properly as well as to warn the user from attempting to manipulate the system hardware while the laser is on.

Figure 13:
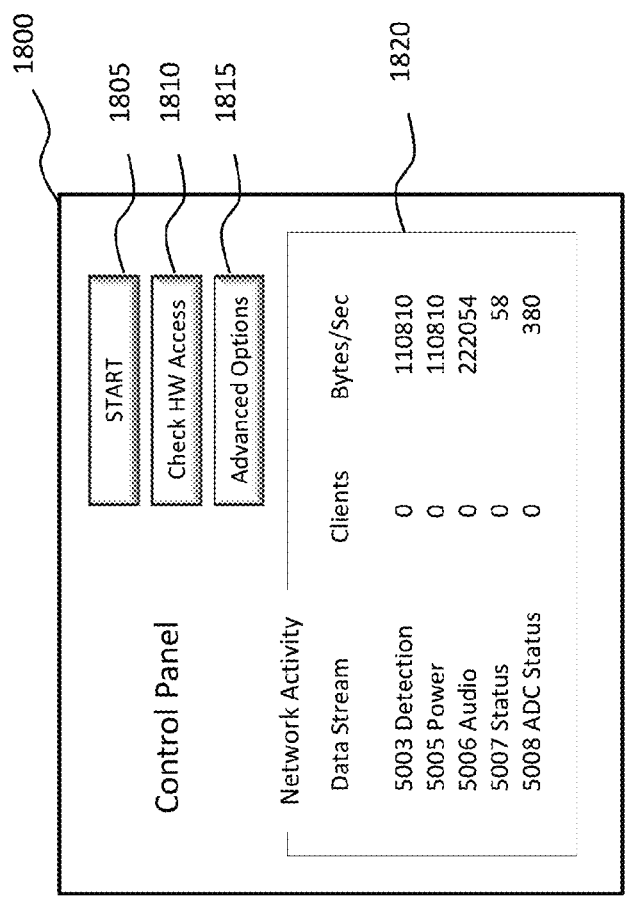
FIG. 13 depicts the main tab of an example control panel.

FIG. 13 depicts the main tab 1800 of the example control panel. The main tab 1800 provides network activity information 1820, a simple go/no-go hardware test using the "Check HW Access" button 1810, and a "START" button 1805 for starting system hardware. Additionally, an "Advanced Options" button 1815 allows users to edit preferences and system settings.

FIG. 14 depicts a power meter tab within the control panel. The power meter tab shows a power reading for each zone, which is the length of the vector produced by the quadrature decoding. Although the number is only peripherally related to signal power, the power reading is useful for monitoring the status of the cable. The power meter reading, for example, usually shows cable breaks and the end of the cable. Moving the cursor 1920 over a location on the graph indicates the power level at the particular zone. In the depicted example the mouse is hovering over zone 100 which is at 128.10 dB.

FIG. 15 depicts the software control panel live audio tab. The live audio tab controls which zone range is being routed to the speakers or audio output device. The live audio tab includes Audio Equalizer options 2000 and zone selection options 2020. Within the Audio Equalizer options 2000 the user may adjust gain using a gain slider control 2005 and/or various preset frequencies 2015 to achieve desired signal conditions. A status bar 2010 indicates signal intensity, bright green indicating good status, down to green, then olive green, then red for an over driven signal. Zone selection options 2020 shows which zones were selected by the user and what the actual zone location is. The user may select two pairs of zones, left and right, and can quickly switch between each zone pair by toggling "Listen Left" or "Listen Right". Additionally, the user may choose to toggle "Audio Off".

The "Change Zones" button 2025 allows the user access to the zone configuration interface. Zones are programmable and can be manually manipulated and/or saved and loaded as preset configuration files. Any two zones may be chosen, so it is possible to listen to the stimuli over a very narrow range of sensor zones, or over a very wide range sensor zones. The selected zone numbers are transmitted to the embedded controller 510, which performs the zone subtraction, and sends out the results on an audio data stream. Additionally, the graph and plot displays may include a slider that allows the user to choose the zone range being displayed, regardless of which zones are being interrogated. Buffer level 2030 is also displayed.

The zone management interface provides a mechanism for setting the correlator zones. Each correlator listens to a single zone, but the zone for each one is programmable. In some circumstances, one might set the correlators to listen to zones 0 through 1,023 consecutively. With a longer cable, the zones may need to be set at intervals of 2 m or 3 m. It is possible to either set all zones to a uniform size or to set the zones to variable sizes. For instance, one may want to monitor a whole perimeter, but is particularly interested on one section of the perimeter. In this instance, the user may set most of the zones on the perimeter to 25 m width, for example, and set the zones in the area of interest to 2 m width. As another example one may decrease zone sizes incrementally as they approach an area of interest, for instance starting at regular intervals of 10 m, then down to 8 m, 6 m, 4 m, and final 1 m in the particular area of interest, which could be just one or many zones long.

The tuning tab lets the user set a number of tuning parameters in the hardware, including the attenuator levels and the cable zero point. The tuning tab also includes a histogram display that lets the user assess whether the attenuators are set optimally.

Figure 16:
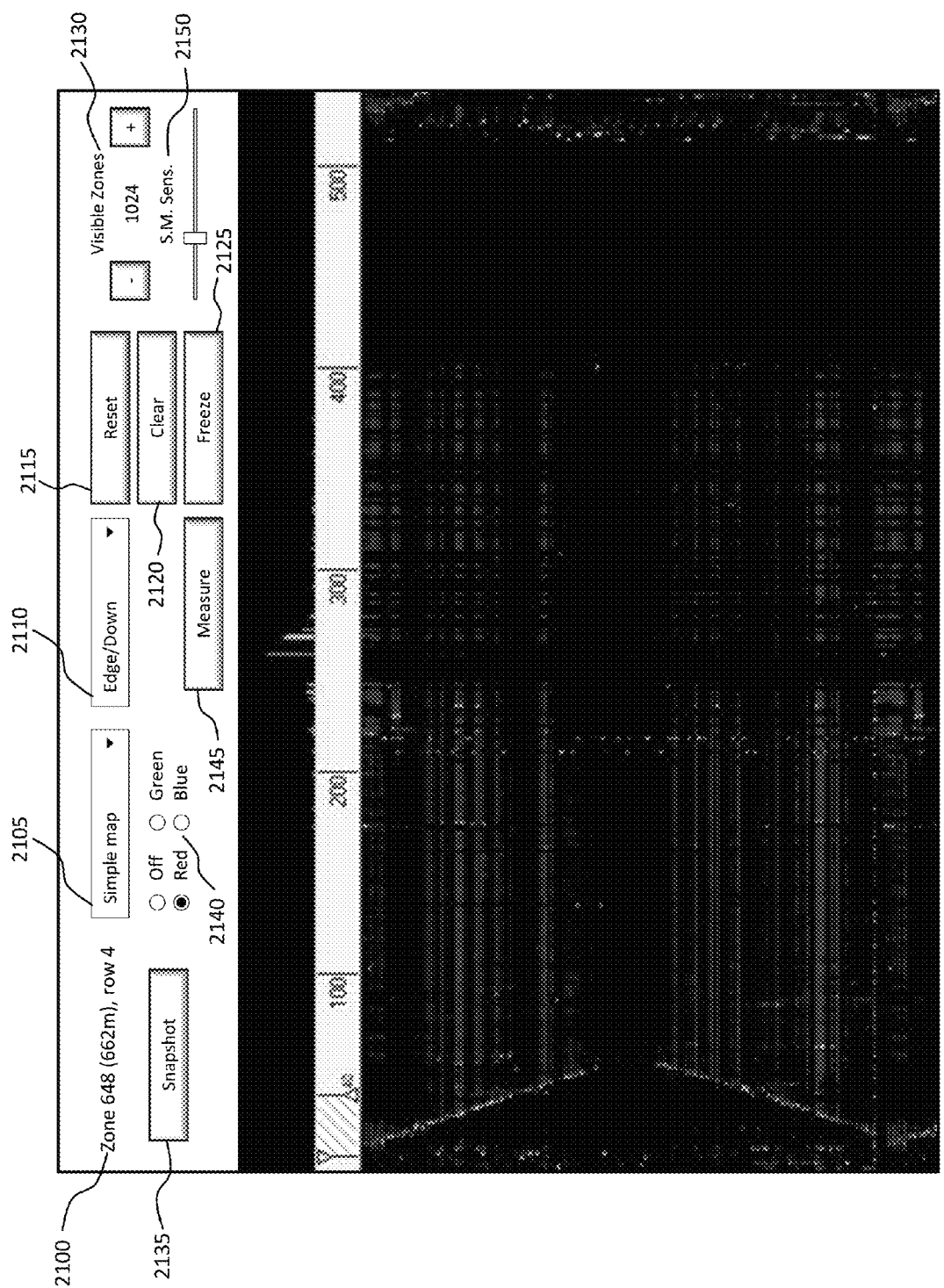
FIG. 16 depicts the waterfall tab which is a visual display of activity along the fiber array.

FIG. 16, the waterfall display tab, is a visual display of activity along the fiber array. In the example, the waterfall display is written in C++ using Windows Template Library for its interface. The values in the waterfall display are produced by performing statistical analysis on the detector data stream from the Controller in an attempt to show signals that rise above the noise floor sufficiently to suggest that an external force has been applied. The waterfall tends to be the most used of the panel tabs as it provides a real-time visualization of pressure disturbance and ambient environmental noise along the length of the fiber array. In some examples, color is used to indicate signal intensity, position, or other system variables per user preferences.

In FIG. 16, time is along the y-axis, with oldest data at the bottom and new data scrolling in at the top, like a strip chart recorder. Distance is along the x-axis, with distance in meters in the scale near the top. The data for the waterfall display derives from the detector stream with each sample generating one new line on the display. The number of samples per second is dependent on the system hardware and software settings. In the depicted example samples are generated at six samples per second thus about two minutes of data are shown. The data shows a person walking toward the start of the cable at the bottom, turning around and walking away, then returning back to the beginning of the cable.

To determine the zone of an event, the cursor can be moved over the particular data point of interest. For touch screens the user may tap an area of interest to retrieve the zone information. The current zone 2100 that the cursor is currently hovering over is displayed in the upper left hand corner. Below the current zone 2100, a "Snapshot" button 2135 is provided. At any time the user can take a snapshot, which is essentially a print screen, by pressing the button. When the "Snapshot" button 2135 is pressed, a prompt will pop up asking the user where they want to save the file and allowing the user to name the file. In some examples, the prompt will auto-suggest a number to append to the end of the filename, beginning at 1 for each session (or other user determined value, including letters, as set in preferences), and increasing each time the user chooses to save a snapshot. In some examples, the file name may be appended with date and or time of capture. In some examples, the system will auto suggest the date and time as the entire filename. Numbers or letters appending filenames will reset when the program has been closed and reopened.

The color options 2140 allow the user to toggle between one or more different color schemes or turn color off. Color schemes may be set in user preferences. The user may toggle between color schemes at will. The algorithm drop down menu 2105 above the color options 2140 allows the user to change the tracking algorithm in use. When the algorithm is changed, it will update immediately. In some examples, data from the previously used algorithm will still be present on the screen until the new algorithm has been in use long enough to push the old data from the display. In some examples, the point at which the algorithm is changed may be demarcated using at least one of color, line, text, visual indicator (such as a dot, circle, square, number, letter, etc.), or other such method that clearly delineates between the two. The algorithm options drop down menu 2110 allows the user to choose between different options that are specific to the algorithm in use.

The "Measure" button 2145 can be used to clock a visible detection moving along the fiber. To use measure, first the user must click the "Freeze" button 2125 then the "Measure" button 2145. When the "Freeze" button 2125 is pressed, the waterfall display will stop displaying new data, freezing the current view. Through the duration of the freeze, the "Freeze" button 2125 will become "Resume", which will need to be pressed again to resume operation of the waterfall display. Next, the user must click two points along the detection in the waterfall display. A window will then pop up displaying the length and estimated speed of the detection.

The "Clear" button 2120 clears the screen of all data. The "Reset" button 2115 resets the filter algorithm, clearing its history. In some examples it also clears the data from the screen. In some examples, the change will be indicated using at least one of color, line, text, visual indicator (such as a dot, circle, square, number, letter, etc.), or other such method that clearly shows a change was made. The reset option is useful if an unusual disturbance (such as a physical disruption to the hardware, for instance someone bumping into it) causes unexpected results in the averaging, thus no longer producing accurate measurements.

The number of visible zones may be changed by clicking the "+" or "−" on the visible zone option 2130 in the upper right corner. The signal measurement sensitivity 2150 may be changed dynamically using the slider control.

Several algorithms were used throughout development of the waterfall display. The goal was to find the algorithm that produces a good signal-to-noise ratio, identifying real impulses and stimuli without overwhelming the operator with false indications because of noisy data. The original algorithm was called "$50^{th}$ percentile"—it removed all values below the $50^{th}$ percentile and scaled the remainder so that the highest value displays were the most intense color. One drawback to this particular algorithm is that there will always be a point that is considered the highest and therefore something will always show up on the display even if there is no event, thus producing a very busy display.

The algorithm was then modified and referred to as "simple map". In this algorithm the detector values were mapped nearly linearly to color intensities. If the fiber went quiet, the display went to dark (whatever the default background color is depending on user preferences). In some examples this algorithm is at least one of the optional default algorithms.

A set of "scoring" algorithms were created, that assigns a "score" to each detector value. The first scoring algorithm is "across/down". "Across/Down" does a good job of eliminating noise, but it errs on the side of caution, and can miss signals that do represent impulse.

The second scoring algorithm is "Edge/Down". The "Edge/Down" algorithm assigns part of its score based on the number of standard deviations away from the historical average for the zone, and part of the score based on how different the zone is from the three zones that immediately preceded it. This algorithm does a better job of displaying signals for true stimuli, but in exchange it shows more noise than "Across/Down". For human operators, this produces much more satisfying results. For automated use, such as feeding a mapping application, "Across/Down" is a better solution.

Figure 17:
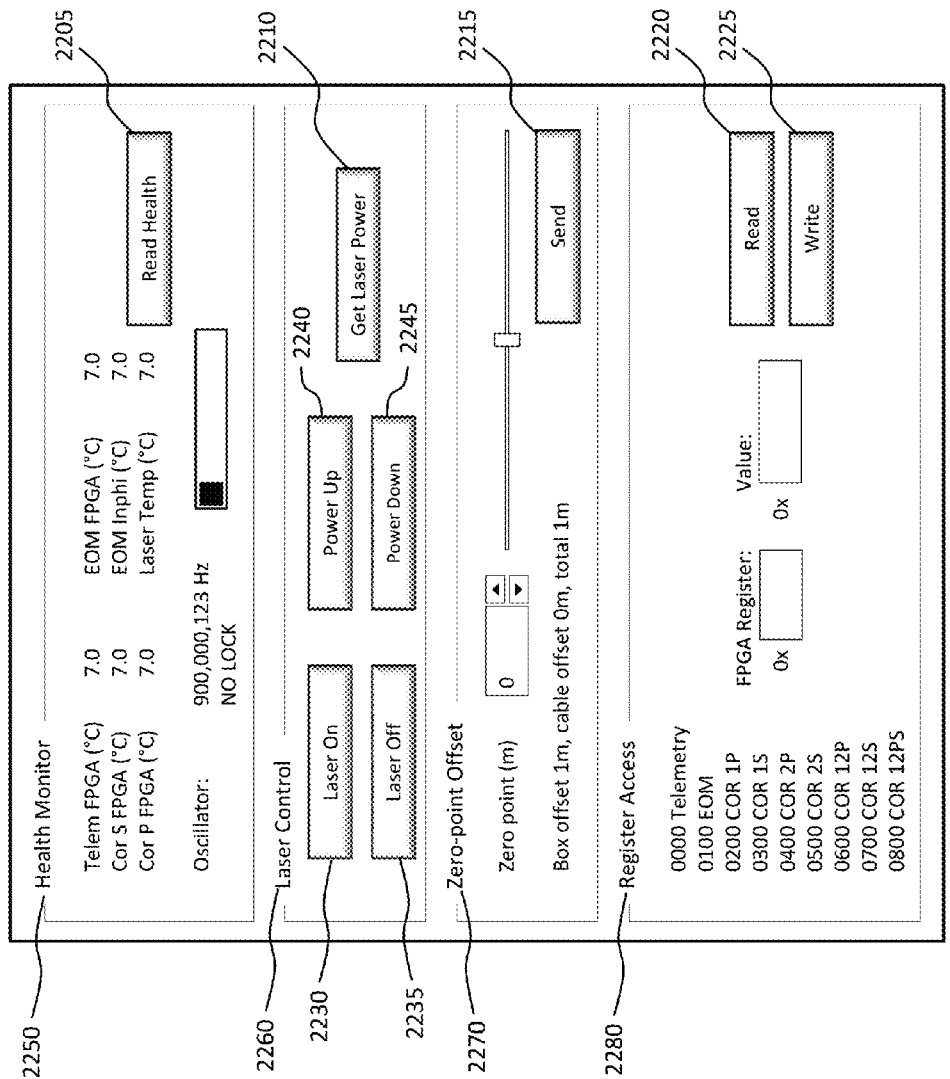
FIG. 17 depicts the control panel diagnostics tab.

FIG. 17 depicts the control panel diagnostics tab. At the top of the diagnostics tab a health monitor 2250 shows overall system health including the temperatures of the hardware and the status of the oscillator. The "Read Health" button 2205 can be used to refresh the system health data. Laser control 2260 allows the user to turn the laser power on and off using the "Laser On" 2230 and the "Laser Off" 2235 buttons, manipulate the laser power level using the "Power Up" 2240 and the "Power Down" 2245 buttons, and display the current laser power level using the "Get Laser Power"

button 2210. Zero-Point offset 2270 allows the user to manipulate where the zero-point for cable interrogation is located, for instance, the user may want to set the zero-point far enough away from the hardware so that system noise and personnel in proximity to the hardware do not show as events; essentially, if the hardware interrogator is 10 meters from the first zone to be measured, the value is 10, if the first zone is 100 meters, then the setting is 100. When this data is changed, the user must click the "Send" button 2215 to implement the changes. Register Access 2280 allows the user to view and set the hardware registers. The "Read" button 2220 allows the user to view the current values. The "Write" button 2225 allows the user to manually edit the values.

Example configurations described herein are well suited to identify, classify, predict, and track micro-seismic and audible events using a fiber-optic sensor array. The system catalogues data from known events into a database. When a new event is detected it is compared to known sound profiles within the database. The system then provides a determination on what the event is with a confidence value. As more events are confirmed and catalogued, the classifications and predictions will become more accurate.

Additionally, by gathering and analyzing incoming data over time, the software will be able to predict future events based on known changes in frequency that usually occur before certain seismic or audible events. This is particularly useful for predicting earthquakes, analyzing well-bores during oil drilling (to determine when they are nearly empty and to predict the next best place to drill), tracking pipelines and predicting where the next leak may occur, among many other applications.

The system uses Bayesian Inferencing and Markovian prediction to classify and predict future events.

Kalman Filtering

Kalman filtering, also known as linear quadratic estimation (LQE), is an algorithm that uses a series of measurements observed over time, containing noise (random variations) and other inaccuracies, and produces estimates of unknown variables that tend to be more precise than those based on a single measurement alone. More formally, the Kalman filter operates recursively on streams of noisy input data to produce a statistically optimal estimate of the underlying system state. The Kalman filter is a widely applied concept in time series analysis used in fields such as signal processing and econometrics.

The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state and its uncertainty matrix; no additional past information is required.

The Kalman filter uses a system's dynamics model (e.g., physical laws of motion), known control inputs to that system, and multiple sequential measurements (such as from sensors) to form an estimate of the system's varying quantities (its state) that is better than the estimate obtained by using any one measurement alone. As such, it is a common sensor fusion and data fusion algorithm.

All measurements and calculations based on models are estimates to some degree. Noisy sensor data, approximations in the equations that describe how a system changes, and external factors that are not accounted for introduce some uncertainty about the inferred values for a system's state. The Kalman filter averages a prediction of a system's state with a new measurement using a weighted average. The purpose of the weights is that values with better (i.e., smaller) estimated uncertainty are "trusted" more. The weights are calculated from the covariance, a measure of the estimated uncertainty of the prediction of the system's state. The result of the weighted average is a new state estimate that lies between the predicted and measured state, and has a better estimated uncertainty than either alone. This process is repeated every time step, with the new estimate and its covariance informing the prediction used in the following iteration. This means that the Kalman filter works recursively and requires only the last "best guess", rather than the entire history, of a system's state to calculate a new state.

Because the certainty of the measurements is often difficult to measure precisely, it is common to discuss the filter's behavior in terms of gain. The Kalman gain is a function of the relative certainty of the measurements and current state estimate, and can be "tuned" to achieve particular performance. With a high gain, the filter places more weight on the measurements, and thus follows them more closely. With a low gain, the filter follows the model predictions more closely, smoothing out noise but decreasing the responsiveness. At the extremes, a gain of one causes the filter to ignore the state estimate entirely, while a gain of zero causes the measurements to be ignored.

When performing the actual calculations for the filter (as discussed below), the state estimate and covariances are coded into matrices to handle the multiple dimensions involved in a single set of calculations. This allows for representation of linear relationships between different state variables (such as position, velocity, and acceleration) in any of the transition models or covariances.

Extensions and generalizations to the method have also been developed, such as the extended Kalman filter and the unscented Kalman filter which work on nonlinear systems. The underlying model is a Bayesian model where the state space of the latent variables is continuous and where all latent and observed variables have Gaussian distributions.

Extended Kalman Filter

The basic Kalman filter is limited to linear models, meaning alternate systems are needed for non-linear models. The extended Kalman filter does not need linear functions for the state transition and observation models. In the extended Kalman filter, the Jacobian matrix is computed for both the state transition and observation functions. As seen in the basic Kalman filter, as more measurements are observed the Jacobian is updated with new predicted states. Essentially, rather than use linear functions, the extended Kalman filter uses the Jacobian matrices as linearizations of the functions at the current state estimate.

UD Factorized Kalman Filter

When implementing the extended Kalman filter, extensive computer work is needed to calculate Jacobian matrices. The computer round-off errors can build up and cause numerical instability in the model. UD factorization is a square root form of the Kalman filter that solves the issue of numerical stability. UD factorization decomposes positive definite matrices into the form $P=U \cdot D \cdot U^T$ where U is a unit triangular matric and D is a diagonal matric. This form avoids many of the square root operations which can cause the model to lose numerical stability.

Unscented Kalman Filter

When the state transition and observation functions are very non-linear, the extended Kalman filter can give inaccurate results. The unscented Kalman filter uses a sampling technique called the "unscented transform" to pick a set of "sigma points" around the mean. The non-linear functions are then applied to the sigma points, recovering the true mean and covariance of the estimate. This method is particularly efficient for complex functions, since computing Jacobians for complex functions can be especially difficult.

Bayes' Theorem

In probability theory and statistics, Bayes' theorem relates current probability to prior probability. When applied, the probabilities involved in Bayes' theorem may have any of a number of probability interpretations. In one of these interpretations, the theorem is used directly as part of a particular approach to statistical inference. In particular, with the Bayesian interpretation of probability, the theorem expresses how a subjective degree of belief should rationally change to account for evidence: this is Bayesian inference, which is fundamental to Bayesian statistics. However, Bayes' theorem has applications in a wide range of calculations involving probabilities, not just in Bayesian inference.

Applying Bayesian Linear Regression

Linear regression is a simple yet powerful approach to learning from data. The simplest algorithm for regression is ordinary least squares (OLS), which yields a hyperplane that minimizes the squared error between predictions and labels on a training set. In high dimensions with few examples, ordinary least squares can overfit badly, and needs to be regularized to produce sensible solutions. Additionally, it is often desirable to work in a Bayesian setting in order to produce confidence estimates and incorporate prior knowledge in the predictions.

At initialization, a Bayesian Linear Regression model will be sent a training set of data. This data is used to train the model for use in a specific application. Potential applications may be one or more of face recognition, handwriting recognition, voice recognition, speech recognition, pose recognition, motion detection, gesture recognition, and image recognition. For example, in the application of handwriting recognition, the training set of data may include a variety of samples of handwritten letters and numbers. In some cases, there may be few training data points, but in other cases, there may be many training data points. The training points may be low dimensional or high dimensional, depending on the application.

After the model has been initialized, it may be applied to predict future data points. Next, the confidence intervals on the predicted data points are computed. Because the model is fully Bayesian, the confidence intervals on the outputs can be obtained in a principled way, without the errors introduced by other methods.

Bayesian Inferencing

In statistics, Bayesian inference is a method of inference in which Bayes' rule is used to update the probability estimate for a hypothesis as additional evidence is acquired. Bayesian updating is an important technique throughout statistics, and especially in mathematical statistics. For some cases, exhibiting a Bayesian derivation for a statistical method automatically ensures that the method works as well as any competing method. Bayesian updating is especially important in the dynamic analysis of a sequence of data.

Formal Bayesian inferencing derives the posterior probability as a consequence of two antecedents, a prior probability and a "likelihood function" derived from a probability model for the data to be observed. Bayesian inferencing computes the posterior probability according to Bayes' rule:

$$P(H\mid E) = \frac{P(E\mid H) - P(H)}{P(E)} \quad (1)$$

where | denotes a conditional probability; more specifically, it means given.

H stands for any hypothesis whose probability may be affected by data (called evidence below). Often there are competing hypotheses, from which one chooses the most probable. The evidence, E, corresponds to new data that were not used in computing the prior probability. P(H), the prior probability, is the probability of H before E is observed. This indicates one's previous estimate of the probability that a hypothesis is true, before gaining the current evidence. P(H|E), the posterior probability, is the probability of H given E, i.e., after E is observed. This gives the probability of a hypothesis given the observed evidence. P(E|H) is the probability of observing E given H. As a function of E with H fixed, this is the likelihood. The likelihood function should not be confused with P(H|E) as a function of H rather than of E. It indicates the compatibility of the evidence with the given hypothesis.

P(E) is sometimes termed the marginal likelihood or "model evidence". This factor is the same for all possible hypotheses being considered. (This can be seen by the fact that the hypothesis H does not appear anywhere in the symbol, unlike for all the other factors.) This means that this factor does not enter into determining the relative probabilities of different hypotheses.

Note that, for different values of H, only the factors P(H) and P(E|H) affect the value of P(H|E). As both of these factors appear in the numerator, the posterior probability is proportional to both. In words: 1. (more exactly) The posterior probability of a hypothesis is determined by a combination of the inherent likeliness of a hypothesis (the prior) and the compatibility of the observed evidence with the hypothesis (the likelihood); 2. (more concisely) Posterior is proportional to likelihood times prior.

Note that Bayes' rule can also be written as follows:

$$P(H\mid E) = \frac{P(E\mid H) - P(H)}{P(E)} \cdot P(H) \quad (2)$$

where the factor $$\frac{P(E\mid H)}{P(E)}$$

represents the impact of E on the probability of H.

Rationally, Bayes' rule makes a great deal of sense. If the evidence does not match up with a hypothesis, one should reject the hypothesis. But if a hypothesis is extremely unlikely a priori, one should also reject it, even if the evidence does appear to match up.

For example, imagine that James has various hypotheses about the nature of a newborn baby of a friend, including: $H_1$: the baby is a brown-haired boy; $H_2$: the baby is a blond-haired girl; and $H_3$: the baby is a dog.

Then consider two scenarios:

James is presented with evidence in the form of a picture of a blond-haired baby girl. James finds that this evidence supports $H_2$ and opposes $H_1$ and $H_3$.

James is presented with evidence in the form of a picture of a baby dog. Although this evidence, treated in isolation, supports $H_3$, his prior belief in this hypothesis (that a human can give birth to a dog) is extremely small, so the posterior probability is nevertheless small.

The critical point about Bayesian inference, then, is that it provides a principled way of combining new evidence with prior beliefs, through the application of Bayes' rule. (Contrast this with frequentist inference, which relies only on the evidence as a whole, with no reference to prior beliefs.) Furthermore, Bayes' rule can be applied iteratively: after observing some evidence, the resulting posterior probability can then be treated as a prior probability, and a new posterior probability computed from new evidence. This allows for Bayesian principles to be applied to various kinds of evidence, whether viewed all at once or over time. This procedure is termed "Bayesian updating".

Bayesian Updating

Bayesian updating is widely used and computationally convenient. However, it is not the only updating rule that might be considered "rational".

Ian Hacking noted that traditional "Dutch book" arguments did not specify Bayesian updating: they left open the possibility that non-Bayesian updating rules could avoid Dutch books. Dutch book refers to a set of odds which guarantees profit regardless of the outcome. It is associated with probabilities by the odds not being coherent. Hacking wrote "And neither the Dutch book argument, nor any other in the personalist arsenal of proofs of the probability axioms, entails the dynamic assumption. Not one entails Bayesianism. So the personalist requires the dynamic assumption to be Bayesian. It is true that in consistency a personalist could abandon the Bayesian model of learning from experience. Salt could lose its savour."

Indeed, there are non-Bayesian updating rules that also avoid Dutch books (as discussed in the literature on "probability kinematics" following the publication of Richard C. Jeffrey's rule, which applies Bayes' rule to the case where the evidence itself is assigned a probability. The additional hypotheses needed to uniquely require Bayesian updating have been deemed to be substantial, complicated, and unsatisfactory.

Markovian Prediction

In probability theory and statistics, a Markov process, or Markoff process, named after the Russian mathematician Andrey Markov, is a stochastic process that satisfies the Markov property. A Markov process can be thought of as 'memoryless': loosely speaking, a process satisfies the Markov property if one can make predictions for the future of the process based solely on its present state just as well as one could knowing the process's full history. i.e., conditional on the present state of the system, its future and past are independent.

A Markov process is a stochastic model that has the Markov property. It can be used to model a random system that changes states according to a transition rule that only depends on the current state. The following table gives an overview of the different instances of Markov processes for different levels of state space generality and for discrete time vs. continuous time.

|  | Countable or finite state space | Continuous or general state space |
| --- | --- | --- |
| Discrete-time | Markov chain on a countable or finite state space | Harris chain (Markov chain on a general state space) |
| Continuous-time | Continuous-time Markov process | Any continuous stochastic process with the Markov property, e.g. the Wiener process |

Note that there is no definitive agreement in literature on the use of some of the terms that signify special cases of Markov processes. For example, often the term "Markov chain" is used to indicate a Markov process which has a finite or countable state-space, but Markov chains on a general state space fall under the same description. Similarly, a Markov chain would usually be defined for a discrete set of times (i.e. a discrete-time Markov chain) although some authors use the same terminology where "time" can take continuous values. In addition, there are other extensions of Markov processes that are referred to as such but do not necessarily fall within any of these four categories. Moreover, the time index need not necessarily be real-valued; like with the state space, there are conceivable processes that move through index sets with other mathematical constructs. Notice that the general state space continuous-time Markov chain is general to such a degree that it has no designated term.

Markov processes arise in probability and statistics in one of two ways. A stochastic process, defined via a separate argument, may be shown mathematically to have the Markov property, and as a consequence to have the properties that can be deduced from this for all Markov processes. Alternately, in modelling a process, one may assume the process to be Markov, and take this as the basis for a construction. In modelling terms, assuming that the Markov property is one of a limited number of simple ways of introducing statistical dependence into a model for a stochastic process in such a way that allows the strength of dependence at different lags to decline as the lag increases.

Markov Property

The general case:

Let $(\Omega, F, P)$ be a probability space with a filtration $(F_t, t \in T)$, for some (totally ordered) index set T; and let (S,S) be a metric space. An S-valued stochastic process $x=(xF_t, t \in T)$ adapted to the filtration is said to possess the Markov property with respect to the $\{F_\tau\}$ if, for each $A \in S$ and each s, $t \in T$ with s<t, $$P(X_t \in A | F_S) = P(X_t \in A | X_S) \qquad (3)$$

A Markov process is a stochastic process which satisfies the Markov property with respect to its natural filtration.

For discrete-time Markov chains:

In the case where S is a discrete set with the discrete sigma algebra and $T=\mathbb{N}$, this can be reformulated as follows:

$$P(X_n = x_n | X_{n-1} = x_{n-1}, X_{n-2} = x_{n-2}, \ldots X_0 = x_0)) = \qquad (4)$$

$$P(X_n = x_n | X_{n-1} = x_{n-1}$$

Dynamic Event Interpreter

In another example a Dynamic Event Interpreter (DEI) operation is disclosed. The DEI operation comprises the following:

Event Estimation Filter—The DEI estimator takes the sensor measurement data that is assigned to an event and updates the event state. The estimator also updates the uncertainty about the states.

Data Association Filter (DAF)—The DAF takes raw measurement data from the sensors and determines if it is clutter, originated from an existing event, or should be the start of a new event. If from an existing event, this process assigns which event the data came from so that it can be used by the state estimator, i.e. measurement-to-state. This process is the most difficult part of the filter.

Those skilled in the art of state estimation, robotics, and advanced defense avionics understand academically that state estimation utilizing sensor-fusion is the art of combining sensory data or data derived from disparate sources such that the resulting information is in some sense "better" than would be possible when these sources were used individually. This process is predicated on the covariance (or the measure of how much two variables vary together) of non-independent sources. The term "better" in the case above can mean more accurate, more complete, more dependable, or refer to the result of an emerging view or state estimation.

The data sources for a fusion process are not specified to originate from identical sources or sensors which may or may not be spatially and temporally aligned. Further one can distinguish direct fusion, indirect fusion and fusion of the outputs of the former two. Direct fusion is the fusion of sensor data from a set of heterogeneous or homogeneous sensors, soft sensors, and history values of sensor data, while indirect fusion uses information sources like a prior knowledge about the environment and human input. Sensor fusion is also known as "multi-sensor data fusion" and is a subset of information fusion through an implementation of the probability theory.

Probability theory is the mathematical study of phenomena characterized by randomness or uncertainty. More precisely, probability is used for modeling situations when the result of a measurement, realized under the same circumstances, produces different results. Mathematicians and actuaries think of probabilities as numbers in the closed interval from 0 to 1 assigned to "events" whose occurrence or failure to occur is random. Two crucial concepts in the theory of probability are those of a random variable and of the probability distribution of a random variable.

Implementing the features described above with affordable instruments requires reliable real-time estimates of system state. Unfortunately, the complete state is not always observable. State Estimation takes all the data obtained and uses it to determine the underlying behavior of the system at any point in time. It includes fault detection, isolation and continuous system state estimation.

There are two parts to state estimation: modeling and algorithms. The overall approach is to use a model to predict the behavior of the system in a particular state, and then compare that behavior with the actual measurements from the instruments to determine which state or states are the most likely to produce the observed system behavior.

This is not well understood or currently implemented in the Optical Fiber Distributed Acoustic Sensor industry; the approach understood and practiced is logical decisions in linear and deterministic systems. If use cases require higher confidences in measurements, instrument specifications are tightened resulting in the undesired effect of cost and schedule increases. The environment we live and operate in is neither linear nor deterministic; use cases are infinite; and the perverse variability of the targets and potential maneuvers cannot be modeled. The variability of the problems identified above includes aspects other than just spatial (i.e. range and bearing to a target); temporal relationships are part of the fundamental intellectual structure (together with space and number) within which events must be sequenced, the duration of events must be quantified, the intervals between events must be quantified, and the kinematics of objects must be compared.

In some examples, a state estimation system is utilized that is based on efficient recursive filter techniques which estimate the state of a dynamic system from a series of incomplete and noisy measurements. As time progresses, a measurement is made and reported; this measurement must be within the expectation of the next measurement, to accomplish this a Kalman filter based on linear dynamical systems is discretized in the time domain and further modeled on a Markov chain built on linear operators perturbed by Gaussian noise. The state of the system is represented as a vector of real numbers. At each discrete time increment, a linear operator is applied to the state to generate the new state, with some noise mixed in, and optionally some information from the controls on the system if they are known. Then, another linear operator mixed with more noise generates the visible outputs from the hidden state. The Kalman filter may be regarded as analogous to the hidden Markov model, with the key difference being that the hidden state variables are continuous (as opposed to being discrete in the hidden Markov model). Additionally, the hidden Markov model can represent an arbitrary distribution for the next value of the state variables, in contrast to the Gaussian noise model that is used for the Kalman filter. There is a strong duality between the equations of the Kalman Filter and those of the hidden Markov model.

Detection Logic

The Nearest Neighbor Joint Probabilistic Data Association Filter (NNJPDAF) deals with the problem of taking response measurement from an event and either associating it to an existing event, rejecting the response measurement because it is clutter, or sending it to an event management process to start a new event.

The process is to first define a validation region for each event and to identify all response measurements that fall within that region. For the one-dimensional case the validation region for an event is constructed around the predicted measurement for the event. Using the previous event state, the predicted response measurement is computed by propagating this state to the time of the next response measurement. This predicted measurement is the center of the validation region. If the measurement falls within this validation region, then it is considered as a candidate for association to the event; otherwise, it is rejected.

The data association filter is the nearest-neighbor joint probabilistic data association filter (NNJPDAF). To help explain what the NNJPDAF is, the probabilistic data association filter (PDAF) for the single target case will be discussed first. Next the more complex joint probabilistic data association filter (JPDAF), which is used for multiple targets, will be discussed, and then the nearest-neighbor JPDA.

The PDAF is a Bayesian approach that computes the probability that each measurement in a track's validation region is the correct measurement and the probability that none of the validated measurements is the correct measurement. The non-parametric version of the filter will be used since it does not require prior knowledge of the special density of the clutter.

According to some examples, detection logic is utilized for fiber-optic based sensing systems wherein the system moves from a serial sensing approach to an event detection approach. The system will listen to the entire length of fiber and when an event is detected, it will focus in on the area surrounding the event. If multiple events are detected, the system will determine if the events are related by comparing them to each other, determining distance apart, and possibly associate the data with known events such as footsteps, gunshots, vehicles or the like.

The system will apply filters to reduce background noise, associate and group events based on proximity and likeness, and assign probabilities of the event occurring again. As events are detected the system will zoom in on the region or regions where the events are occurring and take more samples closer together to determine the exact location and character of the event or events as well as direction of movement, etc.

Histogram

In a standard fiber optic sensing system, the backscatter from optical system components as well as impurities in the optical fiber may be mistaken for disturbances in the system. It is imperative to characterize and remove this noise from the system in order to achieve accurate detection results and prevent false positives. This backscatter generally remains fairly constant over time, or increases at a very slow rate. As return signal data is logged, histograms may be generated depicting the backscatter at those locations. The histograms may take the form of tables, bar graphs, or 'waterfalls'. The histograms are updated continuously or at regular intervals per user preferences. During signal processing, the data from the known noise from the most recently generated histogram will be removed from the return signal to output a signal that is generally free of system noise, thus producing a return signal that shows only incident disturbances ("events") that are not due to system components.

In a non-limiting discussion of an example, the process data step comprises the use of an algorithm to remove noise from the data and/or focus on significant events. Generally, the algorithms that may be used to achieve these functions include the removal of low order spatial trends (e.g. a polynomial in depth can be fit to each temperature profile and the resulting function can be subtracted from the profile), a high-pass filter (such as one that removes low spatial frequencies like a sixth-order, zero-phase Butterworth filter), the differentiation of data with respect to an independent variable (such as depth), low pass filters, matched filters (functions with shapes similar to what is expected in the data), adaptive filters, wavelets, background subtraction, Bayesian analysis, and model fitting. These algorithms can be applied to the data individually, or in combination. For example, filtering can identify important regions of the data and then trend removal can be used for further processing.

For an example used to detect intrusions or other physical events. Techniques are disclosed that allow modulation in a laser output beam. The optical fiber 505 is interrogated using a single laser light source 405 in the example. The beam is split into two: one portion is sent to the sensing fiber 505 and the other portion is used to recover information from the back-scattered light received from the sensing fiber 505.

The portion of the beam that is sent to the sensing fiber 505 is first modulated with the pseudo random code at a 100 MHz rate using an Electro-Optical Modulator (EOM) 420. This "imposes" the PRC Code on the beam. Back-scattered light from the fiber 505 will have this code with each back-scatter source providing a slightly different data delay on the Code. Alternatively, two lasers may be used.

The interrogation beam is modulated with a 900 MHz frequency using an Acousto-Optical Modulator (AOM) 415. This new beam is then split into S and P polarizations to be mixed with S & P polarized back-scattered light. In the mixer 525, Splitter B 445 is used to mix and interfere the S polarized reflected light and the S polarized "recovery" light. Splitter D 455 mixes the P beams. These splitters produce interference patterns for the S and P polarizations. Each of the S and P interference patterns will contain a summation of all of the pseudo random code values reflected by the Rayleigh effect throughout the cable, as well as the 900 MHz radio-frequency modulation. The S and P interference patterns are converted to radio frequency (RF) electrical signals by photo diodes 460 and 480.

Each of the S and P RF signals are mixed with a 900,000,010 Hz signal from Splitter C 450 to perform heterogeneous demodulation. After this mixing, the quadrature demodulated signals (I & Q) for the S and P polarizations are converted to digital data streams by four high speed Analog to Digital Converters (ADCs). These digital data streams are processed by a large number (typically 4,096) of digital correlators to extract the raw correlation values that will be processed by the embedded controller 510.

In some examples, the signal used to modulate the laser is a PRC sequence that repeats every 8,191 symbols. This PRC is transmitted at a rate of 100 MHz. These numbers determine many of the fundamental attributes of the system. The total length of the fiber, for example, cannot be so long that the PRC sequence has a chance to repeat. This gives a maximum length of approximately 8 km for the example. If the fiber were longer than that, the correlations could not tell whether the reflections were coming from the 0 point or the 8,192 point.

The PRC sequence length also determines the system's base sampling rate.

$$\frac{100,000,000}{8,191} = 12,208.5 \text{ Hz} \qquad (5)$$

Each correlator is listening for the PRC, but each one starts at a slightly different spot in the sequence, corresponding to a distance along the fiber. For each tick of the 100 MHz carrier, the light travels about 2 m. Since reflections are sought, the light has to travel out and back, so each step in the sequence represents a distance of about 1 m on the fiber. So, a correlator attempting to match the sequence starting at step 4 should hear its reply one cycle before a correlator attempting to match the sequence starting at step 5. This, then, means the first correlator is hearing reflections from a point one meter closer to the laser than the second correlator.

Each correlator's start point can be set independently of the others. One can choose to monitor up to 1,024 different locations on the fiber. If they are configured consecutively, the result will be 1,024 sensor zones, each one 1 meter wide. For a cable longer than 1 km, clearly some zones will need to be larger than 1 meter. The positioning of each correlator is done by setting the initial PRC point, which is configured by software.

The accumulated correlator data in the example are sent out to telemetry output when the PRC restarts every 12,208.5 Hz. The telemetry data in each sample includes the telemetry counts for each correlator in each of the four banks. This telemetry stream is sent out to the embedded controller 510 software for signal processing and analysis.

The digital hardware also includes a command and control interface, operated by a microprocessor, such as a Rabbit microprocessor, on a 100 Mbit fiber optic line separate from the telemetry stream 850. For the description of this and other examples the inventors will refer to the microprocessor as a Rabbit microprocessor and alternately "Rabbit", but it should be known that other types of microprocessors can be used. The Rabbit interface has a simple structure to allow for reliable communications. Packets are serially numbered, ensuring that dropped packets and responses can be detected and retransmitted.

The Rabbit interface in the example has access to all FPGA registers. It has complete control of all FPGA functions and configuration registers, and is able to read the system status. The Rabbit is also used to program the correlator zone memories, which determine the locations on the fiber to which each correlator is tuned. The Rabbit can even reprogram the FPGA PROMs, to support remote upgrading of the electronics.

The example has a small form factor, custom laser controller, 48 VDC operation of optics and electronics, field upgradeable FPGA, FPGA bitfile encryption support (hack resistance), lower noise floor, ability to use 48 kHz sampling rate, and event detection software unbundled.

An example implementation is comprised of the following: The S2 and S3 systems are Dell PowerEdge T320 servers. The embedded controller 510 software is heavily compute-intensive, and requires high-end processing capabilities. Each T320 server includes an 8-core hyper threaded Xeon processor at 2.3 GHz, which provide a total of 16 processors. Each server includes 32 GB of RAM and 2 TB of high-speed SAS disk storage in a RAID 5 array, to allow for continuous recording of the 100 MB/s telemetry streams. Each includes two GB Ethernet ports on the motherboard, and two additional GB Ethernet ports for the telemetry and Rabbit interfaces.

This example hardware also includes three connections to the outside world; first is the fiber optic connection going to the sensing fiber 505. Second is a gigabit Ethernet fiber optic cable, which carries the 800 Mbps telemetry stream 850 as UDP packets. Third is a 100 Mb Ethernet fiber optic cable, which carries traffic to and from a Rabbit processor that is used by software to configure and control the hardware. These connections are ordinary Ethernet fiber.

The UDP packets that carry the telemetry samples are 8,232 bytes long. This has implications for the configuration of the embedded controller 510 system. The maximum frame size in an Ethernet system is, per specification, 1,500 bytes. Because that low number causes unacceptable overhead as network speeds have increased, many network appliances support "jumbo frames" of up to 9,000 bytes. This support is absolutely required in any network equipment. Without jumbo frame support, the network interface simply sees the telemetry packets as noise. When diagnosing network issues, it is a good practice to check the network driver configuration for this setting.

To reduce the load on the embedded controller 510 application in the example, the telemetry hardware does not actually send each telemetry sample in a separate UDP packet. This would result in 12,000 network interrupts per second, a number that puts too much stress on the embedded controller 510 system. Instead, seven samples are sent together as subunits of single packet of 57,624 bytes. This reconstruction is done by the embedded controller's 510 network interface.

The system requires a mechanism for storing the large amounts of audio sensor data that are produced during real-time operation, so that portions can be replayed out-of-real-time. This allows an operator to listen to past history for particular regions on the fiber after a detection event, and allows events to be saved for post-processing for training BDRA-style algorithms. Real-time audio processing can only monitor two channels, which is not nearly enough.

The audio server always maintains the last two or three minutes of audio data for all channels. In addition, the audio server should have the ability to "snapshot" the current audio store for permanent use, while continuing to record new incoming data. These snapshots should be time stamped. The audio server should have the ability to deliver audio streams to client applications on demand, including reading from saved snapshots. The audio streams should be delivered as AVI files. In some examples, the audio is streamed live.

The input data for the audio server is the composite audio stream from the embedded controller 510. This stream includes the raw $\Delta\Phi$ values for every channel in the telemetry. To make the bandwidth manageable, $\Delta\Phi$ values are sent as 16-bit half-precision floating point values. Since the $\Delta\Phi$ values have a very small range ($-2\pi$ to $+2\pi$), the limited precision does not adversely affect the data quality.

With 400 channels, the total bandwidth of this audio data is 10 MB/s. With 1024 channels, the total bandwidth is 25 MB/s. This should fit comfortably in a gigabit Ethernet without undue load.

The primary purpose of the audio server is to record the audio to disk, in a large circular buffer. To accommodate three minutes of data, the size of the circular buffer is about 1.7 GB for 400 channels, and about 4.5 GB for 1024 channels. The audio server pre-allocates an empty disk file of this size, and starts recording data at the beginning. In some examples, when the end is reached, the server rewinds back to the beginning and continue writing, looping around endlessly.

The server needs a way to signal the location of the current end/begin point in a way that can be recovered in future runs. One possible solution is to embed a timestamp or a sequence number in the data as it is written. A future application could reconstruct the end/begin point by scanning the file and looking for an inconsistency. Another possible solution is to keep a separate "resource fork" file for each audio file in the store which tracks statistics. As an audio record is written, a corresponding record is written into the "resource fork", which can be scanned much more quickly.

The audio server needs the ability to save a snapshot of the entire audio record upon request, to prevent overwriting of potentially interesting information. This is easily accomplished by pre-allocating a brand new circular buffer and starting the recording process over. The existing data file will be renamed with timestamp information so it can be replayed later. The audio server may include a simple web server which will respond to web requests for much of its functionality.

The system requires an administration user interface (UI). Although a traditional Windows application might be more flexible, it is possible that the administration UI could be a web page displayed in an ordinary browser, and would allow administration tasks to be handled remotely. This UI may include a file browser to manage the set of saved snapshots, and allow renaming, copying, and deleting of snapshots, as well as showing metadata about the snapshots (such as a timestamp). The UI may show a log of all received requests, display statistics about the amount of data received and transmitted, allow configuration of adjustable server parameters (such as the size of the circular buffer). It will include the ability to play back sections of the audio data.

In another example, the system further includes polarization signal characteristic processing functions (not shown), which are used together with the previously described feature that the heterodyning function provides in reducing fading, of the backscattering signal. These polarization processing functions are disclosed in the commonly assigned U.S. Pat. No. 6,043,921 entitled "Fading-Free Optical Phase Rate Receiver," hereby incorporated herein in it's entirely. The optical heterodyning feature which provides benefits in reducing fading includes: (i) cooperation of two phase locked laser light sources in the formation of the optical interrogation light wave applied to optical fiber 505, or other linearly extended light propagation medium producing Rayleigh effects backscattering, and (ii) the manipulation of this by photo diodes 460, 470, and 480 to provide the composite electronic receive signal as output to RF links 540, 545, and 550. This takes advantage of the feature of more favorable Heterodyne fading conditions in a way, in which polarization and phase state signal fading is materially reduced in the detected backscattered light wave. The electronic decoding module of U.S. Pat. No. 6,043,921 is substantially an equivalent to the correlator system herein. However, the system disclosed in U.S. Pat. No. 6,043,921 for implementing polarization fading reduction (if not substantially eliminating fading) is a generalized standalone system for processing any optical phase signal having temporally varying polarization, phase, and phase frequency. It must be adapted for application to the integrated optics 500 by appropriate integration included the two following alternative approaches.

One approach for such adaptation passes the fade-free optical phase rate (FFOPR) photoreceiver RF signal to the correlators 810, performs the correlation on the RF signal and completes the Phase Demodulation by In phase and Quadrature phase (hereinafter I & Q) demodulating the correlated RF signal into outputs. This method creates low bandwidth I & Q components and therefore requires low bandwidth analog-to-digital converters (implying a requirement for a large number of analog RF correlation electronic components). This RF correlator approach requires two correlator circuits for every virtual sensor element, or spatial channel, along fiber 505. One correlator is needed for the vertical polarization RF signal path and one correlator is needed for the horizontal polarization RF signal path.

Another approach applies the I & Q demodulator of the U.S. Pat. No. 6,043,921 (herein incorporated by reference in its entirety) prior to correlation. An example of this approach is depicted in FIG. 4. This approach therefore correlates a wideband set of four I & Q signals. One I & Q set is for horizontal polarization and the other I & Q set is for the vertical polarization. In this case the I & Q signals are the I & Q signals for the whole virtual array rather than for one virtual sensor element of the array. Four correlators 830, 835, 840, and 845 are required for each sensor element. One correlator is applied to each of the four wide bandwidth I & Q signals for each virtual sensor element. This second approach requires very wideband analog-to-digital converters, but allows digital correlators to be used instead of analog RF correlators. The RF correlator or first approach requires far more analog to digital converters and RF electronics. The digital correlator approach enables the correlators to be implemented by the digital approaches of massively integrated logic circuits and/or programmed processors, requiring far more digital logic, but substantially reducing the RF electronics and number analog-to-digital converter units in the system.

It is to be appreciated that other phase demodulation schemes for fiber optic signals use a phase carrier technique which does not allow the clipping operation. Clipping is a preferred amplitude control mechanism. The amplitude control passes an amplitude stabilized signal to an I & Q demodulator. The I & Q demodulator removes the carrier, that is it shifts the center radian frequency of the amplitude stabilized $B(t,L_m)$ from $\Delta\omega$ down to zero. The I & Q demodulator outputs a voltage proportional to $\cos(\Phi_m)$ and a voltage proportional to $\sin(\Phi_m)$ on separate electrical paths. The $\cos(\Phi_m)$ and $\sin(\Phi_m)$ proportional voltages are converted in an output signal proportional to $\Phi_m$ by the phase detector.

An example implementation of the I & Q demodulator will now be presented. An amplitude stabilized $B(t,L_m)$ signal (originating from the amplitude control) is passed to a power splitter. Half of the signal power exiting from power splitter is passed to analog mixer, balanced mixer, Gilbert cell, or analog multiplier. The other half of signal power exiting from power splitter is passed to analog mixer, balanced mixer, Gilbert cell, or analog multiplier.

The reference oscillator generates an electronic wave proportional to $\cos(\Delta\omega t)$. As noted earlier herein, this reference oscillator is also the oscillator employed in the conventional phase lock mechanism establishing the fixed phase relationship between the frequencies of primary laser 405 and local oscillator laser 710 whose differences in frequency, $\Delta\omega$, are of a very low order. In accordance with known principles of heterodyning lightwaves having fixed phase relationships, heterodyning these signals can produce a difference beat signal small enough to be in the RF signal range, but with the frequency difference sufficiently high to provide the heterodyning with a band pass allowing transforming a given binary code rate into corresponding code components of the beat signal, such as the code rate of the PRN code sequence produced by PRN code generator 3430. This reference oscillator wave is passed from the reference oscillator to the amplifier. The wave is amplified by the amplifier and passed to hybrid coupler. The hybrid coupler splits the amplified reference oscillator electronic wave into two components one proportional to $\cos(\omega t)$ on one electrical path (providing the "I", or In-phase reference); and one proportional to $\sin(\Delta\omega t)$ on another electrical path (providing the "Q", or Quadrature-phase reference).

The In-phase reference is multiplied (or frequency mixed) with a portion of the signal from laser 405. The resulting signal may be amplified by amplifier and passed to electronic lowpass filter 1135. The lowpass filter 1135 removes high frequency components of the multiplication or frequency mixing process and results in an output which is proportional to $\cos(\Phi_m)$.

The Quadrature reference is multiplied (or frequency mixed) with the remaining portion of the signal from laser 405. The resulting signal may be amplified by amplifier and passed to electronic lowpass filter 1135. The lowpass filter 1135 removes high frequency components of the multiplication or frequency mixing process and results in an output which is proportional to $\sin(\Phi_m)$.

One of the potential sources of confusion involves the terms "zone" and "channel". Technically, there are two different concepts. Based on the period of the pseudo-random number generator in the hardware, an exemplary system is capable of handling a fiber with 8,191 zones, each of which is about one meter wide. However, because of practical constraints in the exemplary hardware, there are only 400 correlator cells for each of four orientations listening to the demodulated signal. The telemetry stream consists of the output of those correlator cells. As a result, only about 400 out of those 8,191 possible zones can be monitored. The zones are not required to be contiguous. The 400 data-producing zones would properly be called "channels". However, the terms are usually used interchangeably.

The hardware can send the raw values in two different formats. In integer format, there are 800 values in each TPU (for 200 zones), as 32-bit signed 2's complement numbers, with a typical range of +/−4,000,000. In float format, there are 1600 values in each TPU (for 400 zones), as 16-bit IEEE half-precision floats. These floats have the same data values, scaled by a factor of Ser. No. 16/777,216 to fit in the limited range of a half-precision exponent.

Refer to FIG. 6. Philosophically, each IP and QP pair for a given channel can be thought of as a vector, as can the each IS and QS pair. Because of the 10 Hz beat note introduced in the hardware (the outgoing signal is modulated onto a 900 MHz carrier, but the returning signal is demodulated against a 900,000,010 Hz carrier), this vector rotates slowly around zero. In a perfectly operating system, the tip of the vector would describe a nearly perfect circle (actually a spiral, as the signal power rises and fades). The next step in the processing is to compute correction factors to bring the raw I & Q vectors closer to that ideal circle.

To do that two values are computed—"mu," or $\mu$, which is an indication of how non-circular the vectors are, and "delta phi," or $\Delta\Phi$, which is an indication of how close the I/Q phase difference is to 90 degrees.

The mu computation is done in several steps. Dot products of each of the combinations (IP×IP, IP×QP, QP×QP, IS×IS, IS×QS, QS×QS) are calculated and used in the following computations:

$$muP = \frac{\sqrt{\Sigma QP^2} - \sqrt{\Sigma Ip^2}}{\sqrt{\Sigma QP^2} + \sqrt{\Sigma Ip^2}} \quad muS = \frac{\sqrt{\Sigma QS^2} - \sqrt{\Sigma IS^2}}{\sqrt{\Sigma QS^2} + \sqrt{\Sigma IS^2}} \quad (6)$$

$$muP1 = \sqrt{\frac{\Sigma IP^2}{(1-muP)^2}} + \sqrt{\frac{\Sigma QP^2}{(1+muP)^2}} \quad muS1 \quad (7)$$

$$= \sqrt{\frac{\Sigma IS^2}{(1-muS)^2}} + \sqrt{\frac{\Sigma QS^2}{(1+muS)^2}}$$

$$mu = \frac{muP1 - muS1}{muP1 + muS1} \quad (8)$$

Mu, then, is a measure of the difference in amplitude between the I & Q signals, computed separately for each polarization and then combined into a unified value. Ideally, the system should be tuned so that mu is 1. MuP, muS and mu are displayed in the application to allow this to be adjusted.

The overall delta phi number is not directly computed. Instead, separate component factors are used to create a correction matrix that is used to bring the raw numbers closer to that ideal 90 degree phase difference. The computation of the factors uses these equations:

$$\Delta\Phi P = \frac{1}{2}\sin^{-1}\left(\frac{\Sigma IP \cdot QP}{\sqrt{\Sigma IP}\sqrt{\Sigma QP}}\right) \quad (9)$$

$$\Delta\Phi S = \frac{1}{2}\sin^{-1}\left(\frac{\Sigma IS \cdot QS}{\sqrt{\Sigma IS}\sqrt{\Sigma QS}}\right) \quad (10)$$

$$Pterm = \frac{1}{(\cos 2\Delta\Phi P)(1+mu)} \quad (11)$$

$$Sterm = \frac{1}{(\cos 2\Delta\Phi S)(1+mu)} \quad (12)$$

The information from the previous equations may be used in the correction matrix. These are 2×2 matrices, referred to in the code as corcP and corcS:

$$corcP = \begin{bmatrix} \dfrac{Pterm \cdot \cos\Delta\Phi P}{1-\mu P} & \dfrac{-Pterm \cdot \sin\Delta\Phi P}{1-\mu P} \\ \dfrac{-Pterm \cdot \sin\Delta\Phi P}{1+\mu P} & \dfrac{Pterm \cdot \cos\Delta\Phi P}{1-\mu P} \end{bmatrix} \quad (13)$$

$$corcS = \begin{bmatrix} \dfrac{Sterm \cdot \cos\Delta\Phi S}{1-\mu S} & \dfrac{-Sterm \cdot \sin\Delta\Phi S}{1-\mu S} \\ \dfrac{-Sterm \cdot \sin\Delta\Phi S}{1+\mu S} & \dfrac{Sterm \cdot \cos\Delta\Phi S}{1-\mu S} \end{bmatrix} \quad (14)$$

Next, corrected IP, QP, IS, and QS values are computed from the raw values by simple matrix multiplication:

$$\begin{bmatrix} IP_{corr} \\ QP_{corr} \end{bmatrix} = \begin{bmatrix} IP_{raw} \\ QP_{raw} \end{bmatrix} \cdot [corP] \quad \begin{bmatrix} IS_{corr} \\ QS_{corr} \end{bmatrix} = \begin{bmatrix} IS_{raw} \\ QS_{raw} \end{bmatrix} \cdot [corS] \quad (15)$$

After applying the correction factors, the length of the IP and QP vector represents the total "power" in the channel for this sample. This value is stored in pwrPptr and pwrSptr arrays, which are summed into a single "channel strength" indicator in pwrPptr.

The next computation, which produces the most important output of this phase of computation, is the change in the angle of the IQ vector from sample to sample. This change is also called "delta phi", or $\Delta\Phi$, although this use of the term is not the same as the usage above. Above, the term was used to refer to the difference between the two phases. Here, the term is used to refer to the change in the angle of the vector between samples.

There is a simple trigonometric identity that leads to this computation:

$$\sin(x-y) = \sin x \cos y - \cos x \sin y \quad (16)$$

$$\cos(x-y) = \cos x \cos y + \sin x \sin y \quad (17)$$

I & Q signals are 90 degrees out of phase. I is the cosine, and Q is the sine. The I value of the last sample is k cos(x), the Q value of the last sample is k sin(x), the I value of the current sample is k cos(y), and the Q value of the current sample is k sin(y), where k is some largish constant:

$$ip\text{Dot}_N = ip\text{Corr}_{N-1} \cdot ip\text{Corr}_N + qp\text{Corr}_{N-1} \cdot qp\text{Corr}_N \quad (18)$$

$$qp\text{Dot}_N = ip\text{Corr}_{N-1} \cdot qp\text{Corr}_N - qp\text{Corr}_{N-1} \cdot ip\text{Corr}_N \quad (19)$$

$$ip\text{Dot}_N = is\text{Corr}_{N-1} \cdot is\text{Corr}_N + qs\text{Corr}_{N-1} \cdot qs\text{Corr}_N \quad (20)$$

$$qp\text{Dot}_N = is\text{Corr}_{N-1} \cdot qs\text{Corr}_N - qs\text{Corr}_{N-1} \cdot is\text{Corr}_N \quad (21)$$

This, then, gives $k^2 \sin(x-y)$ and $k^2 \cos(x-y)$. The squared constant can be replaced by another trigonometric identity:

$$\tan(x-y) = \frac{\cos(x-y)}{\sin(x-y)} \quad (22)$$

By dividing ipDotN by qpDotN, the constants cancel each other out, and the arctangent of the quotient can be used to find the angle change:

$$\Delta\Phi P = \tan^{-1}\frac{ip\text{Dot}_N}{qp\text{Dot}_N} \quad \Delta\Phi S = \tan^{-1}\frac{is\text{Dot}_N}{qs\text{Dot}_N} \quad (23)$$

The two ΔΦ values are stored in vectors called phiPptr and phiSptr, and the power values are stored in pwrPptr and pwrSptr. As the final step, the two orientations are combined into one result vector. The power values are added together, and the ΔΦ values are combined proportional to the corresponding power values:

$$phiTdotPtr = pwrPptr + pwrSptr \qquad (24)$$

$$phiTdotPtr = \frac{pwrPptr \cdot phiPptr + pwrSptr \cdot phiSptr}{pwrPtr} \qquad (25)$$

The values in the power vector are typically about 1014, plus or minus an order of magnitude. The ΔΦ values are in radians, and range from −2π to +2π, although the typical range in normal operation is very narrow, from about −0.25 to +0.25.

Those two values (ΔΦ and total power) are the final output of the first phase of the Controller processing. These values are accumulated in ping pong buffers for 102 or 103 TPUs, until 2,048 sets have been accumulated. At that point, the ping pong buffers are switched, some statistics are reset, and the completed buffer is passed into FFT_proc for the second phase of processing.

The FFT_proc function is handed a set of 2,048 samples, in the form of the ΔΦ and total power values for each channel. Processing here is done in two separate loops, both of which run for each channel. The original input arrives in the form of two matrices. pwrHat is a vector with 400 elements containing the average power for 400×2048 elements, containing the ΔΦ values for each channel in each sample.

In the first loop, the ΔΦ values are passed through a bandpass IIR filter, which attenuated frequencies outside the range 18 Hz to 300 Hz. The filtered results are stored in phiBufFiltPtr. This filtered result is then passed through a Fast Fourier Transform, producing 2048 complex values. Because we are using 2048 values when our input data rate is 12.2 kHz, each FFT frequency bin represents 6 Hz of spectrum. Because the fiber is physically incapable of transmitting vibrations much above a few hundred hertz, only 100 FFT bins are used in further computations, representing frequencies between 18 Hz and 618 Hz. These are stored in pFFTDif1Span, a 100×2048 matrix.

$$S = FFT_{2048}(\Delta\phi)^2[3:102] \qquad (26)$$

After the first loop has completed, the function generates a packet for the audio stream on UDP port 5006. The stream can include two separate audio signals (sent as the left and right channels of a stereo stream), where each signal is actually the subtractive difference between two channels. The four channels to be used in the stereo stream are sent to the embedded controller 510 as part of the command stream, which arrives on UDP port 5000.

After sending out the audio packets, the second loop through the channels is entered in FFT_proc. This is the loop that produces the detection stream. If the power level (meaning the pwrHat value from the first phase, which contains the length of the IQ vector) in any channel is below 10% (faded signal) of the average pwrHat value for all channels, no further processing occurs for that channel.

For channels with pwrHat above the 10% threshold, previous channel's FFT bins are subtracted from the current channel's bins, then the power spectrum in the FFT bins is computed. This takes the absolute value of each complex element, producing a positive real result, stored in p1Spectra.bin. A running average of the power in each frequency bin is maintained in p1MeanSpectra. The current power in each channel is divided by the average in that channel, and values are summed. If a channel happens to be at its average levels, this will result in a sum of 100 (the number of frequency bins kept), so 100 is subtracted from this result. This difference is stored in pDetect, which is eventually transmitted as the detector value for this channel.

$$\hat{S}_c = \frac{\sum^N Sc}{N_c} \qquad (27)$$

$$Det_c = \sum \frac{S_c}{\hat{S}} - 100 \qquad (28)$$

Thus, the detector value can run from −100 (for a channel with no detectable signal) to 0 (for a channel at its historical average) to numbers in the hundreds of thousands (for channels with an active stimulus).

There is additional code in the embedded controller 510, not currently used, to use spans of two and three adjacent channels to enhance the detector value. This code takes the FFT results for two (or three) adjacent channels and sums them together, then computes the power spectrum using the same computation as for a single channel. If the resulting sum shows a larger detection value than the single channel result, the multichannel result is used.

After the second loop is completed, the result is a pDetect array containing 200 elements, one for each channel. This array is then transmitted out the detector stream on UDP port 5003, following by the audio data on UDP port 5006.

According to the physics, any stimulus that causes the fiber to stretch at any point should cause the laser light to be delayed by an equal amount in all zones from the point of the stimulus on to the end of the cable. Thus, when a sudden increase in the spectrum occurs in a zone, the same increase in the spectrum should be reflected in all succeeding zones. Many of the records show expected results, however, there are also many recordings where a stimulus causes a hit only at the point of the stimulus, and not beyond it.

If the results were consistent, it would be appropriate for the embedded controller 510 to try to subtract the detection values for a zone from the detection values for all succeeding zones. Since results have not been consistent, at this point in time the detection values are sent out as computed, and it is up to the post-processing applications to use statistics to detect this.

Note that the audio results from the embedded controller 510 are the result of subtracting two channels, but that subtraction is done on the ΔΦ signals prior to the FFT.

The preceding values are exemplary examples and not intended to limit the scope of the invention. Although the present invention has been described with several examples, a multitude of changes, variations, alterations, transformations, and modifications may be suggested to one skilled in the art, and it is intended that the present invention encompass such changes, variations, alterations, transformations, and modifications as fall within the scope of the appended claims.

In another example signal fidelity may be improved using predetermined frequency settings in the carrier wave. Frequency modulation, called FM, is a more sophisticated modulation scheme than AM modulation. It is well-suited to the inherent properties of optical fiber since proper recovery of the encoded signals only requires measurement of timing information, one of fiber's strengths. FM is also immune to amplitude variations caused by optical loss, one of fiber's weaknesses. The heart of the frequency modulator revolves around a high-frequency carrier. Now, instead of changing the amplitude of the carrier, the frequency of the carrier is changed according to differences in the signal amplitude. Part of the advantage of FM systems is buried in mathematical analyses that show that the signal-to-noise ratio at the receiver can be improved by increasing the deviation of the carrier. FM also has the advantage of eliminating the need for highly linear optical components that are required for AM systems. Often optical systems employing FM encoding refer to the technique as pulse-frequency modulation (PFM). This simply means that the FM signal is limited (converted to digital 0's and 1's) before it is transmitted over the fiber. The result is the same.

Three techniques for FM transmission include sine wave FM, square wave FM, and pulse-frequency modulation. The presence of harmonics yields the notable difference between sine wave FM, square wave FM, and pulse-frequency modulation. The square wave FM spectrum signal contains only odd-order harmonics. The pulse-frequency modulation spectrum contains all odd- and even-order harmonics yielding a cluttered spectrum poorly suited for multiple-channel stacking; however, it retains its value as a single-channel transmission scheme. Sine wave FM offers an effective means of transmitting multiple channels. In this technique, multiple channels are each assigned a separate carrier frequency.

Often optical systems employing FM encoding refer to the technique as pulse-frequency modulation (PFM). This limits the FM signal by converting it to digital 0's and 1's before transmission. Generally the modulator is designed so that the pulse frequency increases as the input voltage increases.

In another example, micro-doppler optical fiber sensing it is well understood in the art of, the optical fiber sensing system as described herein advantageously utilizes, but is not limited to, a high power fiber optic laser (HPFOL) architecture which provides high efficiency, scalable output power, and unprecedented packaging flexibility. The HPFOL architecture also offers a highly effective transmitter solution for micro-Doppler sensor systems, especially for very long ranges, e.g., ranges up to hundreds of kilometers, which requirement translates into the need for a high average power transmitter. The range requirement also translates into a need for a receiver which is insensitive to phase noise.

As discussed briefly above, micro-Doppler optical fiber sensing systems work by transmitting highly coherent signals along an optical fiber. Disturbances to the fiber phase modulate the reflected or backscattered light at the point of incidence. The backscattered light is detected by a coherent receiver that recovers the induced phase modulation and hence the vibration spectrum of the disturbance. The nature of the disturbance can be classified by comparing its vibration spectrum with spectra stored in a data base.

In an example the optical fiber sensing system is micro-Doppler. The micro-Doppler optical fiber sensing system includes a transmitter and a receiver, both of which are preferably operated by a controller. The controller can include a computer, microcomputer, or dedicated microprocessor, e.g., a digital signal processor, for controlling the transmitter and receiver during predetermined first and second operating modes, as discussed in greater detail below.

In the transmitter, a master oscillator (MO) is connected to a fiber optic power amplifier via a frequency shifting (FS) circuit, which FS circuit receives a modulation frequency signal produced by a voltage controlled oscillator. Preferably, master oscillator is a stable, very narrow linewidth laser, which operates in a $TEM_{00}$ mode at a frequency within the gain spectrum of the power amplifier and which is coupled by optical fiber to deliver a continuous wave signal to downstream components in the transmitter. It will be appreciated that the master oscillator laser can suitably be any conventional master oscillator laser. It should also be mentioned that some conventional components that are understood to be a potential part of an optical fiber sensing system have been omitted from the drawings and detailed description so as not to obscure the fundamental features of the invention. For example, one of ordinary skill in this particular art would appreciate that an optical isolator may be located immediately downstream of the master oscillator to prevent feedback from downstream components, e.g., power amplifier, that would induce instability in the master oscillator. The details of such components are well known to those skilled in the art and will not be discussed further.

Master oscillator (MO) generates a first signal with a coherence time $T_c$, where:

$$Tc=Ic/c=2\pi/\Delta\omega \tag{29}$$

where $I_c$ is the coherence length and $\Delta\omega$ is the linewidth of the laser beam. The first signal is preferably delivered to FS circuit, which performs a frequency translation or shifting function. The FS circuit beneficially can be a photonic network or any one of several conventional devices such as an acousto-optic modulator. In any case, the frequency of the output signal $\omega_{out}(t)$ is translated up or down from the un-modulated carrier signal $\omega_0$ produced by the MO 610 by the frequency $\omega_{vco}(t)$ of the VCO. In other words, the output signal of FS circuit can be determined from the expression:

$$\omega_{out}(t)=\omega_0+\omega_{vco}(t) \tag{30}$$

This frequency translation advantageously permits transmission of a frequency chirp on the output signal to establish an estimate of range to disturbance and disturbance velocity, as discussed in further detail below.

In order to recover the translational and micro-Doppler information from the backscattered laser return, a frequency translated sample of the master oscillator is phase locked to the received signal. The FS circuit in the receiver translates the master oscillator frequency to $\omega_{10}=\omega_0+\omega_{vc2}$ and this signal is used as the local oscillator (LO) signal provided to the optical mixer 525. The combination of the LO signal and the received backscattered light preferably is provided to double balanced receiver. The frequency $\omega_{vc2}$ output by the VCO is controlled by the phase locked loop electronics so that the derived LO signal tracks the received signal in phase.

The controller can be coupled to transmitter and receiver so as to permit the transmitter and receiver to be operated in first and second modes of operation during analysis of a disturbance. It will be appreciated that gross analysis of velocity and range can be performed using the chirped frequency transmit laser beam. However, the chirped frequency transmit laser beam is often not well suited to fine analysis of the disturbance. Therefore, the VCO is operated only until a gross range and velocity for the disturbance is obtained. During a second, CW mode of operation, the VCO is turned OFF, which permits the phase locked laser (PLL) in receiver to settle and, thus, provide a better environment for vibration signature determination.

An example, is a phase drift compensating method. This method includes a step for continuously measuring the phase difference $\Delta(t,T)$, where $\Delta(t,T)=\phi(t)-\phi(t-T)$, between a signal emitted by the transmitter at the present moment E(t) and the signal emitted by the same transmitter at an earlier time $E(t-T)$, where T is shorter, and preferably much shorter, than the coherence time $T_c$ of the laser. It will be noted that $T_c=l_c/c$. The method also includes a step for summing the phase difference over the round trip propagation time $T_p$ to predict the value of $\Delta(t,T)$ when backscattered light is introduced to the optical mixer in the coherent receiver. In practical cases of interest, $T_p$ will be greater than the nominal coherence time $T_c$ for the transmit laser beam. The measured value of $\Delta(t,T)$ is used to phase modulate a sample of the laser beam produced by the master oscillator, which sample corresponds to the arrival time of the backscattered light, so as to permit a cumulative phase drift compensated (CPDC) laser beam sample to be used as the local oscillator signal in the coherent receiver.

Stated another way, a first example is a method for impressing the calculated phase error accumulated during the round trip propagation time $T_p$ on the sample of the output laser beam to simulate an output laser beam delayed by an equivalent path length. This is equivalent to generating a local oscillator signal $E(t)\exp(j\Delta(t,T))$ which is equal to $E(t-T)$. Advantageously, the performance of a CPDC homodyne micro-Doppler optical fiber sensing system is substantially similar to the performance of a non-compensated micro-Doppler optical fiber sensing system using a very narrow linewidth.

A detailed understanding of the first example of the micro-Doppler sensing system can be attained by considering selected components of a micro-Doppler optical fiber sensing system according to a second example of the micro-Doppler sensing system. It will be appreciated that the aforementioned examples pertain to a CW operating mode of a micro-Doppler optical fiber sensing system. Moreover, the components described within said examples of the micro-Doppler sensing system advantageously can be used as a sensor system for obtaining vibration signatures of stationary structures such as bridges.

In the second example of the micro-Doppler sensing system an output laser beam produced by the master oscillator has a frequency $\omega_0$ with a time varying phase $\phi(t)$, which leads to a finite coherence time $T_c$ and finite coherence length $I_c$. The output laser beam produced by the MO can alternatively be expressed as $A\exp\{\omega_0+\phi(t)T\}$. This output laser beam is then divided into first and second laser beams by a first beam splitter 410. Preferably, the first laser beam is provided as a local oscillator signal to the double balanced receiver via a phase modulator and an optical mixer 525; the second laser beam is provided to a phase sensor and power amplifier beam splitter. Beam splitter splits the second laser beam into third and fourth laser beams. The third laser beam is amplified in power amplifier to thereby generate the transmit laser beam directed by transmit optics; the fourth laser beam is provided to a phase sensor.

The phase sensor advantageously includes a phase sensor beam splitter, which is connected to a phase sensor optical mixer via parallel optical paths. One of the optical paths advantageously includes a delay loop while the other optical path is a simple optical fiber. The combined laser beam generated by optical mixer is output to a pair of photo diodes. It will be recognized that the phase sensor is an unequal path length Mach Zehnder interferometer for which the differential delay is a value T, which advantageously is set by design to be significantly less than the coherence time, $T_c$, of the MO and substantially shorter than the round trip delay time, $T_p$.

Advantageously, the intensities of the output laser beam produced by MO in optical fiber and the delayed version of this output laser beam produced in delay loop is measured by the photo diodes. The differences between the outputs of the photodiodes, $\Delta(t,T)$, represents the phase difference between the output laser beam produced by MO and the delayed laser beam produced by delay loop. This value $\Delta(t,T)$ is measured by fast electronics, represented by the amplifier, once each delay period (i.e., at t, t+T, t+2T, and so on), and each successive value is stored in, for example, a logical bucket-brigade shift register included in cumulative phase error processor. It should be mentioned that the actual method is slightly more complex than that described, but, since it is well known to those of ordinary skill in the art, will not be described in greater detail. Preferably, the successive values for up to NT are stored in error processor, where T=NT. The N+1th value is added to a sum which represents the computed value of $\Delta(t,T)$ and which is updated for every change in delay interval. It will be recognized that since the range R to the disturbance changes with time, the value of N must be measured and updated periodically, e.g., a lookup table in error processor can be used to determine N for a number of discrete ranges $R_i$.

Preferably, the computed value of $\Delta(t,T)$ is then applied to the phase modulator, which advantageously can be disposed upstream of the optical mixer in the receiver. The modulation produced by the phase modulator is equal to the accumulated phase drift during the round trip propagation delay $T_p$ between the optical fiber sensing system and the disturbance. Advantageously, correction of the output laser beam supplied to optical mixer permits the receiver to function as an equal path interferometer; thus, laser phase noise has no effect on the receiver. Naturally, an error in making each phase measurement propagates through the optical fiber sensing system. However, since these individual errors add randomly, the error in the computed phase drift $\Delta(t,T)$ will grow proportional to the square root of T, $\sqrt{T}$. The signal from the double balanced receiver is then processed, as discussed in detail below, to recover the vibration spectrum of the disturbance. It should be mentioned that the vibration spectrum is obtained with the added benefit that the deleterious effects of laser phase noise have been either eliminated or effectively removed. It will be appreciated that phase noise elimination is a profound advantage of the system.

The double balanced receiver (DBR) preferably includes photo diodes and one or more amplifier(s). The optical signal at one of the photo diodes can be represented by the equation:

$$A_{del}=A_{mp}\cos(\omega_0+\omega_{vc2})t+\Phi_0!+Ar\cos(\omega_0+\omega_{vc1})(t-\tau)+a(t-\tau/2)! \qquad (29)$$

where $\delta(t-T/2)$ represents the phase modulation of the transmitter signal induced by the vibrations of the disturbance and is given by $\delta(t-T/2)=2\omega_0\Delta x(t-T/2)/c$, where $\Delta x(t-T/2)$ is the vibrational displacement of the disturbance. In the double balanced receiver, two such output signals are combined in a difference amplifier that allows rejection of amplitude noise from the MO. It will be appreciated that this technique is well known in the field of telecommunications and will not be discussed in any greater detail. It will also be appreciated that signal generation in DBR is substantially identical to signal generation in phase sensor. DBR can also include an automatic gain control circuit to insure that the output of DBR is suitable for further processing in I/LPF and the micro-Doppler baseband detector.

The AC component of detected photocurrent at each of the photodetectors in double-balanced receiver is given by the equation:

$$i_s = KA_{mo}A_r \cos(\omega_{vc2}-\omega_{vc1})t+\omega_0 T+\Phi_0-\sigma(t-T/2)!  \quad (30)$$

It should be noted that the term $\omega_0 T$ contains the translational Doppler information, where $T=2R/c=2(R_0-vt)/c$, where $R_0$ is the instantaneous range and v is the closing velocity of the disturbance. It will also be appreciated that the translational Doppler frequency is therefore expressed as $\omega_d=-2\omega_0 v/c$, which can be tracked out by the phase locked loop in the receiver, i.e., the loop essentially drives the output of each of the balanced detectors to the same amplitude and in effects sets $\omega_{vc2}-\omega_{vc1}=\omega_d+\omega.\text{sub}.\mu d$, and hence the closing velocity is obtained from the mean value of the loop control voltage using range-velocity processing circuitry and display, which circuitry is well known to those of ordinary skill in the art and will not be discussed further.

If the disturbance is moving, the signal from the double balanced receiver will be offset in frequency due to the Doppler effect by an amount $\Delta\omega$, where $\Delta\omega=2V/\lambda_0$. That is, the micro-Doppler spectrum is shifted from baseband by $\Delta\omega$, so that the closing velocity of the disturbance can be determined from the mean value of the total Doppler spectrum. Although shifted from baseband, the micro-Doppler spectrum is not corrupted by laser phase noise in the micro-Doppler optical fiber sensing system; the disturbance vibration spectrum can be recovered by beating the signal back to baseband. One method to recover translational Doppler is to shift the frequency of the receiver reference signal after effecting the laser phase error correction by using an appropriate (e.g. an acousto-optic) modulator, and low-noise RF oscillator to produce an output receiver signal at an intermediate frequency. The micro-Doppler signal is recovered after frequency conversion to baseband. This, or similar circuitry is well understood by those skilled in the art.

The effects of phase noise in the laser source are compensated in some configurations in either homodyne or off-set heterodyne micro-Doppler optical fiber sensing system configurations.

The homodyne coherent micro-Doppler optical fiber sensing system according to the second example includes a transmitter, a receiver, the controller and a cumulative phase delay compensator. Preferably, the MO is replaced by a voltage controlled laser oscillator, which receives an error control signal from sensor via an amplifier; advantageously, the error control signal drives VCO in such a way that the phase drift of laser oscillator is minimized to thereby limit the cumulative phase drift during the round trip propagation period $T_p$.

The cumulative phase error processor receives the amplified phase error signal from an amplifier and a range estimate $E_R$ from range and velocity processor in receiver.

Advantageously, the range estimate $E_R$ is used to determine the number N of samples needed to accurately compensate for the phase drift during the period $T_p$. It should also be noted that VCO receives appropriate portions of the signal generated by range and velocity processor via an amplifier. As noted above, the vibration signature of the disturbance is extracted from the output of DBR by a micro-Doppler baseband circuit and can be displayed using micro-Doppler signature display.

In an alternative example, a heterodyne version of the micro-Doppler optical fiber sensing system includes first and second master oscillators in transmitter and receiver, which subsystems are preferably operated by controller and which subsystems advantageously are interconnected by the cumulative phase drift compensator. It will be appreciated that first and second master oscillators in conventional optical fiber sensing systems would be required to have natural oscillation linewidths that are narrower than the spectrum of the induced phase deviations in the backscattered light. However, since the compensator in the micro-Doppler optical fiber sensing system extends the effective coherence length beyond the actual coherence length $l_c$, the linewidth of the master oscillator may be somewhat broader than for conventional systems.

It should be mentioned that a particularly suitable application for example configurations would include any remote vibration sensing application for which the range to the disturbance would be sufficiently long as to pose laser phase stability problems with respect to the micro-Doppler signal recovery process. A significant subset of the above-mentioned application is in remote sensing of disturbance vibrations for applications such as non-cooperative disturbance classification or intelligence gathering in situations under which the laser phase noise of the master oscillator effectively masks the signal of the disturbance, i.e., a disturbance located at a range R beyond the coherence length $l_c$ of the MO in the transmitter. It will be appreciated that micro-Doppler optical fiber sensing systems can be used to measure the vibrational spectrum of bridges, buildings, pipelines, pumps, taxiing aircraft, volcanoes, etc.; the vibration spectrum obtained can reveal the mechanical health of machinery and structures for a variety of purposes.

Additionally, the increased sensitivity of a sensor system including the cumulative phase drift compensator would increase the accuracy of vital sign measurements of remotely located people or animals. Furthermore, the examples are not limited to systems for obtaining vibration signatures of objects; other parametric signatures advantageously can be obtained. In all cases, when $R \gg l_c$, the effects of laser phase noise will degrade or render the measurement impossible if not compensated by the method as described herein.

Advantageously, the method according to an example and the apparatus according to the second example can best be implemented using real-time digital signal processing to provide control of the generated optical signal applied to the optical mixer, but there are several variants of the basic control system that are feasible. These differ in hardware and/or software, but all use well established components and digital signal processing techniques. For example, the integrated optics 500 illustrated in FIG. 1 could be replaced by a heterodyne micro-Doppler optical fiber sensing system. Moreover, various combinations of elements can be made to realize various alternative examples of the micro-Doppler optical fiber sensing system as described herein. For example, the laser oscillator could be replaced by MO so that the feedback connection from the amplifier can be omitted. It should also be recognized that one or more of an analog to digital converter, a digital signal processor, and a digital to analog converter can be incorporated.

The disclosed high power micro-Doppler optical fiber sensing system can be built to detect and classify non-cooperative aircraft disturbances at ranges up to hundreds of kilometers. In addition, a coherent transmitter array of high power fiber amplifiers, permits scaling to even greater ranges. The use of a sensitive optical fiber preamplifier in the receiver also offers significant flexibility and benefits. Inclusion of a cumulative phase drift compensator between the transmitter and the receiver for eliminating phase noise sensitivity in the receiver provides a significant improvement over conventional micro-Doppler optical fiber sensing systems, i.e., the compensator significantly increases the effective range of the micro-Doppler optical fiber sensing system in the vibration signature acquisition mode of operation. The disclosed system according to the second example is highly sensitive, compact, rugged, highly efficient, lightweight, and reliable, and can provide revolutionary installation flexibility. Moreover, since the micro-Doppler optical fiber sensing system leverages off developments in the telecommunications field, system costs are expected to be lower initially and to drop even further in the foreseeable future.

The micro-Doppler optical fiber sensing system discussed above is unique in its ability to scale the transmitter output power up to arbitrarily high levels to meet stringent range requirements. Since laser-diode-pumped rare-earth-doped optical fiber amplifiers can be tuned over a wavelength range of tens of nanometers, it is possible to select advantageous operating wavelengths that do not overlap the numerous fine absorption lines that occur in the atmosphere. The highly coherent laser signal required can be generated at conveniently low levels and amplified up to any output power level required. Eliminating phase noise using a cumulative phase drift compensator has the same effect as narrowing the linewidth of the selected operating transmit laser beam frequency.

The OFDR imaging designs and methods described herein allow the extraction of velocity, position, and magnitude of reflections on a high resolution scale (~10 μm). For an ideal, linearly-chirped OFDR system and a single stationary point disturbance, the detected signal will be a constant frequency sinusoid the magnitude of which is proportional to the reflectivity of the disturbance. Qualitatively, if the disturbance is now moving at a constant velocity then the received signal consists of a chirped frequency sinusoid whose average or nominal frequency will be Doppler upshifted or downshifted depending on the relative motion of the object with respect to measurement system and the rate of the source frequency sweep. Thus by estimating the chirp the actual location of the disturbance along with its velocity is obtained.

For a single target, the instantaneous beat frequency, $f_b$, generated by the OFDR system is approximately given by the equation:

$$f_b = f'\frac{2z}{c} = f_0\frac{2v}{c} + 2f'\frac{2v}{c} \tag{31}$$

where $f_0$ is the known starting optical frequency, $f_1$ is the known optical frequency sweep rate from that frequency, z is the unknown target range (with respect to the fixed reference mirror), v is the unknown target velocity (normal to the incident light beam), and c is the speed of light. The first term is a constant frequency proportional to the distance to the target; the second term is proportional to the velocity of the target and is the Doppler component; and the final term is the chirp in the beat frequency which is proportional to the target velocity times the optical frequency sweep scan rate. For multiple targets, the beat signal will consist of the sum of differently weighted multiple beat frequency terms.

There are a variety of algorithms, well known to those skilled in the art of radar analysis, that are utilized to extract Doppler information from the received waveform. The optical technique, with its large frequency sweep rate (orders of magnitude larger than in RF or typical optical radar) enables a unique means of extracting Doppler information from a single sweep. A disturbance at a certain distance produces a beat frequency which is proportional to its distance. If the disturbance is moving, a Doppler offset is added to this beat frequency, and this combined beat frequency is broadened (chirped) by the disturbance motion. Neither the range nor Doppler offset are known a priori. Further, in many situations there may be multiple disturbances with different ranges and velocities.

In one example a method of extracting both range and velocity information multiplies the digitized received waveform by a series of de-chirping functions having quadratic time-dependent phase factors of the form $\exp(-jKt^2)$, each differing by the proportionality constant K. Each value of K is related to a different Doppler velocity and the known optical frequency scan rate. Each of the series of de-chirped waveforms is then Fourier transformed using an FFT or other suitable algorithm. For each chirp parameter, the corresponding Doppler offset is subtracted in the frequency domain from the transformed signal to provide the portion of the beat frequency arising from range. Each disturbance produces a peak signal from a different distinct point in the range-velocity plane. In another example, chirped pulses are sequentially incident onto the disturbance and Doppler information is extracted by processing the reflected light across the multiple pulses, in a manner similar to that of 10.6 μm long-range optical radar.

In another example, range and Doppler information may be extracted using the information contained in a complete cycle of swept frequency, as is known in the art of FM-CW radar systems. In the first half of the scan, if the reference frequency is greater than the delayed return frequency from the disturbance (for relatively large ranges, and smaller Doppler shifts), and in the second part of the scanning cycle where the reference frequency is monotonically decreasing, the reference frequency is less than the delayed return frequency from the disturbance. If the disturbance is stationary, the difference frequency of the interferometric beat signal is the same for both portions of the sweep. If the disturbance is moving, its frequency is Doppler shifted, so that the difference frequency between the reference and delayed Doppler-shifted return frequency from the disturbance will not be the same during two half sweeps. After finding the spectra and corresponding disturbance ranges from the two half-cycles, the mean of the (Doppler shifted) disturbance return positions will give the disturbance position, and the difference between the mean and individual spectra will give the Doppler shift.

High frequency sampling increases output signal fidelity, however, it requires large amounts of processing power. For instance, a 24 kHz carrier wave being sampled at 100 MHz requires 240 million calculations per second. Slowing the clock reduces required processing power, however millions of calculations still need to be calculated per second for high frequency carrier waves. For instance, if the sampling rate is reduced by an order of 10 to 10 MHz, 2.4 million calculations need to be processed per second for a 24 kHz carrier wave. To reduce required processing power while increasing signal fidelity, the carrier wave may be lower frequency. A lower frequency carrier wave will not have to be sampled as often.

Dynamically modulating the frequency of the carrier wave allows the user to adjust the system settings as needed for processor requirements/capabilities.

In some examples Doppler techniques are used to determine one or more of instantaneous velocity, acceleration, direction, phase change, and frequency. In some examples Doppler techniques may be used for audio reconstruction.

In another example methods are disclosed that increases sensor frequency sensitivity to 24,000 Hz. 12,208.5 Hz is the sampling rate for the example. Nyquist's theory, thus, says that the example should be able to detect perturbations up to 6 kHz (0-6,000 Hz), although the physical characteristics of the cable and its sheathing also limit this rate.

The example also has the ability to use a PRC with a period of 2,047 bits. This reduces the maximum fiber length to about 2 km, but it increases the sample rate by a factor of four, to 48,834 Hz, which should produce audio in a range up to 24 kHz.

In another example filtering high low band pass is disclosed. This method is well suited to focus incoming data from the sensors to particular frequency ranges of interest. The ability to dynamically change the bandpass(es) is included in the software. It is useful to be able to apply high, low, or high/low bandpasses to the incoming data in instances where only particular frequencies are of interest. For instance, if the fiber optic sensing system is being used only to detect seismic events, the only data of interest would be in frequencies common to seismic events so bandpasses could be used to weed out data that is uninteresting to the particular application. It is important to be able to dynamically change the bandpass(es) applied in the event one begins to detect an event in the range of interest and the event changes frequency until it is no longer in the range of interest.

Dynamic Virtual Zones

Referring now to FIG. 1 regarding the general system, in another example, the acquisition system may include a suitable processor 510 (e.g., general purpose processor, microcontroller) and associated memory 520 device for performing processing functions, such as normalization of the acquired data, data averaging, storage in a data storage, and/or display to a user or operator of the system. In some examples, the acquisition system may include an analog-to-digital converter to digitize the signal and the amplitude information then can be acquired from the digital data stream.

As described so far, the benefit of heterodyne detection is the improved signal-to-noise ratio that can be obtained from the heterodyne process and also an improvement in the dynamic range since the heterodyne signal is proportional to the square root of the backscatter intensity (rather than being linearly related to that signal). The heterodyne (or more generally the coherent detection) process generally improves the signal-to-noise ratio, because the electrical signal that is detected is proportional to the square root of the local oscillator (LO) power. The latter can, in principle, be made arbitrarily large and thus the electrical signal presented to the preamplifier can be arranged to be much larger than the preamplifier noise. The LO is accompanied by its own noise and once this noise source is significantly greater than the noise of the receiver, the signal-to-noise ratio is within a factor of 2 of the ultimate shot noise limit which is determined by the number of signal photons arriving. As a result, this implementation approaches the characteristics of a perfect detector. However, when extracting only the amplitude information, the strain-optical signal transfer function is highly non-linear and unpredictable.

Accordingly, examples described herein are directed at improving the linearity of the detection system by using the phase information that is available in a coherent-detection OTDR system 500 but which previously has not been extracted for use to measure a parameter, such as strain, that is incident on the optical fiber sensor 505. The phase of the scattered signal from a given region of optical fiber 505 is a result of the summation of the electric field phasor of each scatterer, just like the electric field amplitude for that region. The phase is stable provided the frequency of the optical source is stable and the fiber is not disturbed in that region. Therefore if, between the two regions of undisturbed fiber, the fiber is strained, the phase-difference between these two regions will respond linearly to the applied strain. To measure this phase-difference, examples employ a coherent-detection OTDR system (e.g., either a heterodyne or homodyne OTDR system) to extract phase information from the backscatter signal.

An example of a phase-measuring coherent-detection OTDR system 500 (i.e. integrated optics) is shown in FIG. 1, which includes a phase-detection circuit 525 (i.e. the mixer) that detects the phase of the mixed output signal (e.g., the IF signal) generated by the coherent-detection system 500 relative to an external reference (e.g., an IF source). The phase-detection circuit 525 for extracting the phase of the mixed output signal can be implemented by a variety of commercially available devices. In an example shown in FIG. 1, the IF source (which generates the driving signal used to shift the relative frequencies of the LO and the backscatter signals by a known amount, which is related to the frequency of the driving signal) is also fed to the phase-detection circuit 525 to provide a reference. Thus, the phase-detector 525 provides an output that is proportional (modulo 360°) to the phase-difference between the backscatter signal (mixed down to IF) and the reference from the IF source.

In general, the technique described above for detecting phase in the backscatter signal, such as for measuring changes in local strain along the length of the sensing fiber, can be summarized as follows. The optical output of a highly-coherent optical source 405 is divided between two paths 33 and 39. The carrier frequency of the signal in one or both of the paths may be frequency shifted to ensure that the carrier frequencies of the optical signals in the two paths differ by a known amount. In some examples, as will be explained below, frequency-shifting is not employed so that the difference in frequency is zero.

Regardless of whether frequency-shifting is employed, the signal in the first path 33 is modulated and may optionally be amplified. The signal is then launched into the sensing fiber 505, which generates a backscatter signal in response. The backscatter return is separated from the forward-travelling light and then mixed in the mixer 525 with the light in the second path (e.g., path 39 onto at least one photo diode 460, 470, and/or 480 to form a mixed output signal, such as an IF signal. In examples in which there is no frequency shift, this IF is at zero frequency. Based on a known speed of light in the sensing fiber, the phase of the IF at selected locations along the fiber can be extracted and measured. The difference in phase between locations separated by at least one pre-defined distance interval along the fiber is calculated. Finally, at least one more optical signal is launched into the sensing fiber 505, phase information at locations along the fiber is extracted from the resultant mixed output signal (created by mixing the backscatter signal with the light in the second path), and the phase differences between locations are determined. A comparison is then performed of the phase differences as a function of distance (obtained based on the known speed of light) along the fiber for at least two such input signals. The results of this comparison can provide an indication and a quantitative measurement of changes in strain at known locations along the fiber 505.

Although the foregoing discussion has described the cause of changes in the phase-difference of the backscatter signal as being strain incident on the optical fiber, other parameters, such as temperature changes, also have the ability to affect the differential phase between sections of the fiber. With respect to temperature, the effect of temperature on the fiber is generally slow and can be eliminated from the measurements, if desired, by high-pass filtering the processed signals. Furthermore, the strain on the fiber can result from other external effects than those discussed above. For instance, an isostatic pressure change within the fiber can result in strain on the fiber, such as by pressure-to-strain conversion by the fiber coating.

Regardless of the source of the change in phase differentials, phase detection may be implemented in a variety of manners. In some examples, the phase detection may be carried out using analog signal processing techniques as described above or by digitizing the IF signal and extracting the phase from the digitized signal.

It will be recognized that other digital signal processing techniques known to those of skill in the art also can be used to extract the phase of the IF signal.

In some examples, the amplitude information from the backscatter signal is still present and can be used to assist the signal processing. The amplitude information is to some extent complementary to the phase information and can be used to supplement the phase data obtained from the main thrust of this disclosure.

As an example, in some applications, such as in seismic acquisition applications, repeated measurements of the backscattered signal under identical conditions are conducted and the results averaged in order to improve the signal-to-noise ratio.

The amplitude information can also be used in other manners to enhance the acquired data. As another example, the amplitude measurement is specific to each location, whereas the phase measurement includes a local element combined with an increasing phase as a function of distance. Thus, if there is a single point of disturbance along the sensing fiber 505, the disturbance will affect the amplitude only locally at the disturbance point, but the local disturbance will affect all the phases beyond that point. (This is why phase differences are determined to provide an indication of the desired parameter rather than phase information at a particular location.) Thus, examination of the amplitude information in conjunction with the phase information can facilitate distinguishing the effect of a small local perturbation from that of wider disturbance affecting the entire differentiating interval. Consequently, consideration of the amplitude information along with the phase difference can support a more detailed interpretation of the acquired data.

Homodyne Detection

Examples previously described here have shown the case where there is a frequency shift between the local oscillator signal and input signal. This technique, which is referred to as heterodyne detection, allows the phase to be estimated very simply by comparison of the phase of adjacent time sample points. We now turn to the case where there is no frequency shift between the local oscillator and the input signals. This is known in the communications literature as homodyne detection. While conceptually simple, this approach brings with it the problem of determining the local phase without reference to nearby sample points. Consequently, the phase must be determined directly, and this can be achieved using an optical 90° hybrid phase detection device.

Polarization Discrimination

The coherent detection process is intrinsically polarization-sensitive in that the signal produced is the product of the electric field vectors of the two optical inputs and therefore only that component of the backscattered light that is aligned with the local oscillator signal is detected. The orthogonal component is rejected. However, it is possible to split the incoming backscattered signal into any two orthogonal polarization states and mix each of these with a suitably aligned local oscillator signal. Using this approach has two distinct benefits. Firstly, this arrangement avoids polarization fading (i.e., the weakening of the signal when the polarizations of the backscatter signal and LO signal are not the same). However it should be noted that with Rayleigh backscatter in silicate glasses, the depolarization of the scattered light ensures that there is always a minimum of approximately 20% of the electric field of the scattered light in the orthogonal polarization state from the strongest, so this issue is not critical. More importantly, in some cases, the two polarizations may carry different information. This is particularly the case when asymmetric influences are applied to the fiber, such as a side force, which tends to act to vary the difference in propagation speed between the two polarization modes of the fiber (i.e. it alters the birefringence of the fiber). This applies to fibers that are nominally circularly symmetric (as are most conventional telecommunications fibers). However, special fibers can exploit the property of a polarization-diverse acquisition system more specifically.

Several of these concepts can be combined for example with a multicore fiber, where a single glass structure can encompass several cores, some with stress-birefringence, others arranged to respond differentially to pressure. While some cross sensitivity is to be expected, as long as the information can be separated (i.e. the data produced is well conditioned such that a transfer matrix from physical inputs to measured phases can be inverted), data on, for instance, pressure, strain and temperature transients can readily be separated.

For instance, examples of the phase coherent-detection OTDR systems can be implemented in intrusion detection applications or other types of applications where it may be desirable to detect disturbances to a fiber optic cable. Various types of applications would be seismic, well, intrusion, strain, temperature, pipeline, etc. As another example, examples of the phase coherent-detection OTDR systems can be employed in applications where the fiber optic sensor is deployed proximate an elongate structure, such as a pipeline, to monitor and/or detect disturbances to or leakages from the structure.

In one example, Rayleigh backscattering is utilized to produce information regarding disturbances incident to the fiber. The amplitudes and phases of the backscattered signal are compared to the interrogation signal and analyzed. Based on the information that is extrapolated from these comparisons, notable events are determined and catalogued. With these events the specific locations of activity, such as temperature change, strain, etc. can be determined.

At least some examples work similarly to radar—the fiber will be 'pinged' regularly with an interrogation light pulse to determine if there are any disturbances along its length. Until a disturbance has been identified, the fiber will continue to be pinged with the interrogation light pulse at time intervals dependent on user preferences and/or application. When the ping yields a result, a second pulse will be launched into the fiber to confirm that a disturbance has occurred. Should the second ping come back negative, it is determined that there was no disturbance and the interrogation pulses will return to standard operation. Should the second ping come back positive, a modulated signal will be launched into the fiber to determine the characteristics of the disturbance. The signal backscattered from the location of an incident disturbance is compared to the interrogation signal, the noise floor will be eliminated and the return will be analyzed for significant peaks, where significant is determined by user preferences and/or application.

Initially, the system is coarsely grated. Once a disturbance occurs it will show as a peak in the return signal. The fiber will be "pinged" and if a peak is still present, the peak will be bracketed to arbitrarily set up a zone of x width (with x being defined by the user) with the center of the bracket being the peak of the return signal. Once the peak is bracketed, it will officially be declared as an event and logged. Some configurations allow for disturbances to be accurately pinpointed to an exact location along the optical fiber.

According to some examples, FPGA correlators may be eliminated. Hardware, GPS, correlators will be used with pseudo-random code. This reduces the amount of processing power required in the system.

Virtual Correlation Cells

Referring now to FIGS. 18-21; in a non-limiting discussion by example, the workhorse in the hardware of another example is the correlators. In the one example there are 4,096 correlators in the hardware: 1,024 for each of the two polarizations for each of the two quadrature phases. It should be noted that the number of correlators can vary depending on system requirements such as cable length and desired resolution, and user preferences such as the use of virtual correlation cells.

As shown previously, the embodied design can monitor 200 zones at a fiber sensing rate of 12 kHz. In many cases, it is highly desirable to monitor many more zones. With only 200 zones, an 8 km fiber requires that zones have an average spacing of 40 meters. This spacing does not allow fiber disturbances to be accurately located. In addition, 40 meter wide zone spacing will pick up acoustical noise of a wider area potentially making signal identification and classification more difficult. It is clearly advantageous to monitor more zones.

There are several obvious ways to accomplish this that are simple extensions of an example to achieve the following:

Use more or bigger FPGAs. By upgrading to newer technology and higher capacity FPGAs, many more correlation cells can be implemented. However, larger FPGAs will cost much more and thus increase system cost. Additionally, larger FPGAs will increase power consumption.

Convert to an ASIC implementation. It is well known that large amounts of logic can be implemented in Application Specific Integrated Circuits (ASICs). Using ASICs could allow many more correlations cells to be implemented. However, ASICs are not flexible—the technology is cast in silicon and improvements require an expensive "spin" of the ASIC design.

Optimize the correlation cell. The system now supports 400 zones with the ability to re-position cell locations under computer control. Another architectural improvement has been prototyped that will allow 512 zones to be implemented using the original FPGA technology.

In another example the zones are sampled at a 12 kHz fiber sensing rate. For many applications, this rate is unnecessarily fast and does not hurt the operation. For low frequency examples, a 1 kHz fiber sensing rate is disclosed for seismic or low frequency detections. This fact suggests that by re-programming the correlation cell initial pseudo-random noise (PRN) phase in real-time, we can time share a single physical correlation cell to monitor multiple physical locations on the fiber optic cable. This time sharing can convert one physical correlation cell into a number of virtual correlation cells (VCC).

Currently, a given correlation cell is programmed to a specific location on the fiber optic cable. By changing the initial value of the correlation cell PRN after each 8191 samples, the cell can be made to examine different fiber locations at a lower sampling rate.

For example, a correlation cell could be "time sliced" to monitor four physical locations on the fiber optic cable as follows:

Sample Set 1:
    set initial PRN value for location 'A'
    run correlator for 8191 clock cycles to gather data for location 'A'
    save location 'A' result #1
    set initial PRN value for location 'B'
    run correlator for 8191 clock cycles to gather data for location 'B'
    save location 'B' result #1
    set initial PRN value for location 'C'
    run correlator for 8191 clock cycles to gather data for location 'C'
    save location 'C' result #1
    set initial PRN value for location 'D'
    run correlator for 8191 clock cycles to gather data for location 'D'
    save location 'D' result #1

Sample Set 2
    set initial PRN value for location 'A'
    run correlator for 8191 clock cycles to gather data for location 'A'
    save location 'A' result #2
    set initial PRN value for location 'B'
    run correlator for 8191 clock cycles to gather data for location 'B'
    save location 'B' result #2
    etc.

Using the 12 kHz fiber sensing rate as an example, the "time sliced" example above creates four virtual correlation cells each operating at an effective 3 kHz fiber sensing rate.

Using the 12 kHz fiber sensing rate as an example, the "time sliced" example above creates two VCCs each operating at an effective 6 kHz fiber sensing rate.

The number of virtual cells that can be implemented is determined by the required audio sampling rate and the fiber sensing rate. The ratio of these rates specifies the "physical to virtual zone multiplier." The following table illustrates the tradeoff for a variety of different rates:

TABLE 2

| Required Audio Sampling Rate | Physical to Virtual Zone Multiplier |
|---|---|
| 12 kHz Fiber Sensing Rate | |
| 12 kHz | 1x |
| 6 kHz | 2x |
| 4 kHz | 3x |
| 3 kHz | 4x |
| 2 kHz | 6x |

TABLE 2-continued

| Required Audio Sampling Rate | Physical to Virtual Zone Multiplier |
|---|---|
| 1 kHz | 12x |
| 300 Hz | 40x |
| 10 kHz Fiber Sensing Rate | |
| 10 kHz | 1x |
| 5 kHz | 2x |
| 3.3 kHz | 3x |

Thus, if a device has 200 physical correlation cells, uses a 12 kHz fiber sensing rate, and only requires an audio sampling rate of 2 kHz, then the system has a "physical to virtual zone multiplier" of six and can create 1,200 VCCs to monitor 1,200 locations on the fiber.

Creating virtual correlation cells (VCC) requires minor modifications to the actual correlation cell logic. The changes required are to the logic used to load the initial PRN phase value used by the correlation cell. Normally, for a 200 zone system, a block of FPGA memory is used to store the 200 initial PRN values to be loaded into the correlation cells. To implement 800 VCCs, the memory size is increased to allow 800 initial PRN values to be stored. Hardware or embedded firmware then automatically cycles through these 800 values by: using the first 200 values for the first 8191 samples; using the next 200 values for the second 8191 cycles; using the next 200 values for the third 8191 cycles; using the last 200 values for the fourth 8191 cycles, then, starting the cycle over . . . ; using the first 200 values for another set of first 8191 samples, etc.

Note that hardware or embedded firmware is used to control which group of initial PRN phase values stored in the memory is to be loaded into the correlation cells. It is critical that this operation be performed in real time.

Mixed Frequency Virtual Correlation Cells

An extension to the basic VCC concept outlined above allows different physical correlation cells to support a different number of VCCs. For example, one physical correlation cell might be mapped to four virtual cells while another physical correlation cell could be mapped to twelve virtual cells. This flexibility can allow critical sections of the fiber to be monitored at a much higher sampling rate while other sections are sampled at a much lower rate. This capability allows "high fidelity" and "low fidelity" zones to co-exist within a single system.

As an example, with 200 physical correlation cells operating at a 12 kHz fiber sensing rate (i.e., 100 MHz sampling clock), if the memory used to store the initial PRN phase values is twelve times larger than the actual number of correlation cells, the physical correlation cells could be allocated as follows:

TABLE 3

| Physical Zones | Virtual Multiplier | Virtual Zones | Fiber Sensing Frequency |
|---|---|---|---|
| 1 to 30 | 1 | 30 | 12 kHz |
| 31 to 60 | 2 | 60 | 6 kHz |
| 61 to 90 | 3 | 90 | 4 kHz |
| 91 to 120 | 4 | 120 | 3 kHz |
| 121 to 150 | 6 | 180 | 2 kHz |
| 151 to 200 | 12 | 600 | 1 kHz |
| Total Virtual Zones | | 1080 | |

In the above example, 200 physical correlation cells have been expanded into 1080 virtual correlation cells with fiber sensing rates varying from 1 kHz to 12 kHz. With very little additional hardware within the FPGAs, the number of zones has been increased by a factor of about five. Obviously, a different mixture of virtual multiplier values could be used to alter the mixture of virtual zone types.

The VCC architecture provides several other benefits:
The communication rate between the detection hardware and the signal processing software is greatly reduced. In the previous example, the prior art would require sending 1080 results at a 12 kHz data rate for software analysis requiring sending four 32 bit values for each zone requiring a communication bandwidth of 1.66 Gbit/sec. Using the VCC architecture, the data rate falls to 307 Mbit/sec.

Using the VCC architecture, the signal processing software deals with a smaller amount of data. Using the previous example, the architecture would have to process almost 12 million zones/sec (1080*12 kHz). The VCC architecture would only require processing 2.4 million zones/sec (200*12 kHz).

Double Buffering

Another example of the VCC architecture is to double the amount of memory used to store the initial PRN phase values. This allows the memory to be double buffered so that one half can be loaded by a host computer while the other half is actively being used for real-time loading of the correlation cell's PRN initial phase values. In this manner, the current set of data samples is not disturbed while a host computer is (slowly) loading a new set of values.

Zone Tagging

The data produced by the correlation cells is processed by computer or embedded controller 510 software to extract information that corresponds to fiber optic cable disturbances. The software needs to be able to "unravel" which data samples correspond to which virtual zones. Again using the 12 kHz fiber sensing rate example with 200 physical correlation cells, the 200 physical correlation cells will have data ready to be processed approximately every 82 microseconds (μsec). As the data is formatted for transmission to the computer or embedded controller 510, additional data (a tag) is added that specifies which group of PRN phase initialization memory was used to gather this set of data. Again using the example that supports a virtual multiplier of twelve, the sequence of data received by the computer or embedded controller 510 might be:

8+data, 9+data, 10+data, 11+data, 0+data, 1+data . . . 7+data, 8+data, 9+data . . .

In this example, the computer or embedded controller 510 program may have been started after the hardware began gathering data, so the first 8 groups of data (0 through 7) were missed. The first group actually received was 8+data, i.e., group 8 with its associated data for 200 correlation cells. Following the first group will be a stream of sequential tag+data samples. Since the computer or embedded controller 510 knows how the PRN initialization memory was loaded, given a tag and the data, it can map the data from each physical correlation cell to the proper VCC.

Alternate Examples

Although this disclosure used 100 MHz as a basic clock rate, it is clear that other frequencies could be chosen. Higher frequencies can be used to create zones smaller than one meter or to achieve correlation results at greater than 12 kHz fiber sensing rate. Likewise, lower frequencies could be used to allow cheaper A/D converters or longer fiber optic cable lengths.

Similarly, in another example the 13 bit PRN generator (8191 codes) could be changed to use different code lengths. A shorter code length could save logic; a longer code length could improve signal-to-noise ratios and increase the maximum fiber optic cable length. Although m-sequence PRN codes have been used in the descriptions, other modulation techniques could be used while implementing VCCs. These trade-offs and alternate implementations have no impact on the new concepts presented in this document.

Figure 18:
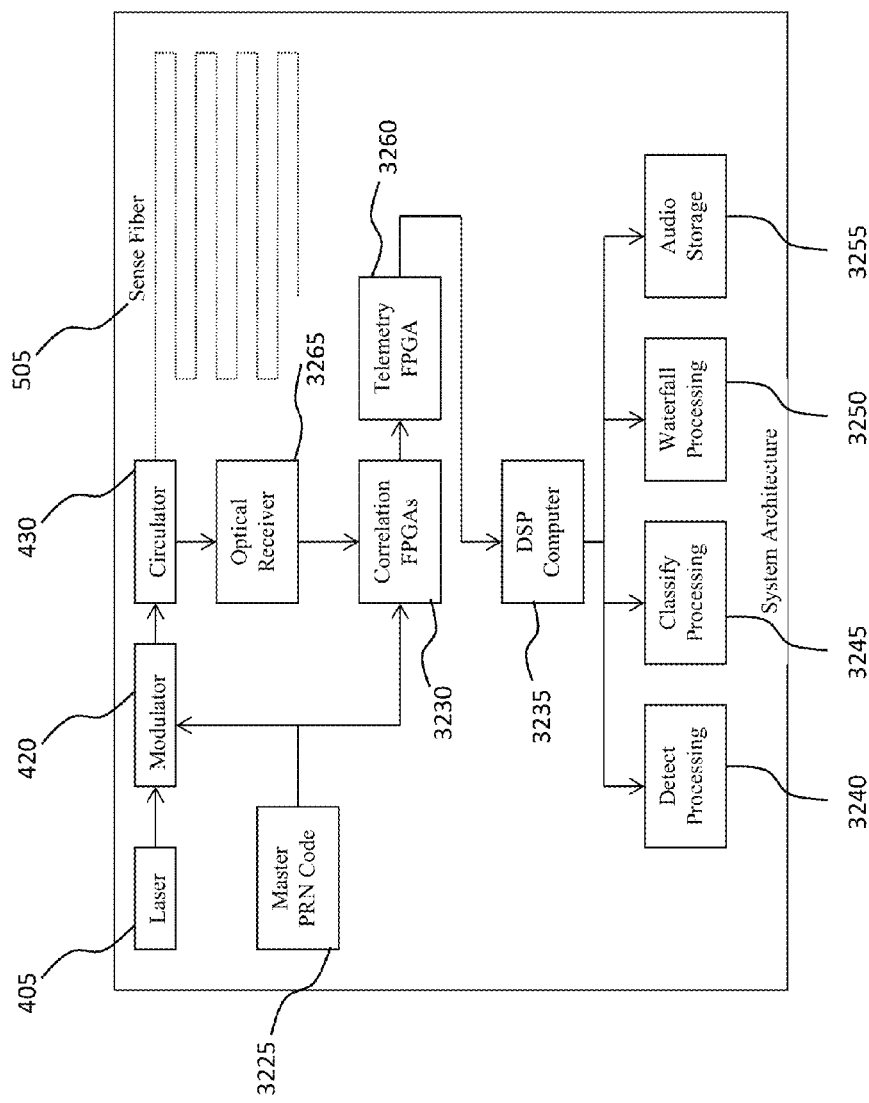
FIG. 18 depicts an example for the overall architecture of a fiber sensing system.

FIG. 18 depicts the overall architecture of an example of the fiber sensing system. A laser 405 produces a coherent light source that is modulated by modulator 420 with an m-sequence PRN code 3225. The modulated light beam is injected into the sensing fiber 505 using an optical circulator 3215 or other type of beam splitter. The modulated light then proceeds down the fiber. Rayleigh scattering causes some of the light to be reflected back to the source. The circulator 430 (or beam splitter) will direct the reflected light to the optical receiver 3265.

The optical receiver 3265 converts the light to a digital data stream representing the complex waveform that is the sum of the back-scattered light. The correlation FPGAs 3230 process the complex waveform to detect changes in the reflected light at various locations along the fiber. Since they also receive the master PRN code 3225, they are "in sync" with the optical light source 405 and can process the received data using correlation techniques.

Data from the correlation FPGAs 3230 is gathered by the telemetry FPGA 3260 and is sent to embedded controller computer 3235 using a high speed interconnect such as gigabit Ethernet. The embedded controller computer 3235 processes the correlation results and produces audio data that can be used to detect fiber activity. The embedded controller output can then be used by other signal processing blocks to perform at least one of detect 3240 physical activity near the fiber, to classify 3245 the type of activity (human, mechanical, natural, wildlife, etc.), to display a waterfall type display 3250, or to record data 3255 for later analysis.

Figure 19:
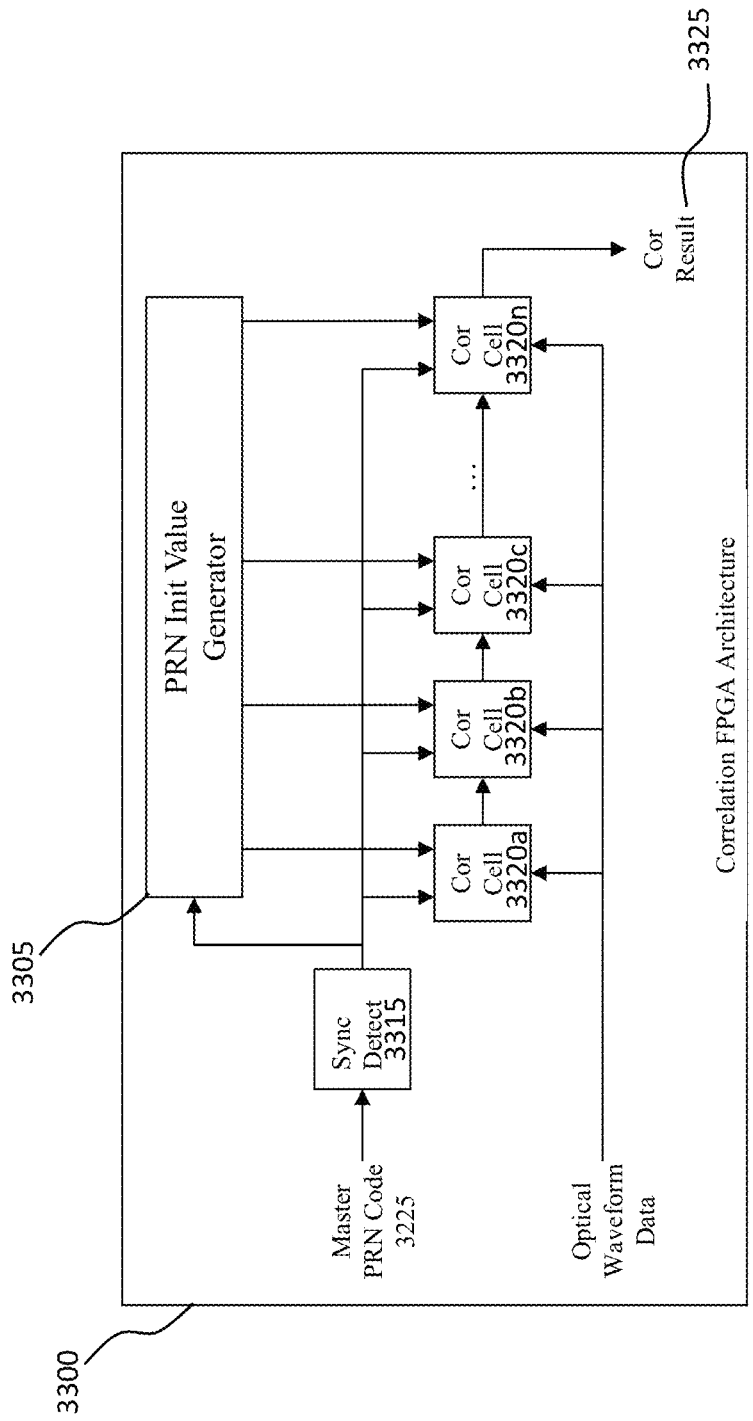
FIG. 19 illustrates an example for the architecture of a correlation FPGA.

FIG. 19 illustrates the architecture of a correlation FPGA 3300. The master PRN code 3225 and the optical waveform data (which is produced by A/D converters) are fed into the correlation FPGAs. The master PRN code 3225 is processed to detect the start of frame, i.e., sync. When sync is detected 3315, each correlation cell 3220a through 3220n reloads its PRN initialization value. This value determines the fiber location that each correlation cell 3220a through 3220n is processing. Each correlation cell 3220a through 3220n receives a unique initialization value since it is typically not useful to have multiple cells processing the same fiber location. In addition, the current correlation result 3325 is captured into a shadow register and is shifted out to the telemetry FPGA while the new correlation cycle is proceeding.

The PRN initialization value generator 3305 provides the initial value to each correlation cell 3220a through 3220n. In one example, the generator is simply a long shift register with 13 bits for each correlation cell 3220a through 3220n. In another example a RAM based architecture is used to reduce the logic and to allow highly dynamic reloading of the PRN initialization values. Multiple correlation cells 3220a through 3220n are used to allow monitor many locations along the fiber. Some examples allow up to 200 physical correlation cells in each FPGA. When the virtual correlation cell (VCC) technique is applied, this number can be multiplied to allow many more fiber locations to be monitored.

Figure 20:
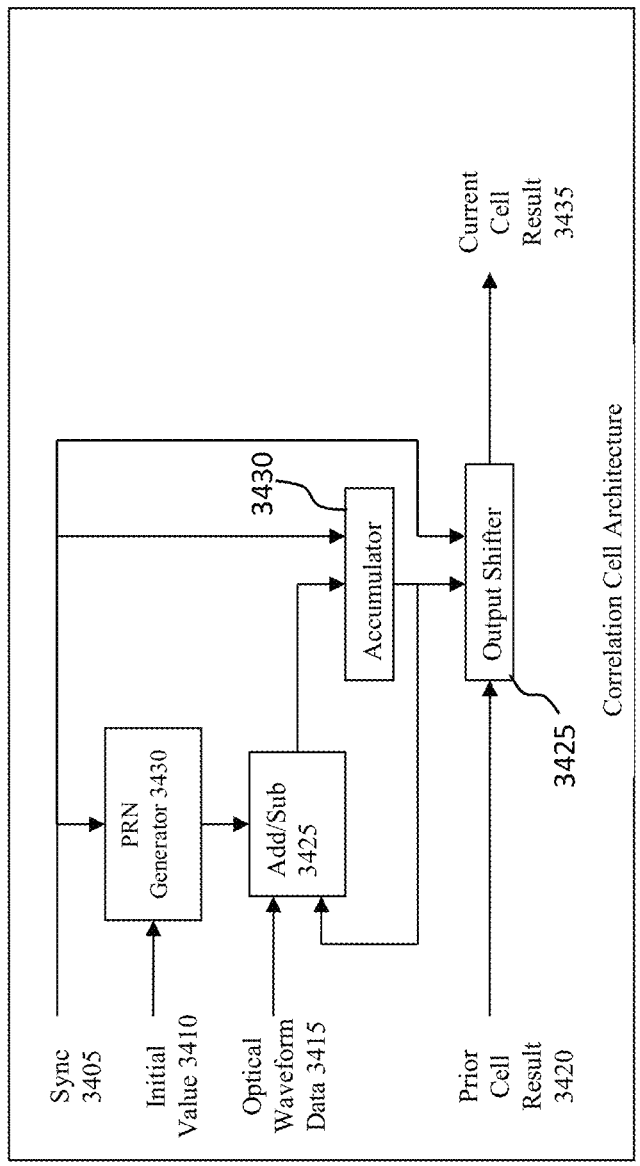
FIG. 20 illustrates an example for the architecture of a correlation cell.

FIG. 20 illustrates the architecture of a correlation cell. The sync signal 3405 pulses to indicate the start of a new correlation cycle. At the start of each cycle, several things happen: the current accumulator value is broadside loaded into the output shifter 3425; the accumulator 3430 is cleared to zero; the PRN generator 3430 is reloaded with the initial value 3410. Each clock cycle after the sync pulse 3405, the PRN generator 3430, using an m-sequence pattern, produces a new pseudo-random accumulator control bit.

The control bit produced by the PRN generator 3430 instructs the add/sub logic 3425 to either add or subtract the newest optical waveform data value 3415 from the accumulator 3430. In this manner, the incoming data is auto-correlated to monitor a specific position on the sensing fiber. The output shifter 3425 "snapshots" the correlation result 3435 then shifts it to the telemetry FPGA. The current design arranges the correlation results 3435 in a long shift register, but other implementations are clearly feasible. While the current correlation cycle is gathering a new result into the accumulator 3430, the prior correlation result 3420 is shifted out.

In a typical prior art example for allocating physical correlation cells to monitored fiber locations there six PRN initialization values are used to specify the fiber locations to monitor. In this case, locations at 0, 1, 2, 5, 10, and 15 will be monitored. Assuming the 12 kHz monitoring rate, each of these six locations will be sampled at 12 kHz. Six initialization values are stored, six correlation cells are used, and six fiber locations can be monitored.

Figure 21:
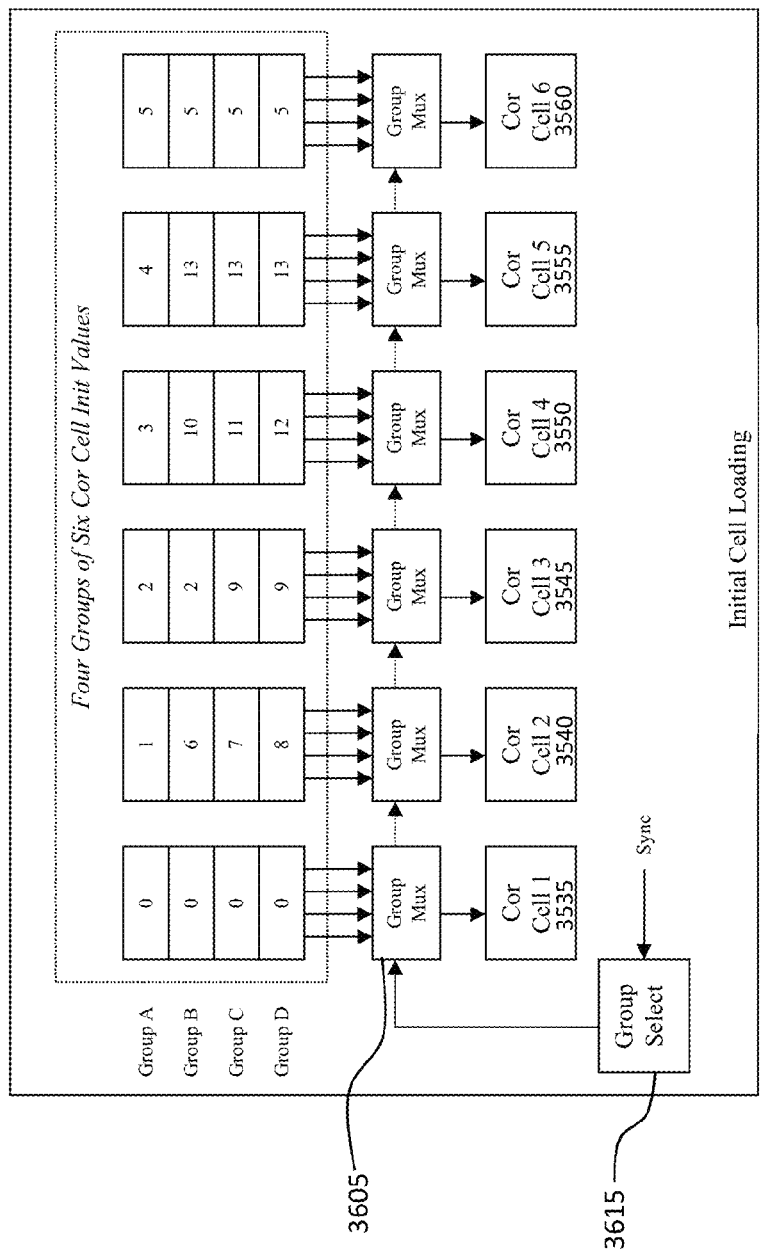
FIG. 21 depicts the current design with virtual correlation cells.

FIG. 21 depicts an example with virtual correlation cells. Here, twenty four initial PRN values are used to specify the fiber locations to monitor. The twenty four values are split into four logical groups, A-D, each with six initialization values, one for each correlation cell. Each group of six initialization values is used for one entire correlation cycle, i.e., 8191 clock cycles. After a group has been used, the next group of initialization values will be used for the following correlation cycle. With the initial values shown in the figure, again assuming a 12 kHz monitoring rate:

fiber locations 0 and 5 will be monitored at 12 kHz
locations 1, 3, 4, 6, 7, 8, 10, 11, 12 will be at 3 kHz
locations 2, and 9 will be at 6 kHz
location 13 will be monitored at 4 kHz The "Group Select" block 3615 selects the Group A, Group B, Group C, or Group D PRN initialization data. After each 12 kHz cycle completes, the next Group is selected to provide the PRN initialization data for the new cycle. In this example, this allows the six physical correlation cells to monitor fourteen physical locations.

Audio Extension to Wave Convertor

The disclosed audio tools are a suite of command-line tools for post-processing of recorded binary (BIN) files resulting from use of a fiber optic sensing system. "PullAllAudio" is essentially a repackaging of the first half of the Controller. In addition to reading live data and producing detection, power, and audio streams out onto User Datagram Protocol (UDP) sockets, the PullAllAudio function reads from a recorded BIN file, extracts audio data for each channel, and records that audio information into a set of binary files with an "AUD" extension. Because the ability to study different combinations of effects is desired, one of the command-line parameters says how "wide" each AUD file is. So, for example, if a width of 10 is specified, it will create these files:

audio-0000-0010.aud
audio-0001-0011.aud
audio-0002-0012.aud
audio-0003-0013.aud

The first file contains the audio difference between zone 10 and zone 0. The second has the difference between zone 11 and zone 1. For efficiency, there is another command-line parameter to disable overlaps, so output would be 0 to 10, then 10 to 20, then 20 to 30, etc. A special case can also produce all 1024 zones separately.

Those files contain the raw delta phi data—a collection of single-precision floats ranging from $-2\pi$ to $+2\pi$, which is useful for analysis. The second tool in the collection is ConvertAudio. This reads each of the AUD files, scales the values so the range goes from $-1$ to $+1$, converts it to 16-bit PCM, and writes it out in Windows WAVE file format.

There are other tools in the collection that have very specific uses. When first starting to make classifications only the regions of each audio file that were of interest for training were extracted. An analyst would listen to the recorded audio files and identify areas of interest using an audio analysis application and then extract those areas into individual WAV files. What is needed for the raw data to be processed for use is the original AUD data. To achieve this, a tool, which will be called WaveMatcher Tool for purposes of this disclosure, would compare each extracted audio snippet against the larger WAV file, find the matching section, and write a file of directives identifying where the snippet came from. Another tool, which will be called ExtractAudSection Tool for purposes of this disclosure, would then use that file of directives to extract the corresponding pieces from the original AUD file.

Method

Figure 22:
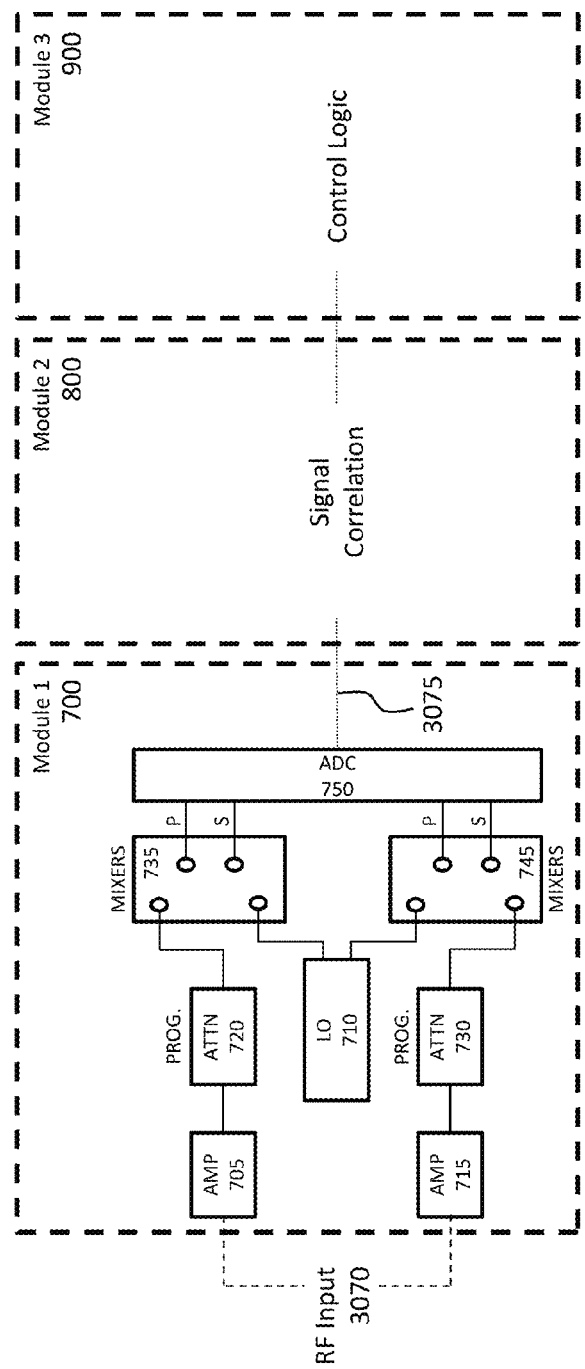
FIG. 22 depicts a method for extracting information from superimposed waves.

FIG. 22 depicts a method for extracting information from superimposed waves with a modular fiber optic interferometry control system. A first module 700 receives a radio frequency (RF) input 3070 comprising superimposed waves, amplifies (705, 715) and attenuates (720, 730) the RF input 3070, and relays the conditioned signals to first and second mixers (735, 745). Within the first module 700, a local RF oscillator 710 generates a signal which is split into two outputs where a first output is connected to a first mixer 735 and a second output is connected to a second mixer 745. The mixers 735, 745 transmit outputs representing pseudo-random number (PRN) code modulated backscattered signals to an analog to digital converter (ADC) 750 which outputs a multiplexed binary data stream 3075.

A second module 800 correlates a PRN reference with the received PRN code modulated backscattered signal and performs control operations. A third module 900 comprises control logic configured to store executable instructions on a computer readable memory, the instructions, when executed by one or more processors, cause the one or more processors to perform operations comprising at least one of data logging, communications, memory management, and light source management.

Non-Transitory Computer Readable Medium

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects, a computer readable medium may comprise non-transitory computer readable medium (e.g., tangible media). In addition, in some aspects a computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

It is to be understood that the claims are not limited to the precise configuration and components illustrated above. Various modifications, changes and variations may be made in the arrangement, operation and details of the methods and apparatus described above without departing from the scope of the claims.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention using examples, it should be apparent that the invention may be modified in arrangement and detail without departing from such principles. Claim is made to all modifications and variation coming within the spirit and scope of the following claims.

The invention claimed is:

1. A modular fiber optic interferometry control system to extract information from superimposed waves, the system comprising:
a first module comprising a radio frequency (RF) input comprising superimposed waves from at least one photo diode,
a first amplifier connected to a first programmable attenuator, wherein the first programmable attenuator is connected to a first mixer, operable to condition the RF input;
a second amplifier connected to a second programmable attenuator, wherein the second programmable attenuator is connected to a second mixer, operable to condition the RF input;
a local RF oscillator coupled to an RF splitter, wherein the RF splitter generates two outputs, wherein a first output of the two outputs is connected to the first mixer, and a second output of the two outputs is connected to the second mixer,
an analog to digital convertor (ADC) connected to an output of the first mixer and an output of the second mixer, wherein the outputs represent a pseudo random number (PRN) code modulated backscattered signal received from a fiber under test, and where the ADC output is a multiplexed binary data stream;
a second module comprising
at least one shift register correlator to correlate a PRN reference with the received PRN code modulated backscattered signal,
a processor to packetize and control communication;
a third module comprising control logic for the modular fiber interferometry controller, wherein the control logic includes a computer readable memory having executable instructions stored thereon, wherein the instructions, when executed by one or more processors, cause the one or more processors to perform operations comprising at least one of data logging, communications, memory management, and light source management.

2. The system of claim 1, further comprising a fourth module for generating a power stream wherein the one or more processors perform operations comprising at least one of wild point smoothing, circle correction, vector determination, merge change in phase data, and merge power data.

3. The system of claim 1, further comprising a module for event interrogation wherein the one or more processors perform operations comprising at least one of bandpass filtering and fast Fourier transform to output at least one of an audio stream and a data stream.

4. The system of claim 1, further comprising a module for noise reduction wherein the one or more processors perform operations comprising at least one of Kalman filtering, Bayesian inferencing, Bayesian updating, Markovian prediction, bandpass filtering, Butterworth filtering, adaptive filtering, background subtraction, and model fitting.

5. The system of claim 1, wherein the local RF oscillator generates a signal frequency equal to or different than the received signal to form an intermediate frequency signal.

6. The system of claim 1, wherein the at least one shift register correlator determines a time delay of the PRN code modulated backscattered signal.

7. The system of claim 1, wherein the third module control logic is configured to perform management operations for all modules connected to the modular fiber optic interferometry controller.

8. The system of claim 1, wherein the PRN code modulated backscattered signals are generated from at least one of acoustic pressure waves, electromagnetic fields, mechanical strain or pressure, and thermal strain or pressure.

9. The system of claim 1, wherein the fiber under test comprises at least one of a single-mode type, multimode type, and polarization preserving type fiber optic cable.

10. The system of claim 1, wherein the fiber under test has a length L and the light source is a laser having the capability to generate a signal with sufficient stability to retain coherency in propagation along the fiber under test for a distance at least equal to two times the length L.

11. The system of claim 1, wherein the fiber under test has a coating thereon made of a thermoplastic material having the combined characteristics of a low Young's modulus and a Poisson's ratio below that of natural rubber, wherein the coating enhances the longitudinal component of strain variation derived from an acoustic wave signal.

12. The system of claim 1, wherein all signal splitters and signal couplers use signal attenuators on all unused ports.

13. The system of claim 12, wherein the signal attenuator is a mandrel.

14. The system of claim 1, wherein the light source is a laser.

15. The system of claim 14, wherein the laser is one of continuous wave (CW) and pulse modulated CW.

16. The system of claim 1, wherein the system is enclosed by a material conducive for vibration attenuation.

17. A method for extracting information from superimposed waves with a modular fiber optic interferometry control system, the method comprising:
using a first module configured to:
receive a radio frequency (RF) input comprising superimposed waves,
using a first amplifier connected to a first programmable attenuator, wherein the first programmable attenuator is connected to a first mixer, operable to condition the RF input;
using a second amplifier connected to a second programmable attenuator, wherein the second programmable attenuator is connected to a second mixer, operable to condition the RF input;
generating a local oscillator signal using a local RF oscillator coupled to an RF splitter, wherein the RF splitter separates the local oscillator signal into two outputs, a first output is connected to the first mixer, and a second output is connected to the second mixer,
outputting a multiplexed binary data stream using an analog to digital convertor (ADC) connected to the output of the first and second mixers, wherein the outputs represent a pseudo random number (PRN) code modulated backscattered signal received from a fiber under test;
using a second module configured to:
correlate a PRN reference with the received PRN code modulated backscattered signal,
perform control operations;
using a third module comprising control logic for the modular fiber optic interferometry control system configured to:
store executable instructions on a computer readable memory, the instructions, when executed by one or more processors, cause the one or more processors to perform operations comprising at least one of data logging, communications, memory management, and light source management.

18. The method of claim 17, further comprising a fourth module for generating a power stream wherein the one or more processors perform operations comprising at least one of wild point smoothing, circle correction, vector determination, merge change in phase data, and merge power data.

19. The method of claim 17, further comprising a module for event interrogation wherein the one or more processors perform operations comprising at least one of bandpass filtering and fast Fourier transform to output at least one of an audio stream and a data stream.

20. The method of claim 17, further comprising a module for noise reduction wherein the one or more processors perform operations comprising at least one of Kalman filtering, Bayesian inferencing, Bayesian updating, Markovian prediction, bandpass filtering, Butterworth filtering, adaptive filtering, background subtraction, and model fitting.

* * * * *

UNITED STATES PATENT AND TRADEMARK OFFICE
CERTIFICATE OF CORRECTION

PATENT NO. : 9,772,238 B2
APPLICATION NO. : 14/837609
DATED : September 26, 2017
INVENTOR(S) : Dan Alan Preston, Stephen Timothy Doll and James Alexander Philp It is certified that error appears in the above-identified patent and that said Letters Patent is hereby corrected as shown below:

On the Title Page

The Inventor Section should read as follows:
(72) Inventors: Dan Alan Preston, Bainbridge Island, WA (US); Stephen Timothy Doll, Big Arm, MT (US); James Alexander Philp, Missoula, MT (US)

Signed and Sealed this
Twenty-fifth Day of February, 2020

Andrei Iancu
*Director of the United States Patent and Trademark Office*